(12) United States Patent
Huang

(10) Patent No.: US 11,106,011 B2
(45) Date of Patent: Aug. 31, 2021

(54) PHOTOGRAPHING LENS SYSTEM, IMAGING APPARATUS AND ELECTRONIC DEVICE

(71) Applicant: LARGAN PRECISION CO., LTD., Taichung (TW)

(72) Inventor: Hsin-Hsuan Huang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 284 days.

(21) Appl. No.: 16/360,091

(22) Filed: Mar. 21, 2019

(65) Prior Publication Data

US 2020/0064595 A1 Feb. 27, 2020

(30) Foreign Application Priority Data

Aug. 23, 2018 (TW) .................................. 107129457

(51) Int. Cl.
*G02B 13/00* (2006.01)
*G02B 9/64* (2006.01)
*G02B 13/18* (2006.01)

(52) U.S. Cl.
CPC ........... *G02B 13/0045* (2013.01); *G02B 9/64* (2013.01); *G02B 13/18* (2013.01)

(58) Field of Classification Search
CPC ...... G02B 13/0045; G02B 9/64; G02B 13/18; G02B 27/646
USPC ........................................................ 359/692
See application file for complete search history.

(56) References Cited

U.S. PATENT DOCUMENTS

| | | | |
|---|---|---|---|
| 5,042,929 A | 8/1991 | Tanaka et al. | |
| 5,936,775 A | 8/1999 | Abe | |
| 9,366,847 B2 | 6/2016 | Chen | |
| 9,477,064 B1 | 10/2016 | Chen et al. | |
| 9,606,328 B2 | 3/2017 | Chen | |
| 2010/0166413 A1 | 7/2010 | Hirao et al. | |
| 2010/0188555 A1 | 7/2010 | Hirao et al. | |
| 2010/0321794 A1 | 12/2010 | Hirao et al. | |
| 2011/0001865 A1 | 1/2011 | Hirao et al. | |
| 2015/0277083 A1 | 10/2015 | Chae | |
| 2017/0059825 A1* | 3/2017 | Tang ........................ G02B 7/02 | |
| 2017/0293116 A1 | 10/2017 | Matsumoto | |
| 2018/0196226 A1* | 7/2018 | Chang ................ G02B 13/0045 | |
| 2018/0196235 A1 | 7/2018 | Chang et al. | |

(Continued)

FOREIGN PATENT DOCUMENTS

| | | |
|---|---|---|
| CN | 205003345 U | 1/2016 |
| CN | 107664817 A | 2/2018 |

(Continued)

*Primary Examiner* — Mohammed A Hasan
(74) *Attorney, Agent, or Firm* — Locke Lord LLP; Tim Tingkang Xia, Esq.

(57) ABSTRACT

A photographing lens system includes seven lens elements, the seven lens elements being, in order from an object side to an image side: a first lens element, a second lens element, a third lens element, a fourth lens element, a fifth lens element, a sixth lens element, and a seventh lens element. Each of the seven lens elements has an object-side surface facing toward the object side and an image-side surface facing toward the image side. The first lens element has positive refractive power. The image-side surface of the seventh lens element is concave in a paraxial region thereof and has at least one inflection point in an off-axis region thereof.

28 Claims, 27 Drawing Sheets

(56) References Cited

U.S. PATENT DOCUMENTS

2018/0335608 A1  11/2018  Chang et al.
2018/0335609 A1  11/2018  Chang et al.

FOREIGN PATENT DOCUMENTS

| CN | 107797237 | A | 3/2018 |
| CN | 107797244 | A | 3/2018 |
| CN | 107942497 | A | 4/2018 |
| CN | 108037579 | A | 5/2018 |
| CN | 108873255 | A | 11/2018 |
| JP | 1993034593 | | 2/1993 |
| JP | 1999072720 | | 3/1999 |
| TW | I595261 | B | 8/2017 |
| TW | I614517 | B | 2/2018 |
| WO | 2020010878 | A1 | 1/2020 |

\* cited by examiner

PHOTOGRAPHING LENS SYSTEM, IMAGING APPARATUS AND ELECTRONIC DEVICE

RELATED APPLICATIONS

This application claims priority to Taiwan Application Serial Number 107129457, filed on Aug. 23, 2018, which is incorporated by reference herein in its entirety.

BACKGROUND

Technical Field

The present disclosure relates to a photographing lens system and an imaging apparatus, and more particularly, to a photographing lens system and an imaging apparatus applicable to electronic devices.

Description of Related Art

With the advancement of semiconductor process technology, the performance of electronic photosensitive devices has been improved, and pixels with smaller dimensions can be achieved. Therefore, optical lens systems featuring high image quality have become indispensable for modern electronic devices.

With new technologies changing rapidly, electronic devices equipped with optical lens systems have a wider range of applications. Also, the specification requirements for optical lens systems are more diversified. There is a need with modern optical lens systems in balancing image quality, sensitivity, aperture size, device size or view angle, etc. easily.

SUMMARY

According to one aspect of the present disclosure, a photographing lens system includes seven lens elements, the seven lens elements being, in order from an object side to an image side: a first lens element, a second lens element, a third lens element, a fourth lens element, a fifth lens element, a sixth lens element, and a seventh lens element, wherein each of the seven lens elements has an object-side surface facing toward the object side and an image-side surface facing toward the image side, the first lens element has positive refractive power, the seventh lens element has an image-side surface being concave in a paraxial region thereof and having at least one inflection point in an off-axis region thereof, a focal length of the photographing lens system is f, a focal length of the first lens element is f1, a curvature radius of the object-side surface of the first lens element is R1, a curvature radius of an object-side surface of the second lens element is R3, and the following conditions are satisfied:

$-0.30 < f/f7 < 3.0;$ $0.30 < f/f1 < 3.50;$ and $-9.0 < R3/R1 < 0.50°$

According to another aspect of the present disclosure, a photographing lens system includes seven lens elements, the seven lens elements being, in order from an object side to an image side: a first lens element, a second lens element, a third lens element, a fourth lens element, a fifth lens element, a sixth lens element, and a seventh lens element, wherein each of the seven lens elements has an object-side surface facing toward the object side and an image-side surface facing toward the image side, the first lens element has positive refractive power, the seventh lens element has an image-side surface being concave in a paraxial region thereof and having at least one inflection point in an off-axis region thereof, a focal length of the photographing lens system is f, a focal length of the second lens element is f2, a focal length of the sixth lens element is f6, a focal length of the seventh lens element is f7, a curvature radius of the image-side surface of the second lens element is R4, an Abbe number of the seventh lens element is V7, and the following conditions are satisfied:

$-0.30 < f/f7 < 3.0;$ $-3.50 < f/f2 < 1.0;$ $-3.50 < f/f6 < 0.30;$ $-3.0 < f/R4 < 1.5;$ and $8.0 < V7 < 35.0.$ According to another aspect of the present disclosure, a photographing lens system includes seven lens elements, the seven lens elements being, in order from an object side to an image side: a first lens element, a second lens element, a third lens element, a fourth lens element, a fifth lens element, a sixth lens element, and a seventh lens element, wherein each of the seven lens elements has an object-side surface facing toward the object side and an image-side surface facing toward the image side, the first lens element has positive refractive power, the seventh lens element has an image-side surface being concave in a paraxial region thereof and having at least one inflection point in an off-axis region thereof, a central thickness of the first lens element is a maximum among central thicknesses of the seven lens elements, a focal length of the photographing lens system is f, a focal length of the seventh lens element is f7, an Abbe number of the seventh lens element is V7, an axial distance between an object-side surface of the first lens element and an image surface is TL, an entrance pupil diameter of the photographing lens system is EPD, and the following conditions are satisfied:

$-0.30 < f/f7 < 3.0;$ $8.0 < V7 < 35.0;$ and $0.80 < TL/EPD < 2.30.$

According to another aspect of the present disclosure, an imaging apparatus includes the aforementioned photographing lens system and an image sensor disposed on the image surface of the photographing lens system.

According to another aspect of the present disclosure, an electronic device includes at least two imaging apparatuses disposed on the same side thereof, wherein the at least two imaging apparatuses include:

A first imaging apparatus includes a photographing lens system as described above and an image sensor; and a second imaging apparatus includes an optical lens assembly and an image sensor, wherein an angle of view of the first imaging apparatus and an angle of view of the second imaging apparatus differ by at least 20 degrees.

DETAILED DESCRIPTION

Figure 1A:
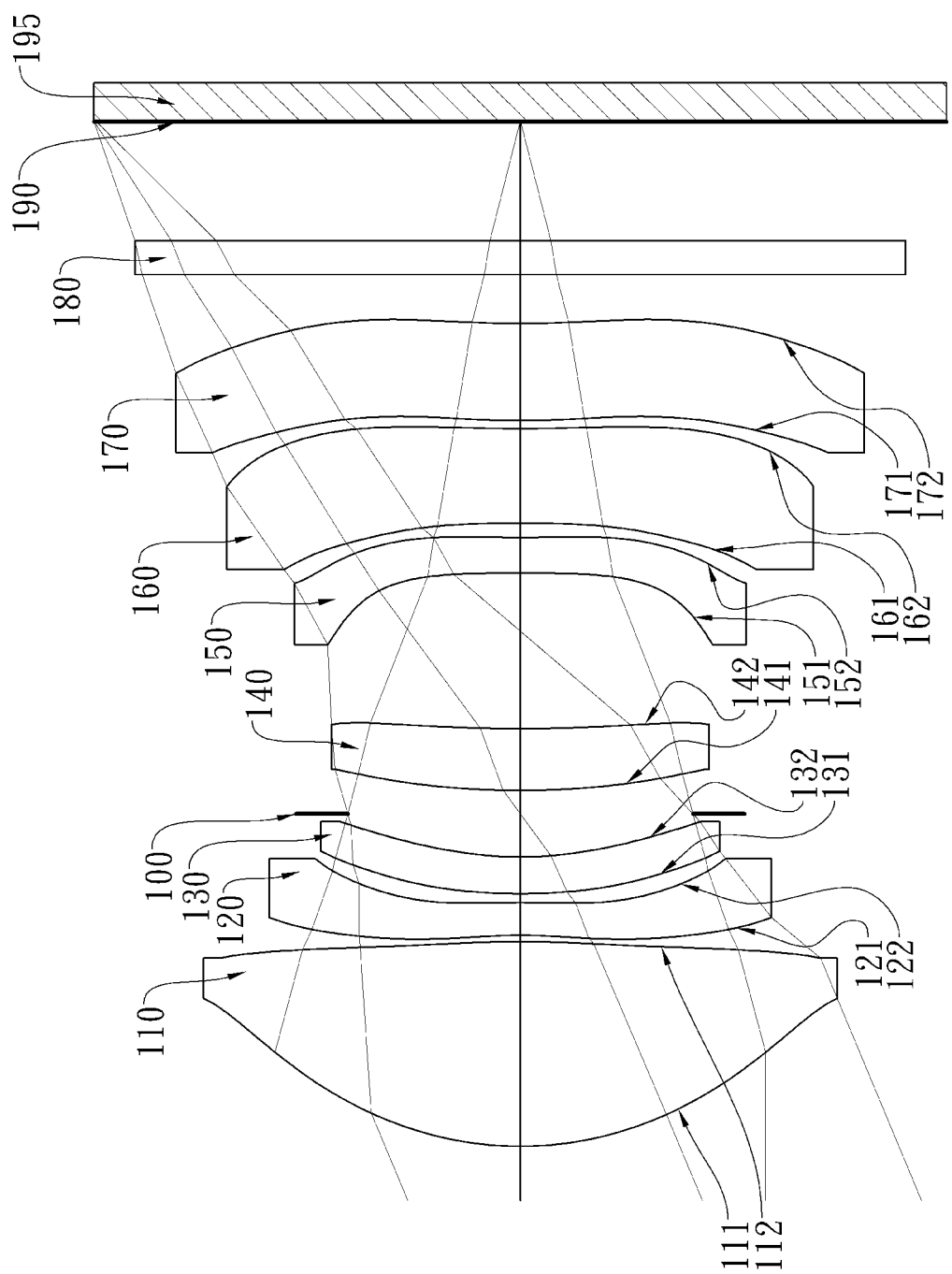
FIG. 1A is a schematic view of an imaging apparatus according to the 1st embodiment of the present disclosure.

The present disclosure provides a photographing lens system including seven lens elements, the seven lens elements being, in order from an object side to an image side, a first lens element, a second lens element, a third lens element, a fourth lens element, a fifth lens element, a sixth lens element, and a seventh lens element. Each of the seven lens elements has an object-side surface facing toward the object side and an image-side surface facing toward the image side.

The first lens element has positive refractive power to provide the main converging capability in the lens system so as to reduce the size of the lens system effectively and meet the requirements of miniaturization. The first lens element may have an object-side surface being convex in a paraxial region thereof to better retrieve light from the off-axis field, thereby reducing the incident angle of the light projecting onto the lens surface and avoiding total reflection. When a central thickness of the first lens element is a maximum among central thicknesses of the seven lens elements, the refractive power of the first lens element and the structural strength of the lens system can be enhanced, thereby improving its environmental adaptability and ensuring the compact size of the lens system.

The second lens element may have negative refractive power to correct aberrations generated by the first lens element, thereby correcting spherical and chromatic aberrations of the lens system. The second lens element may have an object-side surface being concave in a paraxial region thereof to correct aberrations generated by the first lens element, thereby improving the image quality.

The sixth lens element may have negative refractive power to reduce the back focal length of the lens system, thereby preventing the lens system from being excessively large. The sixth lens element may have an object-side surface being concave in a paraxial region thereof to provide some of the diverging capability of the sixth lens element, thereby avoiding excessive aberrations. The sixth lens element may have an image-side surface being concave in a paraxial region thereof and having at least one inflection point in an off-axis region thereof, which can properly control the position of the image surface and thereby prevent the lens device from being excessively large; off-axis aberrations can be corrected to improve the image quality.

The seventh lens element may have positive refractive power to increase symmetry of the lens system and thereby avoid aberrations. The seventh lens element may have an image-side surface being concave in a paraxial region thereof and having at least one inflection point in an off-axis region thereof, which can help reduce the back focal length of the lens system and thereby satisfy the need for a compact size; meanwhile, the Petzval surface of the lens system can be further flattened.

A focal length of the photographing lens system is f, and a focal length of the seventh lens element is f7. When the following condition is satisfied: $-0.30<f/f7<3.0$, refractive power distribution on the image side of the lens system can be properly controlled, which is favorable for telephoto functions and miniaturization of the lens system. Moreover, the following condition is satisfied: $-0.10<f/f7<2.50$. Moreover, the following condition is satisfied: $0<f/f7<2.0$.

The focal length of the photographing lens system is f, and a focal length of the first lens element is f1. When the following condition is satisfied: $0.30<f/f1<3.50$, a telephoto feature can be favorably achieved for capturing image details from afar, so that the lens system can be used in a wider range of applications. Moreover, the following condition is satisfied: $0.80<f/f1<2.80$. Moreover, the following condition is satisfied: $1.0<f/f1<2.30$.

A curvature radius of the object-side surface of the first lens element is R1, and a curvature radius of the object-side surface of the second lens element is R3. When the following condition is satisfied: $-9.0<R3/R1<0.50$, the shapes of the object-side surfaces of the first and the second lens elements can be well balanced, which is favorable for forming a retro-focus lens system. Moreover, the following condition is satisfied: $-9.0<R3/R1<-0.50$. Moreover, the following condition is satisfied: $-9.0<R3/R1<-1.0$.

The focal length of the photographing lens system is f, and a focal length of the second lens element is f2. When the following condition is satisfied: $-3.50<f/f2<1.0$, the refractive power of the second lens element can be effectively controlled, so that a balance in aberration corrections between the first and the second lens elements can be achieved. Moreover, the following condition is satisfied: $-1.80<f/f2<0.35$.

The focal length of the photographing lens system is f, and a focal length of the sixth lens element is f6. When the following condition is satisfied: $-3.50<f/f6<0.30$, the refractive power of the sixth lens element can be effectively controlled, which can balance the refractive power distribution on the image side of the lens system, so that the lens system can be compact. Moreover, the following condition is satisfied: $-2.50<f/f6<-0.20$.

The focal length of the photographing lens system is f, and a curvature radius of the image-side surface of the second lens element is R4. When the following condition is satisfied: $-3.0<f/R4<1.5$, the shape of the image-side surface of the second lens element can be controlled so as to ensure that a refraction angle will not be too large to cause divergence of light. Moreover, the following condition is satisfied: $-1.50<f/R4<1.0$.

An Abbe number of the seventh lens element is V7. When the following condition is satisfied: $8.0<V7<35.0$, the density difference between the material of the seventh lens element and air can be enhanced so that the optical path in limited space can be better controlled. Moreover, the following condition is satisfied: $15.0<V7<25.0$.

An axial distance between the object-side surface of the first lens element and an image surface is TL, and an entrance pupil diameter of the photographing lens system is EPD. When the following condition is satisfied: $0.80<TL/EPD<2.30$, sufficient brightness of the lens system can be provided while maintaining a compact size. Moreover, the following condition is satisfied: $0.90<TL/EPD<2.0$.

The focal length of the photographing lens system is f, and a curvature radius of the image-side surface of the fifth lens element is R10. When the following condition is satisfied: $0 \leq f/R10$, the back focal length of the lens system can be reduced so that the total track length of the lens system can be controlled properly. Moreover, the following condition is satisfied: $0 \leq f/R10<8.0$.

The second lens element has an object-side surface with at least one convex critical point in an off-axis region thereof, a vertical distance from the at least one convex critical point on the object-side surface of the second lens element to an optical axis is Yc21, and a central thickness of the second lens element is CT2. When the following condition is satisfied: $0.50<Yc21/CT2<8.50$, it is favorable for correcting aberrations at the off-axis field by the second lens element.

A minimum among Abbe numbers of the seven lens elements is Vmin. When the following condition is satisfied: $10.0<Vmin<22.0$, it is favorable for balancing the converging capability in different wavelengths of the lens system so as to correct chromatic aberration.

The number of lens elements with an Abbe number smaller than 32 is Nv32. When the following condition is satisfied: $3 \leq Nv32 \leq 7$, it is favorable for balancing light in different wavelengths in the lens system.

The focal length of the photographing lens system is f, and a maximum image height of the photographing lens system is ImgH. When the following condition is satisfied: $1.66<f/ImgH<10$, the angle of view of the lens system can be better adjusted, so that the photographing lens system can be used in various field of applications. Moreover, the following condition is satisfied: $2.0<f/ImgH<4.0$.

An axial distance between the object-side surface of the first lens element and the image surface is TL, and the focal length of the photographing lens system is f. When the following condition is satisfied: $0.90<TL/f<1.20$, the total track length of the photographing lens system can be balanced, and the size of the field of view can be properly controlled.

The curvature radius of the image-side surface of the second lens element is R4; a curvature radius of the object-side surface of the third lens element is R5. When the following condition is satisfied: $-1.20<R5/R4<1.0$, the shape variations of the image-side surface of the second lens element and the object-side surface of the third lens element can be well controlled, and the third lens element can have sufficient optical path controlling capability to correct aberrations. Moreover, the following condition is satisfied: $-0.80<R5/R4<0.50$.

An Abbe number of a lens element with positive refractive power among the seven lens elements is Vp. When at least one lens element with positive refractive power satisfies the following condition: $10.0<Vp<23.0$, telephoto functionality of the photographing lens system can be favorably achieved so that the system can be applied to a wider range of electronic devices.

A vertical distance from at least one critical point on the image-side surface of the seventh lens element to an optical axis is Yc72, and a maximum effective radius on the image-side surface of the seventh lens element is Y72. When the following condition is satisfied: $0.10<Yc72/Y72<1.0$, it is favorable for correcting field curvatures to improve image quality at the off-axis field.

A curvature radius of the image-side surface of the fifth lens element is R10, and a curvature radius of the object-side surface of the sixth lens element is R11. When the following condition is satisfied: $-0.40<(R10+R11)/(R10-R11)<0.60$, it is favorable for balancing the lens surface shapes of the fifth and the sixth lens elements with these two lens elements becoming complementary to each other so as to further correct aberrations.

A curvature radius of the object-side surface of the third lens element is R5, and a curvature radius of the image-side surface of the third lens element is R6. When the following condition is satisfied: $-0.50<(R5-R6)/(R5+R6)<0.30$, the surface shapes of the third lens element can be more balanced for adjusting optical paths in tangential and sagittal directions so as to favorably correct astigmatism and comatic aberrations.

The photographing lens system according to the present disclosure may further comprise an aperture stop. An axial distance between the aperture stop and the image-side surface of the seventh lens element is SD, and an axial distance between the object-side surface of the first lens element and the image-side surface of the seventh lens element is TD. When the following condition is satisfied: $0.40<SD/TD<0.75$, it is favorable for balancing the position of the aperture stop effectively so as to control the size of the lens system.

The axial distance between the object-side surface of the first lens element and the image surface is TL, and the maximum image height of the photographing lens system is ImgH. When the following condition is satisfied: $1.10<TL/ImgH<3.0$, a sufficient light receiving area of the lens system can be provided while miniaturizing the lens system, so that sufficient image brightness is maintained. Moreover, the following condition is satisfied: $1.20<TL/ImgH<2.42$.

An Abbe number of a lens element among the seven lens elements is V. When at least two lens elements of the photographing lens system satisfy the following condition: $10.0<V<22.0$, the proper lens materials can provide sufficient light control capability, so that the focal points of different wavelengths can be balanced to avoid image overlapping. Moreover, at least two lens elements satisfy the following condition: $12.0<V<20.0$.

The focal length of the first lens element is f1, and the focal length of the second lens element is f2. When the following condition is satisfied: $1.65<|f2/f1|$, the first lens element can have sufficient refractive power to control the optical path of the lens system, with the second lens elements being complementary for balancing aberrations. Moreover, the following condition is satisfied: $1.70<|f2/f1|<18.0$.

The focal length of the photographing lens system is f, and the curvature radius of the object-side surface of the sixth lens element is R11. When the following condition is satisfied: $-5.0<f/R11<1.0$, the shape of the object-side surface of the sixth lens element can be well controlled to prevent excessive convergence, which may make it difficult in reducing the total track length.

The curvature radius of the object-side surface of the second lens element is R3, and the curvature radius of the image-side surface of the second lens element is R4. When the following condition is satisfied: $-5.0<(R3+R4)/(R3-R4)<0.30$, the shape of the second lens element can be effectively controlled so as to favorably balance aberrations of the lens system. Moreover, the following condition is satisfied: $-3.0<(R3+R4)/(R3-R4)<-0.20$.

The focal length of the photographing lens system is f, and the entrance pupil diameter of the photographing lens system is EPD. When the following condition is satisfied: $1.0<f/EPD<2.0$, light entrance diameter of the lens system can be effectively adjusted so as to control the amount of incident light into the lens system for increasing image brightness.

A central thickness of the fourth lens element is CT4, and an axial distance between the fourth lens element and the fifth lens element is T45. When the following condition is satisfied: $0.25<CT4/T45<1.50$, it is favorable for balancing the space arrangement of the fourth lens element in the photographing lens system so as to provide stability and good assembly yield in lens manufacturing.

A curvature radius of the image-side surface of the seventh lens element is R14, and the focal length of the photographing lens system is f. When the following condition is satisfied: $0.50<R14/f<1.50$, the seventh lens element can have a favorable concave image-side surface for the miniaturization of the lens system.

The focal length of the photographing lens system is f, a curvature radius of an object-side surface of a lens element among the seven lens elements is Rf, and a curvature radius of an image-side surface of the same lens element is Rr. When at least one lens element satisfies the following condition: $|f/Rf|+|f/Rr|\leq 1.0$, it is favorable for arranging at least one correction lens in the lens system so as to correct aberrations.

A central thickness of the sixth lens element is CT6, and an axial distance between the fifth lens element and the sixth lens element is T56. When the following condition is satisfied: $T56/CT6<2.50$, it can prevent the axial distance between the fifth lens element and the sixth lens element from becoming too large while providing a sufficient thickness of the sixth lens element, so as to enhance the lens assembling process with reduced sensitivity.

Each of the aforementioned features of the photographing lens system can be utilized in numerous combinations, so as to achieve the corresponding effects.

According to the photographing lens system of the present disclosure, the lens elements thereof can be made of glass or plastic material. When the lens elements are made of glass material, the distribution of the refractive power of the photographing lens system may be more flexible to design. Technologies such as grinding or molding can be used for producing glass lens elements. When the lens elements are made of plastic material, manufacturing costs can be effectively reduced. Furthermore, surfaces of each lens element can be arranged to be aspheric (ASP). Since these aspheric surfaces can be easily formed into shapes other than spherical shapes, more control variables can be obtained to eliminate aberrations and to further decrease the quantity of lens elements; meanwhile, the total track length of the photographing lens system can be effectively reduced. Processes such as plastic injection molding or glass molding can be used for making the aspheric surfaces of lens elements.

According to the photographing lens system of the present disclosure, additives may be selectively added to the material of any one (or more) lens element to change the transmittance of said lens element in a particular wavelength range of light, so as to further reduce stray light and chromatic aberrations. For example, an additive that can filter off light in the wavelength range of 600-800 nm may be added to reduce extra red or infrared light, or an additive that can filter off light in the wavelength range of 350-450 nm may be added to reduce blue or ultraviolet light in the lens system. Thus, additives can prevent the interference caused to the image by light in a particular wavelength range. In addition, additives may be evenly mixed in the plastic material for manufacturing lens elements with an injection molding process.

According to the photographing lens system of the present disclosure, if a surface of a lens element is aspheric, it means that the surface has an aspheric shape throughout its optically effective area, or a portion(s) thereof.

According to the photographing lens system of the present disclosure, when the lens element has a convex surface and the region of convex shape is not defined, it indicates that the surface can be convex in the paraxial region thereof. When the lens element has a concave surface and the region of concave shape is not defined, it indicates that the surface can be concave in the paraxial region thereof. Likewise, when the region of refractive power or focal length of a lens element is not defined, it indicates that the region of refractive power or focal length of the lens element can be in the paraxial region thereof.

According to the photographing lens system of the present disclosure, the definition of the inflection point is a transition point where a curvature center of a lens surface changes from the object side to the image side (or from the image side to the object side) between the optical axis and a peripheral region.

According to the photographing lens system of the present disclosure, the image surface of the photographing lens system, based on the corresponding image sensor, can be a plane or a curved surface with an arbitrary curvature, especially a curved surface being concave facing towards the object side. Meanwhile, the photographing lens system of the present disclosure may optionally include one or more image correction components (such as a field flattener) between the image surface and the lens element closest to the image surface for the purpose of image corrections (such as field curvature correction). The optical properties of the image correction components such as curvatures, thicknesses, indices, positions and shapes (convex or concave, spherical or aspheric, diffractive surface and Fresnel surface, etc.) can be adjusted according to the requirement of the imaging apparatus. Preferably, an image correction component may be a thin plano-concave component having a surface being concave toward the object side and be arranged near the image surface.

According to the photographing lens system of the present disclosure, the photographing lens system can include at least one stop, such as an aperture stop, a glare stop or a field stop, so as to favorably reduce the amount of stray light and thereby improving the image quality.

According to the photographing lens system of the present disclosure, the aperture stop can be configured as a front stop or a middle stop. The front stop disposed between an imaged object and the first lens element can provide a longer distance between the exit pupil and the image surface so that there is a telecentric effect for improving the image-sensing efficiency of an image sensor, such as a CCD or CMOS sensor. The middle stop disposed between the first lens element and the image surface is favorable for enlarging the field of view, thereby providing the photographing lens system with the advantage of a wide-angle lens.

A variable aperture apparatus may be disposed in the photographing lens system of the present disclosure. The variable aperture apparatus may be a mechanical part or a light moderation part, in which the size and shape of the aperture may be controlled by electricity or electronic signal. The mechanical part may include moving parts such as blades, shielding sheets, etc. The light moderation part may include shielding materials such as filters, electrochromic materials, liquid crystal layer, etc. The variable aperture apparatus can control the amount of incoming light and exposure time so as to further strengthen the capability of image adjustment. Meanwhile, the variable aperture apparatus may represent the aperture in the present disclosure that can adjust the image properties such as depth of field or exposure speed by changing the f-number of the lens system.

The photographing lens system of the present disclosure can be applied to a wide range of 3D (three-dimensional) image capturing applications and electronic devices, such as digital cameras, mobile devices, digital tablets, smart TVs, network surveillance devices, somatosensory game machines, driving recording systems, rear view camera systems, wearable devices and drone cameras.

The present disclosure further provides an imaging apparatus including the aforementioned photographing lens system and an image sensor, wherein the image sensor is disposed on or near an image surface of the photographing lens system. By arranging the shape of the first lens element of the photographing lens system to have a reduced effective radius, the size of the whole photographing lens system can be reduced, which is favorable for minimizing the photographing lens system. Moreover, the imaging apparatus can further include a barrel member, a holding member or a combination thereof.

The present disclosure further provides an electronic device including the aforementioned imaging apparatus, the imaging apparatus including the photographing lens system and an image sensor, wherein the image sensor is disposed on or near an image surface of the photographing lens system. Moreover, the electronic device can further include a control unit, a display unit, a storage unit, a random access memory (RAM) unit or a combination thereof.

According to the above descriptions of the present disclosure, the following 1st-13th specific embodiments are provided for further explanation.

1st Embodiment

Figure 1B:
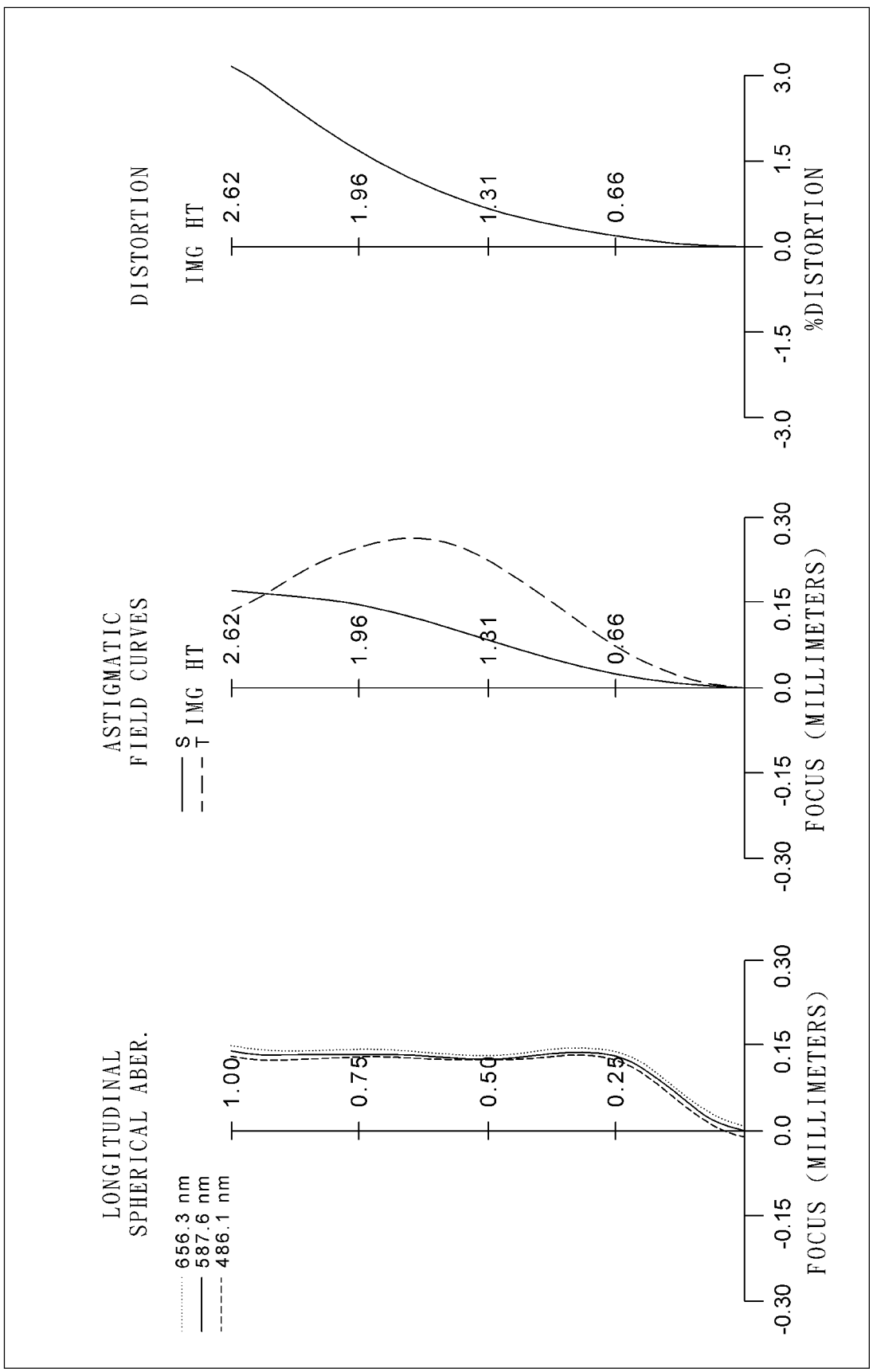
FIG. 1B shows longitudinal spherical aberration curves, astigmatic field curves and a distortion curve of the imaging apparatus according to the 1st embodiment.

FIG. 1A is a schematic view of an imaging apparatus according to the 1st embodiment of the present disclosure. FIG. 1B shows, in order from left to right, longitudinal spherical aberration curves, astigmatic field curves and a distortion curve of the imaging apparatus according to the 1st embodiment.

In FIG. 1A, the imaging apparatus includes a photographing lens system (not otherwise herein labeled) of the present disclosure and an image sensor 195. The photographing lens system includes, in order from an object side to an image side, a first lens element 110, a second lens element 120, a third lens element 130, an aperture stop 100, a fourth lens element 140, a fifth lens element 150, a sixth lens element 160, a seventh lens element 170, and an image surface 190. The image sensor 195 is disposed on or near the image surface 190, and the photographing lens system includes seven lens elements (110, 120, 130, 140, 150, 160 and 170) without any other lens element being inserted between them.

The first lens element 110 with positive refractive power has an object-side surface 111 being convex in a paraxial region thereof and an image-side surface 112 being convex in a paraxial region thereof. Both the object-side surface 111 and the image-side surface 112 are aspheric. The first lens element 110 is made of plastic material.

The second lens element 120 with negative refractive power has an object-side surface 121 being concave in a paraxial region thereof, and an image-side surface 122 being convex in a paraxial region thereof. Both the object-side surface 121 and the image-side surface 122 are aspheric. The second lens element 120 is made of plastic material.

The third lens element 130 with negative refractive power has an object-side surface 131 being convex in a paraxial region thereof, and an image-side surface 132 being concave in a paraxial region thereof. Both the object-side surface 131 and the image-side surface 132 are aspheric. The third lens element 130 is made of plastic material.

The fourth lens element 140 with positive refractive power has an object-side surface 141 being convex in a paraxial region thereof, and an image-side surface 142 being concave in a paraxial region thereof. Both the object-side surface 141 and the image-side surface 142 are aspheric. The fourth lens element 140 is made of plastic material.

The fifth lens element 150 with negative refractive power has an object-side surface 151 being concave in a paraxial region thereof, and an image-side surface 152 being concave in a paraxial region thereof. Both the object-side surface 151 and the image-side surface 152 are aspheric. The fifth lens element 150 is made of plastic material.

The sixth lens element 160 with negative refractive power has an object-side surface 161 being concave in a paraxial region thereof, and an image-side surface 162 being concave in a paraxial region thereof. Both the object-side surface 161 and the image-side surface 162 are aspheric, and there is at least one inflection point in an off-axis region on the image-side surface 162 thereof. The sixth lens element 160 is made of plastic material.

The seventh lens element 170 with positive refractive power has an object-side surface 171 being convex in a paraxial region thereof, and an image-side surface 172 being concave in a paraxial region thereof. Both the object-side surface 171 and the image-side surface 172 are aspheric, and there is at least one inflection point in an off-axis region on the image-side surface 172 thereof. The seventh lens element 170 is made of plastic material.

The photographing lens system further includes a filter 180 disposed between the seventh lens element 170 and the image surface 190. The filter 180 is made of glass material and does not affect a focal length of the photographing lens system.

Figure 11A:
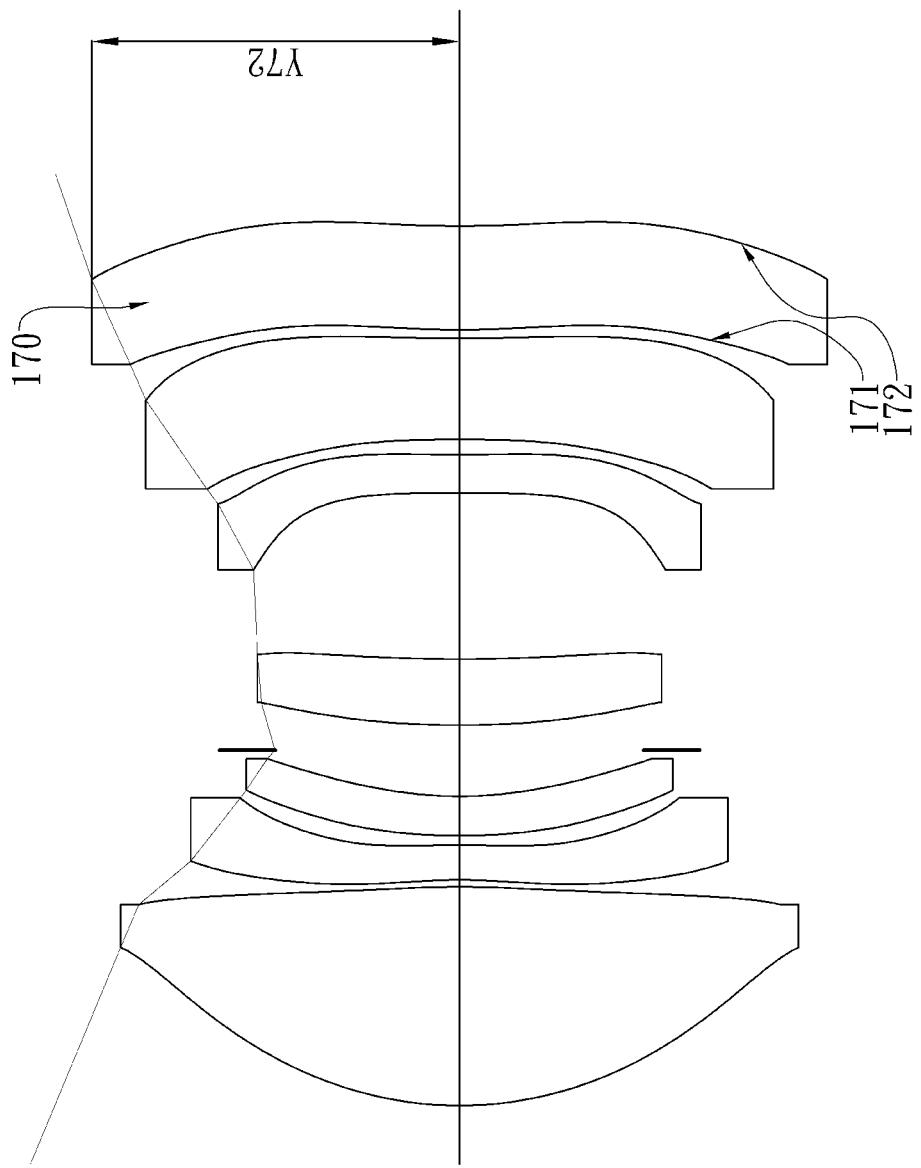
FIG. 11A is a schematic view showing a parameter Y72 of the 1st embodiment of the present disclosure as an example.
Figure 11B:
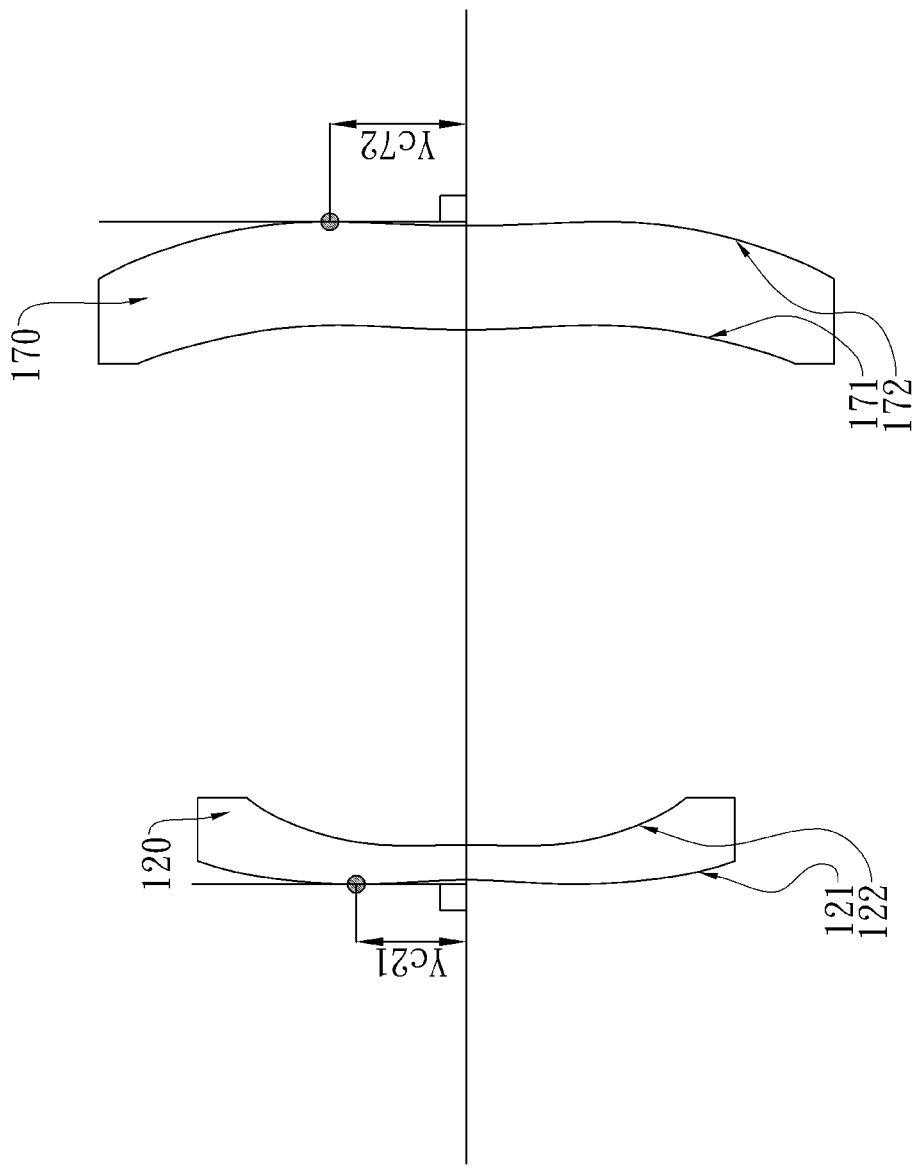
FIG. 11B is a schematic view showing parameters Yc21 and Yc72 of the 1st embodiment of the present disclosure as an example.

Please refer to FIG. 11A, which is a schematic view showing the parameter Y72 of the 1st embodiment of the present disclosure as an example, wherein Y72 is the maximum effective radius on the image-side surface 172 of the seventh lens element 170. FIG. 11B is a schematic view showing the parameters Yc21 and Yc72 of the 1st embodiment of the present disclosure as an example, wherein Yc21 is the vertical distance from one convex critical point on the object-side surface 121 of the second lens element 120 to the optical axis, and Yc72 is the vertical distance from one critical point on the image-side surface 172 of the seventh lens element 170 to the optical axis.

The detailed optical data of the 1st embodiment are shown in TABLE 1, and the aspheric surface data are shown in TABLE 2, wherein the units of the curvature radius, the thickness and the focal length are expressed in mm, f is the focal length of the photographing lens system, Fno is an f-number of the photographing lens system, and HFOV is half of a maximal field of view, and surfaces #1 to #18 refer to the surfaces in order from the object side to the image side. The aspheric surface data are shown in TABLE 2 wherein k is the conic coefficient in the equation of the aspheric surface profiles, and A4-A16 refer to the 4th to 16th order aspheric coefficients.

Further, it should be noted that the tables shown in each of the following embodiments are associated with the schematic view and diagrams of longitudinal spherical aberration curves, astigmatic field curves and a distortion curve for the respective embodiment. Also, the definitions of the parameters presented in later tables are the same as those of the parameters presented in TABLE 1 and TABLE 2 for the 1st embodiment. Explanations in this regard will not be provided again.

TABLE 1

(1st Embodiment)
f = 5.88 mm, Fno = 1.95, HFOV = 22.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.116 | ASP | 1.258 | Plastic | 1.545 | 56.0 | 3.08 |
| 2 | | −6.411 | ASP | 0.040 | | | | |
| 3 | Lens 2 | −3.297 | ASP | 0.200 | Plastic | 1.669 | 19.4 | −8.80 |
| 4 | | −7.680 | ASP | 0.055 | | | | |
| 5 | Lens 3 | 3.223 | ASP | 0.226 | Plastic | 1.563 | 42.5 | −11.02 |
| 6 | | 2.067 | ASP | 0.266 | | | | |
| 7 | Ape. Stop | Plano | | 0.144 | | | | |
| 8 | Lens 4 | 5.330 | ASP | 0.380 | Plastic | 1.669 | 19.4 | 16.89 |
| 9 | | 9.799 | ASP | 0.956 | | | | |
| 10 | Lens 5 | −33.915 | ASP | 0.220 | Plastic | 1.669 | 19.4 | −10.43 |
| 11 | | 8.808 | ASP | 0.087 | | | | |
| 12 | Lens 6 | −16.181 | ASP | 0.582 | Plastic | 1.534 | 55.9 | −10.93 |
| 13 | | 9.240 | ASP | 0.050 | | | | |
| 14 | Lens 7 | 4.818 | ASP | 0.597 | Plastic | 1.680 | 18.4 | 34.47 |
| 15 | | 5.760 | ASP | 0.300 | | | | |
| 16 | Filter | Plano | | 0.210 | Glass | 1.517 | 64.2 | — |
| 17 | | Plano | | 0.731 | | | | |
| 18 | Image Surface | Plano | | — | | | | |

*Reference wavelength is d-line 587.6 nm.

TABLE 2

Aspheric Coefficients

| | Surface # | | | | | | |
|---|---|---|---|---|---|---|---|
| | 1 | 2 | 3 | 4 | 5 | 6 | 8 |
| k = | −1.3322E+00 | 8.2505E+00 | −2.5475E+01 | 7.9316E+00 | −9.0000E+01 | −2.2635E+01 | 7.9166E+00 |
| A4 = | 1.1587E−02 | 8.3740E−02 | 2.3322E−01 | 3.6417E−01 | 1.6697E−01 | 6.8438E−02 | 5.4059E−03 |
| A6 = | −1.7108E−04 | −5.2800E−02 | −2.0542E−01 | −2.3011E−01 | −4.9320E−02 | 1.1605E−03 | −2.5898E−03 |
| A8 = | 7.9764E−04 | 1.9688E−02 | 9.6170E−02 | 2.6016E−02 | −8.5532E−02 | −5.8540E−02 | −2.5532E−03 |
| A10 = | −2.2264E−04 | −3.7700E−03 | −2.2292E−02 | 4.1560E−02 | 7.5370E−02 | 4.0508E−02 | −1.7440E−03 |

TABLE 2-continued

Aspheric Coefficients

| A12 = | −2.6605E−05 | 2.8840E−04 | 2.0824E−03 | −1.2528E−02 | −1.4796E−02 | −8.1995E−03 | 4.9946E−04 |
| A14 = | | | | | −9.6149E−04 | | |

| | Surface # | | | | | | |
|---|---|---|---|---|---|---|---|
| | 9 | 10 | 11 | 12 | 13 | 14 | 15 |
| k = | 3.2612E+00 | 8.5259E+01 | −2.9260E+00 | 7.6740E+01 | −9.0000E+01 | −4.0431E+01 | 4.9279E+00 |
| A4 = | −2.5884E−03 | −1.7281E−01 | −2.6921E−01 | −1.6530E−01 | −6.2189E−02 | −8.7083E−02 | −9.7139E−02 |
| A6 = | −6.4784E−03 | 7.4063E−02 | 2.6152E−01 | 1.4175E−01 | 2.7638E−02 | 2.0867E−02 | 3.0236E−02 |
| A8 = | −6.4586E−03 | −1.4907E−01 | −2.7417E−01 | −6.4203E−02 | −1.4924E−02 | 8.9309E−03 | −9.0891E−03 |
| A10 = | −6.6881E−04 | 1.3774E−01 | 2.3304E−01 | 2.4311E−02 | 3.6771E−03 | −9.8857E−03 | 2.6891E−03 |
| A12 = | 2.1534E−04 | −1.0192E−01 | −1.4168E−01 | −1.1257E−02 | −1.3696E−04 | 3.8647E−03 | −6.3853E−04 |
| A14 = | | 1.7020E−02 | 4.9339E−02 | 2.4175E−03 | −6.9779E−05 | −7.1648E−04 | 9.1143E−05 |
| A16 = | | 9.2052E−03 | −6.7712E−03 | | | 5.0679E−05 | −5.8225E−06 |

The equation of the aspheric surface profiles is expressed as follows:

$$X(Y) = (Y^2/R)/(1 + \text{sqrt}(1 - (1+k)*(Y/R)^2)) + \sum_i (Ai)*(Y^i)$$

where:

X is the relative distance between a point on the aspheric surface spaced at a distance Y from the optical axis and the tangential plane at the aspheric surface vertex on the optical axis;

Y is the vertical distance from the point on the aspheric surface profile to the optical axis;

R is the curvature radius;

k is the conic coefficient; and

Ai is the i-th aspheric coefficient.

In the 1st embodiment, the focal length of the photographing lens system is f, the f-number of the photographing lens system is Fno, and half of the maximal field of view of the photographing lens system is HFOV. These parameters have the following values: f=5.88 mm; Fno=1.95; and HFOV=22.6 degrees.

In the 1st embodiment, the Abbe number of the seventh lens element 170 is V7, and it satisfies the condition: V7=18.4.

In the 1st embodiment, a minimum among Abbe numbers of the seven lens elements is Vmin, and it satisfies the condition: Vmin=18.4, which is the Abbe number of the seventh lens element 170.

In the 1st embodiment, an Abbe number of a lens element with positive refractive power among the seven lens elements is Vp, and it satisfies the conditions: Vp=56.0 (the first lens element 110), Vp=19.4 (the fourth lens element 140), and Vp=18.4 (the seventh lens element 170).

In the 1st embodiment, a central thickness of the fourth lens element 140 is CT4, and an axial distance between the fourth lens element 140 and the fifth lens element 150 is T45. They satisfy the condition: CT4/T45=0.40.

In the 1st embodiment, an axial distance between the fifth lens element 150 and the sixth lens element 160 is T56, and a central thickness of the sixth lens element 160 is CT6. They satisfy the condition: T56/CT6=0.15.

In the 1st embodiment, the focal length of the photographing lens system is f, and a curvature radius of the image-side surface 122 of the second lens element 120 is R4. They satisfy the condition: f/R4=−0.77.

In the 1st embodiment, the focal length of the photographing lens system is f, and a curvature radius of the image-side surface 152 of the fifth lens element 150 is R10. They satisfy the condition: f/R10=0.67.

In the 1st embodiment, the focal length of the photographing lens system is f, and a curvature radius of the object-side surface 161 of the sixth lens element 160 is R11. They satisfy the condition: f/R11=−0.36.

In the 1st embodiment, the curvature radius of the image-side surface 122 of the second lens element 120 is R4, and a curvature radius of the object-side surface 131 of the third lens element 130 is R5. They satisfy the condition: R5/R4=−0.42.

In the 1st embodiment, a curvature radius of the image-side surface 172 of the seventh lens element 170 is R14, and the focal length of the photographing lens system is f. They satisfy the condition: R14/f=0.98.

In the 1st embodiment, a curvature radius of the object-side surface 111 of the first lens element 110 is R1, and a curvature radius of the object-side surface 121 of the second lens element 120 is R3. They satisfy the condition: R3/R1=−1.56.

In the 1st embodiment, the curvature radius of the object-side surface 121 of the second lens element 120 is R3, and the curvature radius of the image-side surface 122 of the second lens element 120 is R4. They satisfy the condition: (R3+R4)/(R3−R4)=−2.50.

In the 1st embodiment, the curvature radius of the object-side surface 131 of the third lens element 130 is R5, and a curvature radius of the image-side surface 132 of the third lens element 130 is R6. They satisfy the condition: (R5−R6)/(R5+R6)=0.22.

In the 1st embodiment, the curvature radius of the image-side surface 152 of the fifth lens element 150 is R10, and the curvature radius of the object-side surface 161 of the sixth lens element 160 is R11. They satisfy the condition: (R10+R11)/(R10−R11)=−0.30.

In the 1st embodiment, the focal length of the photographing lens system is f, and a focal length of the first lens element 110 is f1. They satisfy the condition: f/f1=1.91.

In the 1st embodiment, the focal length of the photographing lens system is f, and a focal length of the second lens element 120 is f2. They satisfy the condition: f/f2=−0.67.

In the 1st embodiment, the focal length of the first lens element 110 is f1, and the focal length of the second lens element 120 is f2. They satisfy the condition: |f2/f1|=2.85.

In the 1st embodiment, the focal length of the photographing lens system is f, and the focal length of the sixth lens element 160 is f6. They satisfy the condition: f/f6=−0.54.

In the 1st embodiment, the focal length of the photographing lens system is f, and a focal length of the seventh lens element 170 is f7. They satisfy the condition: f/f7=0.17.

In the 1st embodiment, the focal length of the photographing lens system is f, and an entrance pupil diameter of the photographing lens system is EPD. They satisfy the condition: f/EPD=1.95.

In the 1st embodiment, an axial distance between the object-side surface 111 of the first lens element 110 and the image surface 190 is TL, and the focal length of the photographing lens system is f They satisfy the condition: TL/f=1.07.

In the 1st embodiment, the axial distance between the object-side surface 111 of the first lens element 110 and the image surface 190 is TL, and the entrance pupil diameter of the photographing lens system is EPD. They satisfy the condition: TL/EPD=2.09.

In the 1st embodiment, the axial distance between the object-side surface 111 of the first lens element 110 and the image surface 190 is TL, and a maximum image height of the photographing lens system is ImgH. They satisfy the condition: TL/ImgH=2.41.

In the 1st embodiment, the focal length of the photographing lens system is f, and the maximum image height of the photographing lens system is ImgH. They satisfy the condition: f/ImgH=2.24.

In the 1st embodiment, the number of lens elements with an Abbe number smaller than 32 is Nv32, and it satisfies the condition: Nv32=4.

In the 1st embodiment, an axial distance between the aperture stop 100 and the image-side surface 172 of the seventh lens element 170 is SD, and an axial distance between the object-side surface 111 of the first lens element 110 and the image-side surface 172 of the seventh lens element 170 is TD. They satisfy the condition: SD/TD=0.60.

In the 1st embodiment, a vertical distance from a convex critical point which is within the maximum effective diameter and farthest from the optical axis on the object-side surface 122 of the second lens element 120 to the optical axis is Yc21, and a central thickness of the second lens element 120 is CT2. They satisfy the condition: Yc21/CT2=3.16.

In the 1st embodiment, a vertical distance from a convex critical point which is within the maximum effective diameter and farthest from the optical axis on the image-side surface 172 of the seventh lens element 170 to the optical axis is Yc72, and a maximum effective radius on the image-side surface 172 of the seventh lens element 170 is Y72. They satisfy the condition: Yc72/Y72=0.37.

In the 1st embodiment, the focal length of the photographing lens system is f, the curvature radius of the object-side surface 111 of the first lens element 110 is R1, and a curvature radius of the image-side surface 112 of the first lens element 110 is R2. They satisfy the condition: |f/R1|+|f/R2|=3.69.

In the 1st embodiment, the focal length of the photographing lens system is f, the curvature radius of the object-side surface 121 of the second lens element 120 is R3, and the curvature radius of the image-side surface 122 of the second lens element 120 is R4. They satisfy the condition: |f/R3|+|f/R4|=2.55.

In the 1st embodiment, the focal length of the photographing lens system is f, the curvature radius of the object-side surface 131 of the third lens element 130 is R5, and the curvature radius of the image-side surface 132 of the third lens element 130 is R6. They satisfy the condition: |f/R5|+|f/R6|=4.67.

In the 1st embodiment, the focal length of the photographing lens system is f, a curvature radius of the object-side surface 141 of the fourth lens element 140 is R7, and a curvature radius of the image-side surface 142 of the fourth lens element 140 is R8. They satisfy the condition: |f/R7|+|f/R8|=1.70.

In the 1st embodiment, the focal length of the photographing lens system is f, a curvature radius of the object-side surface 151 of the fifth lens element 150 is R9, and the curvature radius of the image-side surface 152 of the fifth lens element 150 is R10. They satisfy the condition: |f/R9|+|f/R10|=0.84.

In the 1st embodiment, the focal length of the photographing lens system is f, the curvature radius of the object-side surface 161 of the sixth lens element 160 is R11, and a curvature radius of the image-side surface 162 of the sixth lens element 160 is R12. They satisfy the condition: |f/R11|+|f/R12|=1.00.

In the 1st embodiment, the focal length of the photographing lens system is f, a curvature radius of the object-side surface 171 of the seventh lens element 170 is R13, and the curvature radius of the image-side surface 172 of the seventh lens element 170 is R14. They satisfy the condition: |f/R13|+|f/R14|=2.24.

Figure 2A:
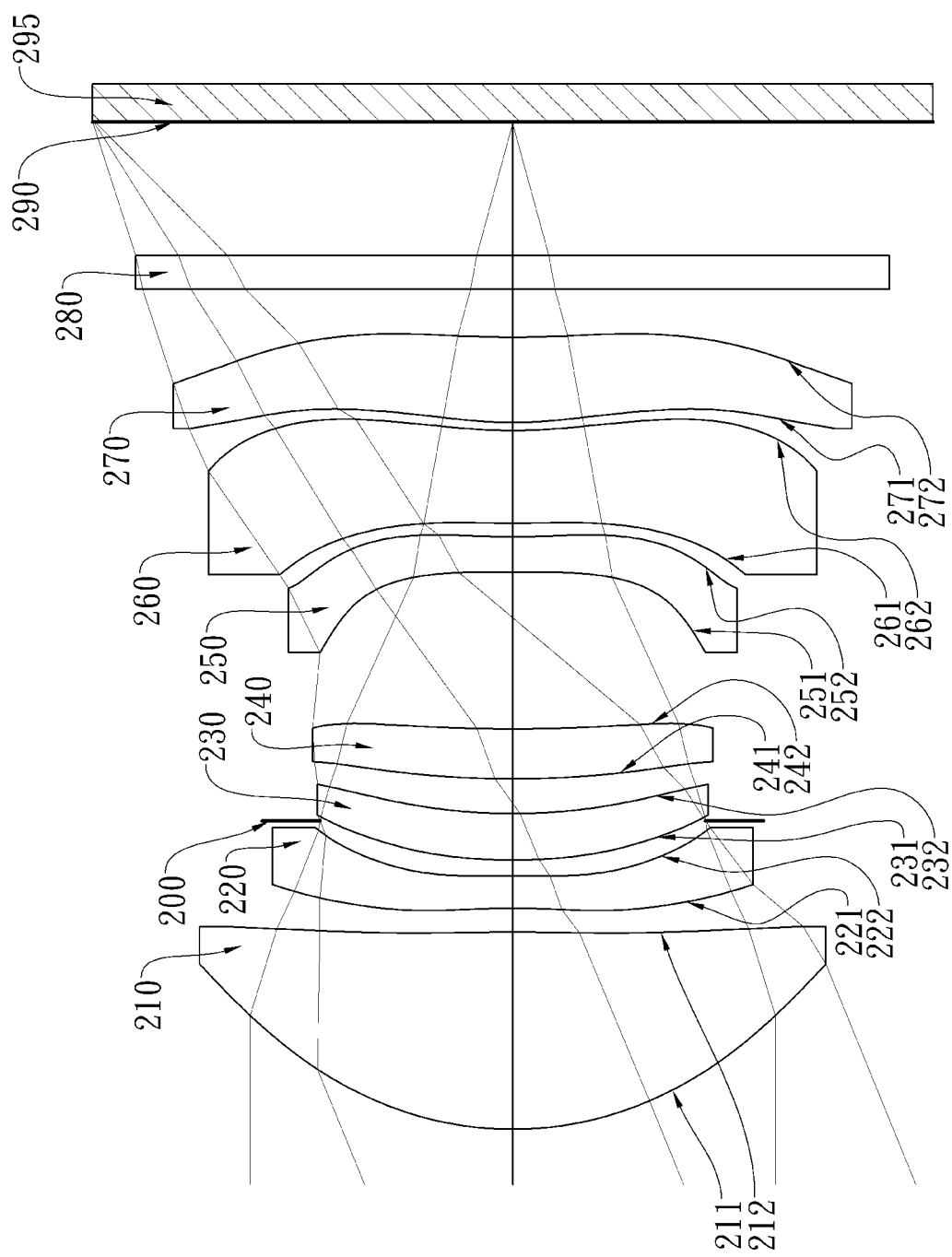
FIG. 2A is a schematic view of an imaging apparatus according to the 2nd embodiment of the present disclosure.
Figure 2B:
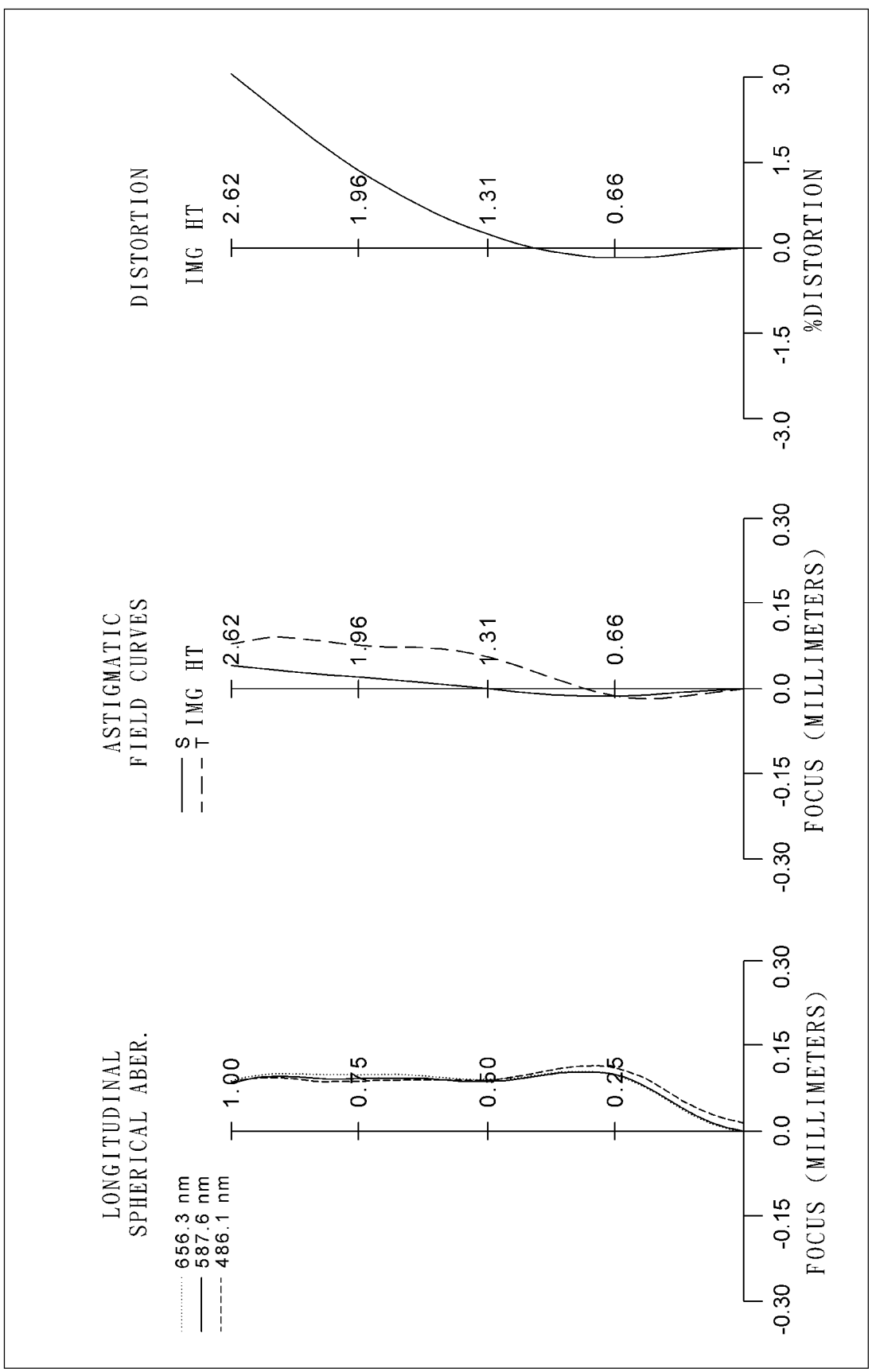
FIG. 2B shows longitudinal spherical aberration curves, astigmatic field curves and a distortion curve of the imaging apparatus according to the 2nd embodiment.

2nd Embodiment FIG. 2A is a schematic view of an imaging apparatus according to the 2nd embodiment of the present disclosure. FIG. 2B shows, in order from left to right, longitudinal spherical aberration curves, astigmatic field curves and a distortion curve of the imaging apparatus according to the 2nd embodiment.

In FIG. 2A, the imaging apparatus includes a photographing lens system (not otherwise herein labeled) of the present disclosure and an image sensor 295. The photographing lens system includes, in order from an object side to an image side, a first lens element 210, a second lens element 220, an aperture stop 200, a third lens element 230, a fourth lens element 240, a fifth lens element 250, a sixth lens element 260, a seventh lens element 270, and an image surface 290. The image sensor 295 is disposed on or near the image surface 290, and the photographing lens system includes seven lens elements (210, 220, 230, 240, 250, 260 and 270) without any other lens element being inserted between them.

The first lens element 210 with positive refractive power has an object-side surface 211 being convex in a paraxial region thereof, and an image-side surface 212 being convex in a paraxial region thereof. Both the object-side surface 211 and the image-side surface 212 are aspheric. The first lens element 210 is made of plastic material.

The second lens element 220 with negative refractive power has an object-side surface 221 being concave in a paraxial region thereof, and an image-side surface 222 being convex in a paraxial region thereof. Both the object-side surface 221 and the image-side surface 222 are aspheric. The second lens element 220 is made of plastic material.

The third lens element 230 with positive refractive power has an object-side surface 231 being convex in a paraxial region thereof, and an image-side surface 232 being concave in a paraxial region thereof. Both the object-side surface 231 and the image-side surface 232 are aspheric. The third lens element 230 is made of plastic material.

The fourth lens element 240 with positive refractive power has an object-side surface 241 being convex in a paraxial region thereof, and an image-side surface 242 being concave in a paraxial region thereof. Both the object-side surface 241 and the image-side surface 242 are aspheric. The fourth lens element 240 is made of plastic material.

The fifth lens element 250 with negative refractive power has an object-side surface 251 being concave in a paraxial region thereof, and an image-side surface 252 being concave in a paraxial region thereof. Both the object-side surface 251 and the image-side surface 252 are aspheric. The fifth lens element 250 is made of plastic material.

The sixth lens element 260 with negative refractive power has an object-side surface 261 being convex in a paraxial region thereof, and an image-side surface 262 being concave in a paraxial region thereof. Both the object-side surface 261 and the image-side surface 262 are aspheric, and there is at least one inflection point in an off-axis region on the image-side surface 262 thereof. The sixth lens element 260 is made of plastic material.

The seventh lens element 270 with positive refractive power has an object-side surface 271 being convex in a paraxial region thereof, and an image-side surface 272 being concave in a paraxial region thereof. Both the object-side surface 271 and the image-side surface 272 are aspheric, and there is at least one inflection point in an off-axis region on the image-side surface 272 thereof. The seventh lens element 270 is made of plastic material.

The photographing lens system further includes a filter 280 disposed between the seventh lens element 270 and the image surface 290. The filter 280 is made of glass material and does not affect a focal length of the photographing lens system.

The detailed optical data of the 2nd embodiment are shown in TABLE 3, and the aspheric surface data are shown in TABLE 4.

TABLE 3

(2nd Embodiment)
f = 6.07 mm, Fno = 1.85, HFOV = 22.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.102 | ASP | 1.234 | Plastic | 1.545 | 56.0 | 3.40 |
| 2 | | −12.164 | ASP | 0.150 | | | | |
| 3 | Lens 2 | −3.881 | ASP | 0.200 | Plastic | 1.680 | 18.4 | −5.94 |
| 4 | | −99.243 | | 0.346 | | | | |
| 5 | Ape. Stop | Plano | | −0.246 | | | | |
| 6 | Lens 3 | 3.162 | ASP | 0.291 | Plastic | 1.553 | 43.1 | 54.55 |
| 7 | | 3.417 | ASP | 0.218 | | | | |
| 8 | Lens 4 | 6.401 | ASP | 0.312 | Plastic | 1.669 | 19.4 | 27.64 |
| 9 | | 9.598 | ASP | 0.982 | | | | |
| 10 | Lens 5 | −73.037 | ASP | 0.220 | Plastic | 1.669 | 19.4 | −5.13 |
| 11 | | 3.610 | ASP | 0.085 | | | | |
| 12 | Lens 6 | 8.259 | ASP | 0.580 | Plastic | 1.544 | 56.0 | −7.96 |
| 13 | | 2.771 | ASP | 0.050 | | | | |
| 14 | Lens 7 | 2.336 | ASP | 0.534 | Plastic | 1.660 | 20.4 | 5.74 |
| 15 | | 5.543 | ASP | 0.300 | | | | |
| 16 | Filter | Plano | | 0.210 | Glass | 1.517 | 64.2 | — |
| 17 | | Plano | | 0.837 | | | | |
| 18 | Image Surface | Plano | | — | | | | |

*Reference wavelength is d-line 587.6 nm.

TABLE 4

Aspheric Coefficients

| | Surface # | | | | | | |
|---|---|---|---|---|---|---|---|
| | 1 | 2 | 3 | 4 | 6 | 7 | 8 |
| k = | −1.2612E+00 | 3.5922E+01 | −4.9178E+01 | 9.0000E+01 | −6.2015E+01 | −3.2088E+01 | 6.6362E+00 |
| A4 = | 1.2397E−02 | 8.2280E−02 | 2.3930E−01 | 2.9672E−01 | 1.6356E−01 | 6.1535E−02 | 8.3082E−03 |
| A6 = | −8.6520E−06 | −5.3796E−02 | −2.0546E−01 | −1.5298E−01 | −4.6231E−02 | −2.9709E−04 | −4.2510E−03 |
| A8 = | 5.7860E−04 | 1.9921E−02 | 9.5266E−02 | −2.9699E−02 | −8.3804E−02 | −5.7981E−02 | −4.1932E−03 |
| A10 = | −1.9526E−04 | −3.8656E−03 | −2.2277E−02 | 6.5494E−02 | 7.5777E−02 | 4.0629E−02 | −1.7947E−03 |
| A12 = | 7.6078E−06 | 3.2028E−04 | 2.0755E−03 | −1.7053E−02 | −1.4953E−02 | −9.0470E−03 | 8.3887E−04 |
| A14 = | | | | | −1.2857E−03 | | |

| | Surface # | | | | | | |
|---|---|---|---|---|---|---|---|
| | 9 | 10 | 11 | 12 | 13 | 14 | 15 |
| k = | −4.3525E+01 | 9.0000E+01 | −7.8877E+01 | −9.0000E+01 | −4.7915E+01 | −2.4323E+01 | 4.8454E+00 |
| A4 = | −2.4943E−03 | −2.9037E−01 | −3.3896E−01 | −2.9057E−01 | −3.1947E−02 | −8.7716E−02 | −1.2466E−01 |
| A6 = | −3.7914E−03 | 3.8970E−01 | 5.8300E−01 | 4.1739E−01 | 1.3151E−02 | 6.8277E−02 | 6.0322E−02 |
| A8 = | −5.9827E−03 | −5.7975E−01 | −8.1288E−01 | −4.8027E−01 | −1.2673E−02 | −3.7036E−02 | −2.5477E−02 |
| A10 = | −1.0526E−03 | 3.8991E−01 | 6.6174E−01 | 3.3537E−01 | 4.1906E−03 | 9.9832E−03 | 7.7691E−03 |
| A12 = | 7.1390E−05 | −8.7469E−02 | −3.1189E−01 | −1.2401E−01 | −4.9106E−04 | −9.6222E−04 | −1.6514E−03 |
| A14 = | | −6.3956E−02 | 7.6939E−02 | 1.8285E−02 | −1.0879E−06 | −4.7387E−05 | 2.2258E−04 |
| A16 = | | 3.4165E−02 | −7.0655E−03 | | | 9.9129E−06 | −1.3953E−05 |

In the 2nd embodiment, the equation of the aspheric surface profiles of the aforementioned lens elements is the same as the equation of the 1st embodiment. Also, the definitions of these parameters shown in table below are the same as those stated in the 1st embodiment with corresponding values for the 2nd embodiment, so an explanation in this regard will not be provided again.

Moreover, these parameters can be calculated from TABLE 3 and TABLE 4 and satisfy the conditions stated in the table below.

| 2nd Embodiment | | | |
|---|---|---|---|
| f [mm] | 6.07 | \|f2/f1\| | 1.75 |
| Fno. | 1.85 | f/f6 | −0.76 |
| HFOV [deg.] | 22.2 | f/f7 | 1.06 |
| V7 | 20.4 | f/EPD | 1.85 |
| Vmin | 18.4 | TL/f | 1.04 |
| Vp | 56.0/43.1/19.4/20.4 | TL/EPD | 1.92 |
| CT4/T45 | 0.32 | TL/ImgH | 2.41 |
| T56/CT6 | 0.15 | f/ImgH | 2.32 |
| f/R4 | −0.06 | Nv32 | 4 |
| f/R10 | 1.68 | SD/TD | 0.61 |
| f/R11 | 0.74 | Yc21/CT2 | 2.65 |
| R5/R4 | −0.03 | Yc72/Y72 | 0.35 |
| R14/f | 0.91 | \|f/R1\| + \|f/R2\| | 3.39 |
| R3/R1 | −1.85 | \|f/R3\| + \|f/R4\| | 1.63 |
| (R3 + R4)/(R3 − R4) | −1.08 | \|f/R5\| + \|f/R6\| | 3.70 |
| (R5 − R6)/(R5 + R6) | −0.04 | \|f/R7\| + \|f/R8\| | 1.58 |
| (R10 + R11)/(R10 − R11) | −2.55 | \|f/R9\| + \|f/R10\| | 1.76 |
| f/f1 | 1.79 | \|f/R11\| + \|f/R12\| | 2.93 |
| f/f2 | −1.02 | \|f/R13\| + \|f/R14\| | 3.69 |

3rd Embodiment

Figure 3A:
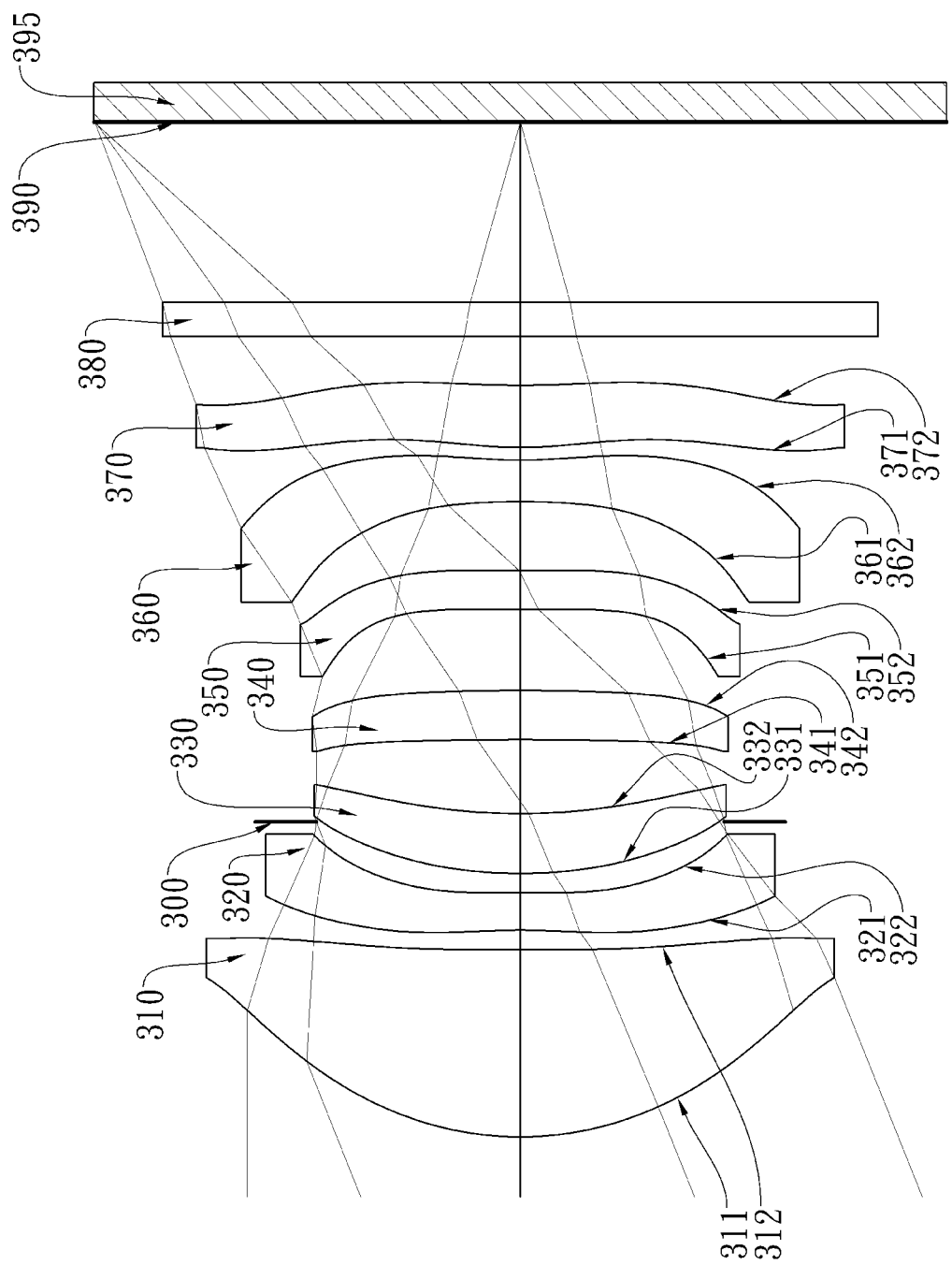
FIG. 3A is a schematic view of an imaging apparatus according to the 3rd embodiment of the present disclosure.
Figure 3B:
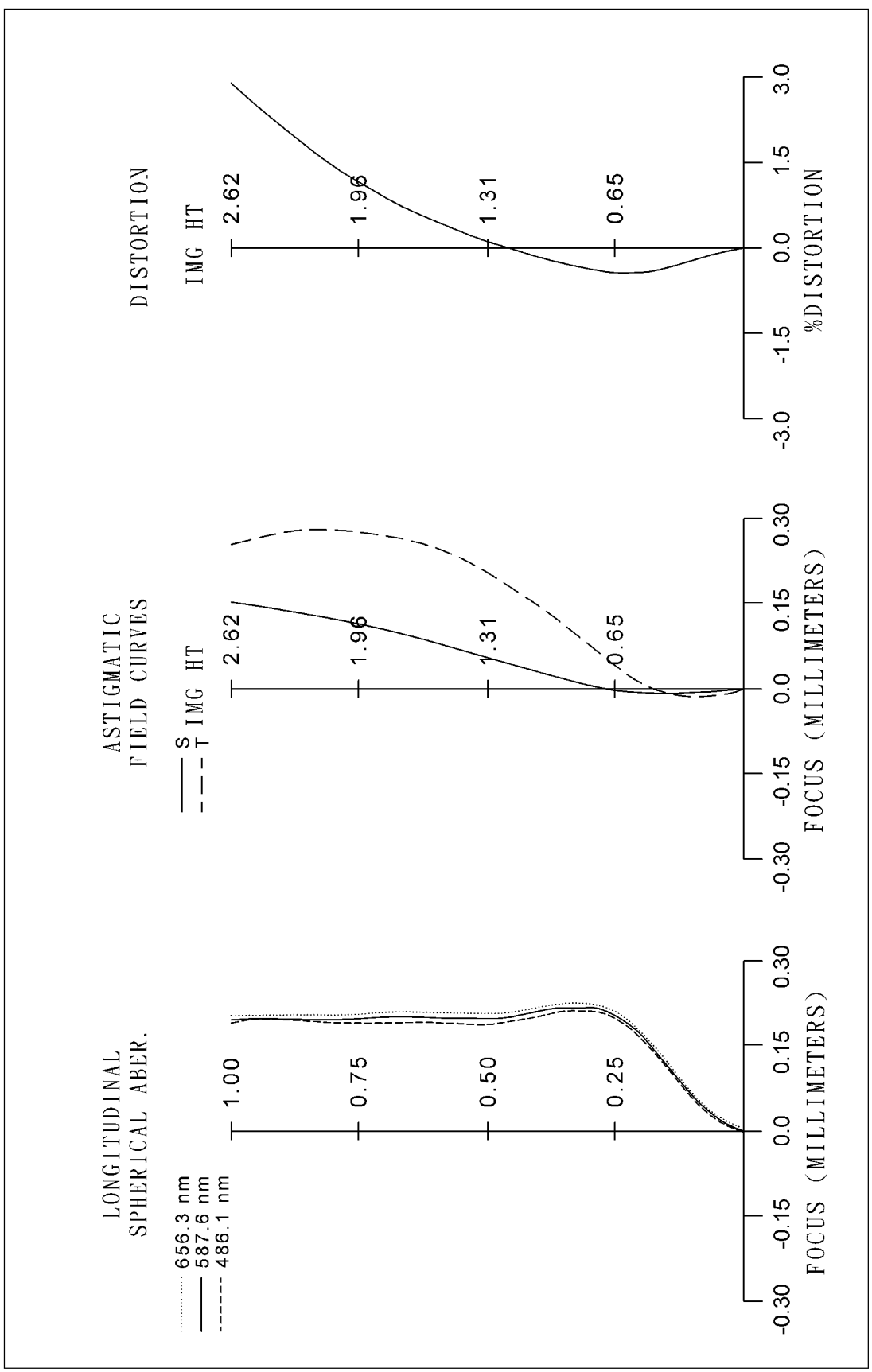
FIG. 3B shows longitudinal spherical aberration curves, astigmatic field curves and a distortion curve of the imaging apparatus according to the 3rd embodiment.

FIG. 3A is a schematic view of an imaging apparatus according to the 3rd embodiment of the present disclosure. FIG. 3B shows, in order from left to right, longitudinal spherical aberration curves, astigmatic field curves and a distortion curve of the imaging apparatus according to the 3rd embodiment.

In FIG. 3A, the imaging apparatus includes a photographing lens system (not otherwise herein labeled) of the present disclosure and an image sensor 395. The photographing lens system includes, in order from an object side to an image side, a first lens element 310, a second lens element 320, an aperture stop 300, a third lens element 330, a fourth lens element 340, a fifth lens element 350, a sixth lens element 360, a seventh lens element 370, and an image surface 390. The image sensor 395 is disposed on or near the image surface 390, and the photographing lens system includes seven lens elements (310, 320, 330, 340, 350, 360 and 370) without any other lens element being inserted between them.

The first lens element 310 with positive refractive power has an object-side surface 311 being convex in a paraxial region thereof, and an image-side surface 312 being convex in a paraxial region thereof. Both the object-side surface 311 and the image-side surface 312 are aspheric. The first lens element 310 is made of plastic material.

The second lens element 320 with negative refractive power has an object-side surface 321 being concave in a paraxial region thereof, and an image-side surface 322 being concave in a paraxial region thereof. Both the object-side surface 321 and the image-side surface 322 are aspheric. The second lens element 320 is made of plastic material.

The third lens element 330 with positive refractive power has an object-side surface 331 being convex in a paraxial region thereof, and an image-side surface 332 being concave in a paraxial region thereof. Both the object-side surface 331 and the image-side surface 332 are aspheric. The third lens element 330 is made of plastic material.

The fourth lens element 340 with positive refractive power has an object-side surface 341 being concave in a paraxial region thereof, and an image-side surface 342 being convex in a paraxial region thereof. Both the object-side surface 341 and the image-side surface 342 are aspheric. The fourth lens element 340 is made of plastic material.

The fifth lens element 350 with positive refractive power has an object-side surface 351 being convex in a paraxial region thereof, and an image-side surface 352 being concave in a paraxial region thereof. Both the object-side surface 351 and the image-side surface 352 are aspheric. The fifth lens element 350 is made of plastic material.

The sixth lens element 360 with negative refractive power has an object-side surface 361 being concave in a paraxial region thereof, and an image-side surface 362 being concave in a paraxial region thereof. Both the object-side surface 361 and the image-side surface 362 are aspheric, and there is at least one inflection point in an off-axis region on the image-side surface 362 thereof. The sixth lens element 360 is made of plastic material.

The seventh lens element 370 with positive refractive power has an object-side surface 371 being convex in a paraxial region thereof, and an image-side surface 372 being concave in a paraxial region thereof. Both the object-side surface 371 and the image-side surface 372 are aspheric, and there is at least one inflection point in an off-axis region on the image-side surface 372 thereof. The seventh lens element 370 is made of plastic material.

The photographing lens system further includes a filter 380 disposed between the seventh lens element 370 and the image surface 390. The filter 380 is made of glass material and does not affect the focal length of the photographing lens system.

The detailed optical data of the 3rd embodiment are shown in TABLE 5, and the aspheric surface data are shown in TABLE 6.

TABLE 5

(3rd Embodiment)
f = 5.99 mm, Fno = 1.78, HFOV = 21.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.995 | ASP | 1.155 | Plastic | 1.545 | 56.0 | 3.58 |
| 2 | | −67.380 | ASP | 0.120 | | | | |
| 3 | Lens 2 | −4.157 | ASP | 0.230 | Plastic | 1.660 | 20.4 | −6.06 |
| 4 | | 108.627 | ASP | 0.439 | | | | |
| 5 | Ape. Stop | Plano | | −0.319 | | | | |

TABLE 5-continued (3rd Embodiment)
f = 5.99 mm, Fno = 1.78, HFOV = 21.8 deg.

| Surface # | | Curvature Radius | | Thickness | Material | Index | Abbe # | Focal Length |
|---|---|---|---|---|---|---|---|---|
| 6 | Lens 3 | 2.717 | ASP | 0.369 | Plastic | 1.535 | 56.3 | 19.39 |
| 7 | | 3.507 | ASP | 0.456 | | | | |
| 8 | Lens 4 | −24.308 | ASP | 0.303 | Plastic | 1.669 | 19.4 | 88.08 |
| 9 | | −17.296 | ASP | 0.500 | | | | |
| 10 | Lens 5 | 16.547 | ASP | 0.240 | Plastic | 1.650 | 21.5 | 191.76 |
| 11 | | 18.969 | ASP | 0.425 | | | | |
| 12 | Lens 6 | −5.944 | ASP | 0.257 | Plastic | 1.559 | 40.4 | −3.26 |
| 13 | | 2.661 | ASP | 0.078 | | | | |
| 14 | Lens 7 | 2.278 | ASP | 0.383 | Plastic | 1.660 | 20.4 | 5.86 |
| 15 | | 5.175 | ASP | 0.300 | | | | |
| 16 | Filter | Plano | | 0.210 | Glass | 1.517 | 64.2 | — |
| 17 | | Plano | | 1.116 | | | | |
| 18 | Image Surface | Plano | | — | | | | |

*Reference wavelength is d-line 587.6 nm.

TABLE 6

Aspheric Coefficients

| Surface # | 1 | 2 | 3 | 4 | 6 | 7 | 8 |
|---|---|---|---|---|---|---|---|
| k = | −1.2380E+00 | −9.0000E+01 | −3.6044E+01 | −6.0260E+01 | −5.1729E+01 | −4.6414E+01 | 7.8510E+01 |
| A4 = | 1.2991E−02 | 7.6529E−02 | 2.4389E−01 | 2.5674E−01 | 1.6779E−01 | 6.0349E−02 | 7.2860E−03 |
| A6 = | 6.8654E−04 | −5.6220E−02 | −2.0423E−01 | −9.0587E−02 | −4.4542E−02 | 4.5544E−05 | −5.1496E−03 |
| A8 = | 4.9266E−04 | 1.9809E−02 | 9.5558E−02 | −7.5192E−02 | −8.3189E−02 | −5.7471E−02 | −4.7994E−03 |
| A10 = | −2.5856E−04 | −3.5038E−03 | −2.2321E−02 | 8.6517E−02 | 7.5965E−02 | 4.0871E−02 | −1.9556E−03 |
| A12 = | −1.1765E−05 | 2.3385E−04 | 2.0651E−03 | −2.1330E−02 | −1.4848E−02 | −9.0353E−03 | 8.1393E−04 |
| A14 = | | | | | −1.1883E−03 | | |

| Surface # | 9 | 10 | 11 | 12 | 13 | 14 | 15 |
|---|---|---|---|---|---|---|---|
| k = | 9.0000E+01 | −7.2955E+01 | 8.8778E+01 | 1.5434E+01 | −9.0000E+01 | −3.5176E+01 | 4.5922E+00 |
| A4 = | −9.8107E−03 | −1.9062E−01 | −1.8949E−01 | −1.5439E−01 | −1.0664E−01 | −1.2809E−01 | −1.6594E−01 |
| A6 = | −5.2464E−03 | 1.6575E−01 | 1.7148E−01 | 8.0536E−02 | 5.4660E−03 | 7.3526E−02 | 1.0508E−01 |
| A8 = | −6.0639E−03 | −3.9210E−01 | −3.6239E−01 | −1.2133E−01 | 4.4982E−02 | −2.6095E−02 | −5.8833E−02 |
| A10 = | −1.0312E−03 | 4.4297E−01 | 4.8765E−01 | 1.7121E−01 | −3.4097E−02 | 6.4102E−03 | 2.4090E−02 |
| A12 = | 7.7258E−05 | −2.2809E−01 | −3.4720E−01 | −1.0613E−01 | 9.4675E−03 | −8.1754E−04 | −5.9823E−03 |
| A14 = | | 6.9248E−03 | 1.1828E−01 | 2.2407E−02 | −9.3212E−04 | 1.6551E−05 | 7.9970E−04 |
| A16 = | | 1.9877E−02 | −1.4596E−02 | | | 3.9705E−06 | −4.4931E−05 |

In the 3rd embodiment, the equation of the aspheric surface profiles of the aforementioned lens elements is the same as the equation of the 1st embodiment. Also, the definitions of these parameters shown in table below are the same as those stated in the 1st embodiment with corresponding values for the 3rd embodiment, so an explanation in this regard will not be provided again.

Moreover, these parameters can be calculated from TABLE 5 and TABLE 6 and satisfy the conditions stated in the table below.

| 3rd Embodiment | | | |
|---|---|---|---|
| f [mm] | 5.99 | |f2/f1| | 1.69 |
| Fno. | 1.78 | f/f6 | −1.84 |
| HFOV [deg.] | 21.8 | f/f7 | 1.02 |
| V7 | 20.4 | f/EPD | 1.78 |
| Vmin | 19.4 | TL/f | 1.04 |
| Vp | 56.0/56.3/ 19.4/21.5/20.4 | TL/EPD | 1.86 |
| CT4/T45 | 0.61 | TL/ImgH | 2.39 |
| T56/CT6 | 1.65 | f/ImgH | 2.29 |
| f/R4 | 0.06 | Nv32 | 4 |
| f/R10 | 0.32 | SD/TD | 0.58 |
| f/R11 | −1.01 | Yc21/CT2 | 2.29 |
| R5/R4 | 0.03 | Yc72/Y72 | 0.333/0.943 |
| R14/f | 0.86 | |f/R1| + |f/R2| | 3.09 |
| R3/R1 | −2.08 | |f/R3| + |f/R4| | 1.50 |
| (R3 + R4)/(R3 − R4) | −0.93 | |f/R5| + |f/R6| | 3.91 |
| (R5 − R6)/(R5 + R6) | −0.13 | |f/R7| + |f/R8| | 0.59 |
| (R10 + R11)/ (R10 − R11) | 0.52 | |f/R9| + |f/R10| | 0.68 |
| f/f1 | 1.67 | |f/R11| + |f/R12| | 3.26 |
| f/f2 | −0.99 | |f/R13| + |f/R14| | 3.79 |

4th Embodiment

Figure 4A:
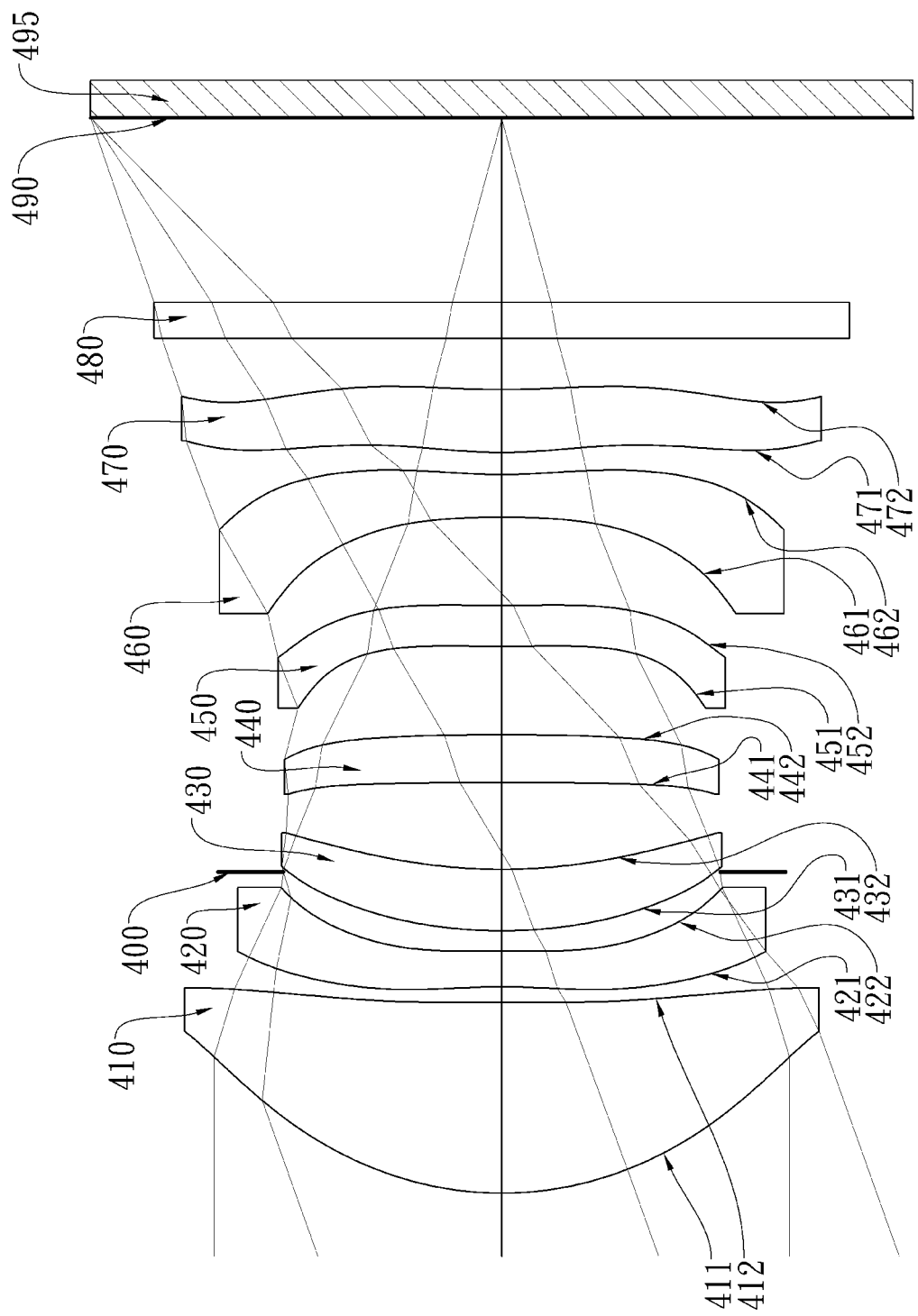
FIG. 4A is a schematic view of an imaging apparatus according to the 4th embodiment of the present disclosure.
Figure 4B:
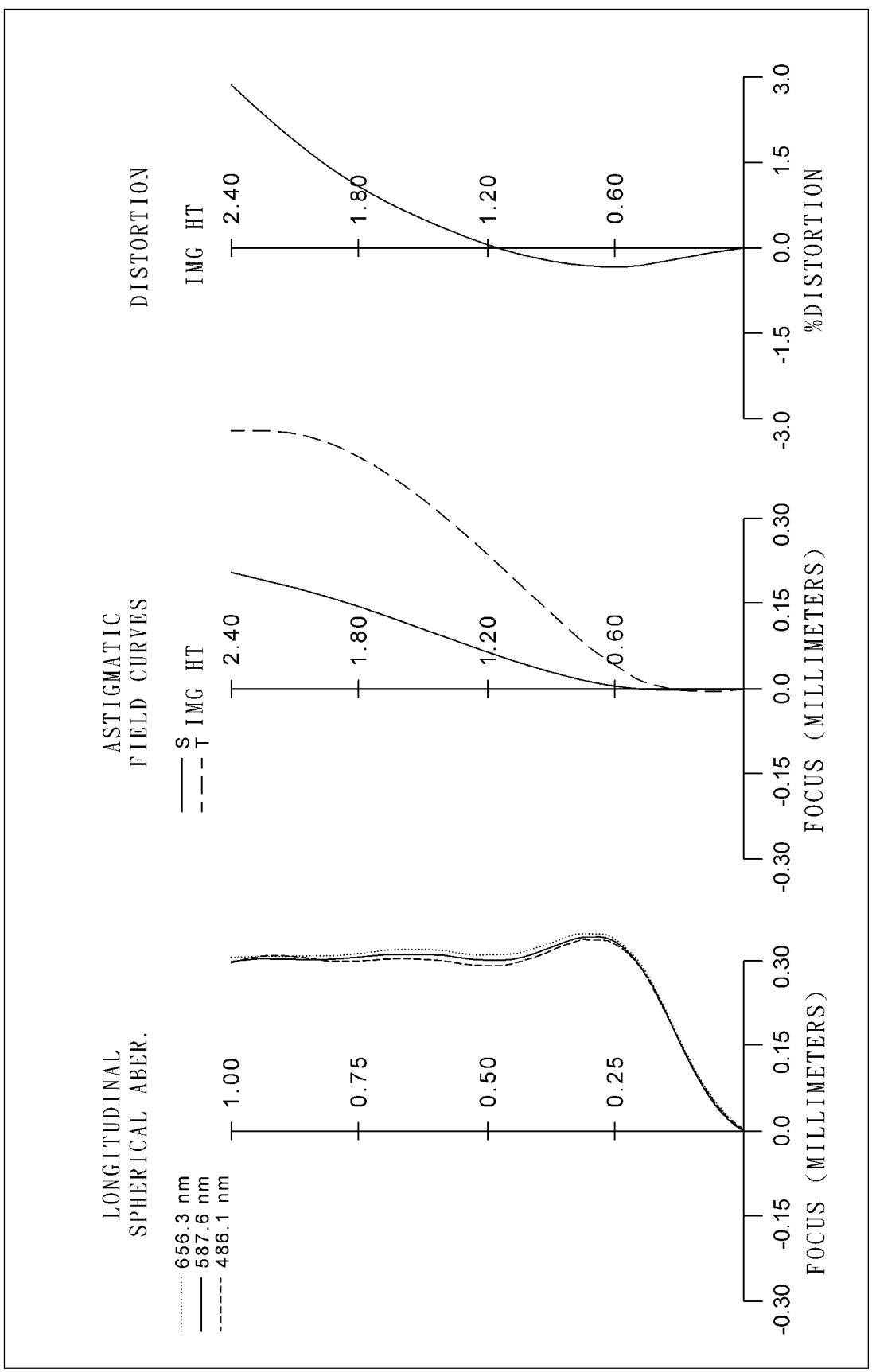
FIG. 4B shows longitudinal spherical aberration curves, astigmatic field curves and a distortion curve of the imaging apparatus according to the 4th embodiment.

FIG. 4A is a schematic view of an imaging apparatus according to the 4th embodiment of the present disclosure. FIG. 4B shows, in order from left to right, longitudinal spherical aberration curves, astigmatic field curves and a distortion curve of the imaging apparatus according to the 4th embodiment.

In FIG. 4A, the imaging apparatus includes a photographing lens system (not otherwise herein labeled) of the present disclosure and an image sensor 495. The photographing lens system includes, in order from an object side to an image side, a first lens element 410, a second lens element 420, an aperture stop 400, a third lens element 430, a fourth lens element 440, a fifth lens element 450, a sixth lens element 460, a seventh lens element 470, and an image surface 490. The image sensor 495 is disposed on or near the image surface 490, and the photographing lens system includes seven lens elements (410, 420, 430, 440, 450, 460 and 470) without any other lens element being inserted between them.

The first lens element 410 with positive refractive power has an object-side surface 411 being convex in a paraxial region thereof, and an image-side surface 412 being convex in a paraxial region thereof. Both the object-side surface 411 and the image-side surface 412 are aspheric. The first lens element 410 is made of plastic material.

The second lens element 420 with negative refractive power has an object-side surface 421 being concave in a paraxial region thereof, and an image-side surface 422 being convex in a paraxial region thereof. Both the object-side surface 421 and the image-side surface 422 are aspheric. The second lens element 420 is made of plastic material.

The third lens element 430 with positive refractive power has an object-side surface 431 being convex in a paraxial region thereof, and an image-side surface 432 being concave in a paraxial region thereof. Both the object-side surface 431 and the image-side surface 432 are aspheric. The third lens element 430 is made of plastic material.

The fourth lens element 440 with positive refractive power has an object-side surface 441 being concave in a paraxial region thereof, and an image-side surface 442 being convex in a paraxial region thereof. Both the object-side surface 441 and the image-side surface 442 are aspheric. The fourth lens element 440 is made of plastic material.

The fifth lens element 450 with positive refractive power has an object-side surface 451 being convex in a paraxial region thereof, and an image-side surface 452 being concave in a paraxial region thereof. Both the object-side surface 451 and the image-side surface 452 are aspheric. The fifth lens element 450 is made of plastic material.

The sixth lens element 460 with negative refractive power has an object-side surface 461 being concave in a paraxial region thereof, and an image-side surface 462 being concave in a paraxial region thereof. Both the object-side surface 461 and the image-side surface 462 are aspheric, and there is at least one inflection point in an off-axis region on the image-side surface 462 thereof. The sixth lens element 460 is made of plastic material.

The seventh lens element 470 with positive refractive power has an object-side surface 471 being convex in a paraxial region thereof, an image-side surface 472 being concave in a paraxial region thereof. Both the object-side surface 471 and the image-side surface 472 are aspheric, and there is at least one inflection point in an off-axis region on the image-side surface 472 thereof. The seventh lens element 470 is made of plastic material.

The photographing lens system further includes a filter 480 disposed between the seventh lens element 470 and the image surface 490. The filter 480 is made of glass material and does not affect a focal length of the photographing lens system.

The detailed optical data of the 4th embodiment are shown in TABLE 7, and the aspheric surface data are shown in TABLE 8.

TABLE 7

(4th Embodiment)
f = 5.96 mm, Fno = 1.77, HFOV = 19.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.970 | ASP | 1.118 | Plastic | 1.545 | 56.0 | 3.53 |
| 2 | | −68.263 | ASP | 0.091 | | | | |
| 3 | Lens 2 | −3.916 | ASP | 0.208 | Plastic | 1.660 | 20.4 | −5.99 |
| 4 | | −444.352 | ASP | 0.465 | | | | |
| 5 | Ape. Stop | Plano | | −0.345 | | | | |
| 6 | Lens 3 | 2.476 | ASP | 0.360 | Plastic | 1.535 | 56.3 | 20.68 |
| 7 | | 3.030 | ASP | 0.509 | | | | |
| 8 | Lens 4 | −31.231 | ASP | 0.280 | Plastic | 1.669 | 19.4 | 73.32 |
| 9 | | −19.151 | ASP | 0.518 | | | | |
| 10 | Lens 5 | 15.601 | ASP | 0.240 | Plastic | 1.650 | 21.5 | 166.38 |
| 11 | | 18.118 | ASP | 0.517 | | | | |
| 12 | Lens 6 | −5.973 | ASP | 0.250 | Plastic | 1.559 | 40.4 | −3.64 |
| 13 | | 3.125 | ASP | 0.129 | | | | |
| 14 | Lens 7 | 2.619 | ASP | 0.369 | Plastic | 1.660 | 20.4 | 7.59 |
| 15 | | 5.183 | ASP | 0.300 | | | | |
| 16 | Filter | Plano | | 0.210 | Glass | 1.517 | 64.2 | — |
| 17 | | Plano | | 1.081 | | | | |
| 18 | Image Surface | Plano | | — | | | | |

*Reference wavelength is d-line 587.6 nm

TABLE 8

Aspheric Coefficients

| Surface # | 1 | 2 | 3 | 4 | 6 | 7 | 8 |
|---|---|---|---|---|---|---|---|
| k = | −1.2314E+00 | 8.2647E+01 | −3.7216E+01 | −9.0000E+01 | −5.6617E+01 | −3.4507E+01 | 9.0000E+01 |
| A4 = | 1.3221E−02 | 7.6955E−02 | 2.4436E−01 | 2.4101E−01 | 1.6859E−01 | 6.2765E−02 | 6.8279E−03 |

TABLE 8-continued

Aspheric Coefficients

| | | | | | | | |
|---|---|---|---|---|---|---|---|
| A6 = | 1.0552E−03 | −5.5984E−02 | −2.0409E−01 | −5.3462E−02 | −4.3779E−02 | 8.3697E−04 | −6.1054E−03 |
| A8 = | 5.6632E−04 | 1.9886E−02 | 9.5686E−02 | −1.1062E−01 | −8.2827E−02 | −5.7161E−02 | −5.0193E−03 |
| A10 = | −2.3979E−04 | −3.4929E−03 | −2.2259E−02 | 1.0338E−01 | 7.6107E−02 | 4.1001E−02 | −1.9390E−03 |
| A12 = | −2.9263E−05 | 2.2425E−04 | 2.0592E−03 | −2.4369E−02 | −1.4790E−02 | −8.9784E−03 | 8.2765E−04 |
| A14 = | | | | | −1.1650E−03 | | |

| Surface # | 9 | 10 | 11 | 12 | 13 | 14 | 15 |
|---|---|---|---|---|---|---|---|
| k = | 8.6014E+01 | −7.7709E+01 | 7.8690E+01 | 1.5385E+01 | −9.0000E+01 | −2.8920E+01 | 4.5642E+00 |
| A4 = | −9.8236E−03 | −1.4007E−01 | −1.4413E−01 | −1.4087E−01 | −1.0524E−01 | −1.5826E−01 | −1.7640E−01 |
| A6 = | −4.9802E−03 | −9.8571E−02 | −9.1945E−02 | 5.6974E−02 | 2.2216E−02 | 1.2571E−01 | 1.1351E−01 |
| A8 = | −6.0764E−03 | 2.4402E−01 | 2.8576E−03 | −7.6418E−02 | 2.7438E−02 | −6.7583E−02 | −5.9318E−02 |
| A10 = | −1.0659E−03 | −4.4178E−01 | 5.9969E−02 | 1.2146E−01 | −2.6806E−02 | 2.6413E−02 | 2.2464E−02 |
| A12 = | 7.6348E−05 | 4.8947E−01 | −6.1862E−02 | −8.3107E−02 | 8.0300E−03 | −6.4101E−03 | −4.9700E−03 |
| A14 = | | −3.0379E−01 | 1.7607E−02 | 1.8716E−02 | −8.1249E−04 | 8.5899E−04 | 5.7002E−04 |
| A16 = | | 7.5240E−02 | 3.2135E−05 | | | −4.9887E−05 | −2.7438E−05 |

In the 4th embodiment, the equation of the aspheric surface profiles of the aforementioned lens elements is the same as the equation of the 1st embodiment. Also, the definitions of these parameters shown in table below are the same as those stated in the 1st embodiment with corresponding values for the 4th embodiment, so an explanation in this regard will not be provided again.

Moreover, these parameters can be calculated from TABLE 7 and TABLE 8 and satisfy the conditions stated in the table below.

| 4th Embodiment | | | |
|---|---|---|---|
| f [mm] | 5.96 | |f2/f1| | 1.69 |
| Fno. | 1.77 | f/f6 | −1.64 |
| HFOV [deg.] | 19.6 | f/f7 | 0.79 |
| V7 | 20.4 | f/EPD | 1.77 |
| Vmin | 19.4 | TL/f | 1.06 |
| Vp | 56.0/56.3/ | TL/EPD | 1.87 |
| | 19.4/21.5/20.4 | | |
| CT4/T45 | 0.54 | TL/ImgH | 2.63 |
| T56/CT6 | 2.07 | f/ImgH | 2.48 |
| f/R4 | −0.01 | Nv32 | 4 |
| f/R10 | 0.33 | SD/TD | 0.60 |
| f/R11 | −1.00 | Yc21/CT2 | 2.58 |
| R5/R4 | −0.01 | Yc72/Y72 | 0.342/0.858 |
| R14/f | 0.87 | |f/R1| + |f/R2| | 3.11 |
| R3/R1 | −1.99 | |f/R3| + |f/R4| | 1.54 |
| (R3 + R4)/(R3 − R4) | −1.02 | |f/R5| + |f/R6| | 4.37 |
| (R5 − R6)/(R5 + R6) | −0.10 | |f/R7| + |f/R8| | 0.50 |
| (R10 + R11)/(R10 − R11) | 0.50 | |f/R9| + |f/R10| | 0.71 |
| f/f1 | 1.69 | |f/R11| + |f/R12| | 2.90 |
| f/f2 | −1.00 | |f/R13| + |f/R14| | 3.43 |

5th Embodiment

Figure 5A:
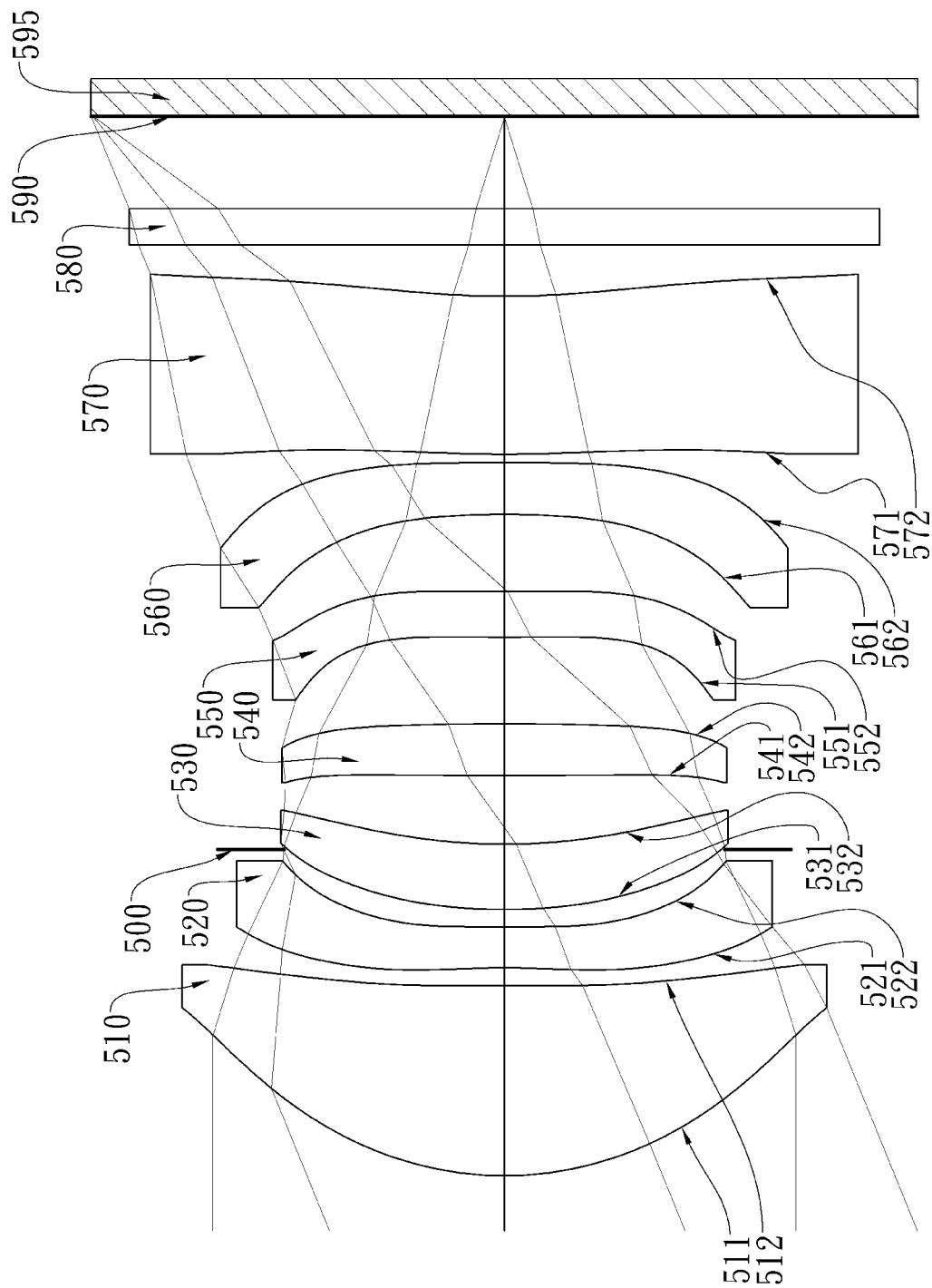
FIG. 5A is a schematic view of an imaging apparatus according to the 5th embodiment of the present disclosure.
Figure 5B:
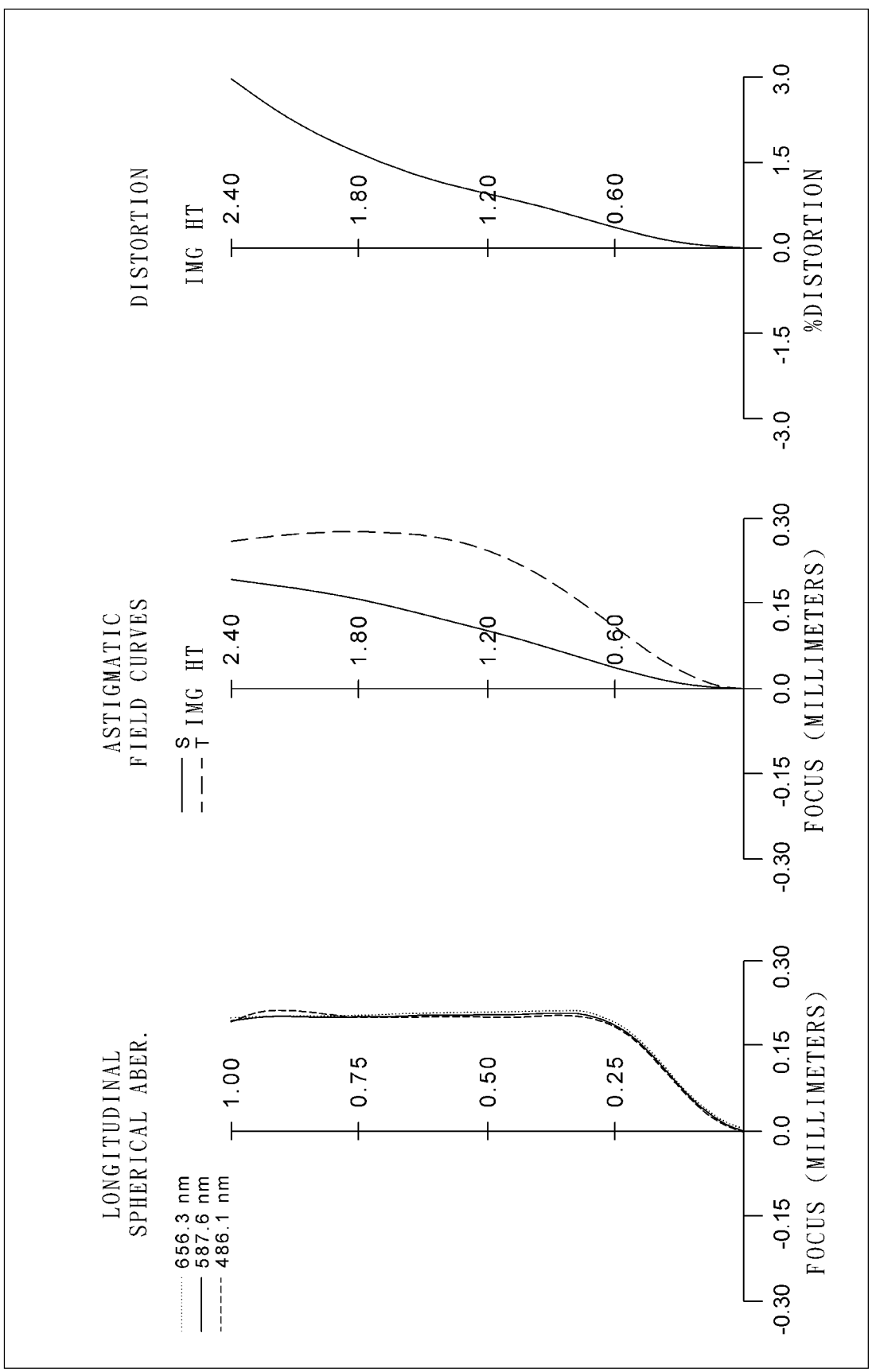
FIG. 5B shows longitudinal spherical aberration curves, astigmatic field curves and a distortion curve of the imaging apparatus according to the 5th embodiment.

FIG. 5A is a schematic view of an imaging apparatus according to the 5th embodiment of the present disclosure. FIG. 5B shows, in order from left to right, longitudinal spherical aberration curves, astigmatic field curves and a distortion curve of the imaging apparatus according to the 5th embodiment.

In FIG. 5A, the imaging apparatus includes a photographing lens system (not otherwise herein labeled) of the present disclosure and an image sensor 595. The photographing lens system includes, in order from an object side to an image side, a first lens element 510, a second lens element 520, an aperture stop 500, a third lens element 530, a fourth lens element 540, a fifth lens element 550, a sixth lens element 560, a seventh lens element 570, and an image surface 590. The image sensor 595 is disposed on or near the image surface 590, and the photographing lens system includes seven lens elements (510, 520, 530, 540, 550, 560 and 570) without any other lens element being inserted between them.

The first lens element 510 with positive refractive power has an object-side surface 511 being convex in a paraxial region thereof, and an image-side surface 512 being convex in a paraxial region thereof. Both the object-side surface 511 and the image-side surface 512 are aspheric. The first lens element 510 is made of plastic material.

The second lens element 520 with negative refractive power has an object-side surface 521 being concave in a paraxial region thereof, and an image-side surface 522 being convex in a paraxial region thereof. Both the object-side surface 521 and the image-side surface 522 are aspheric. The second lens element 520 is made of plastic material.

The third lens element 530 with positive refractive power has an object-side surface 531 being convex in a paraxial region thereof, and an image-side surface 532 being concave in a paraxial region thereof. Both the object-side surface 531 and the image-side surface 532 are aspheric. The third lens element 530 is made of plastic material.

The fourth lens element 540 with positive refractive power has an object-side surface 541 being convex in a paraxial region thereof, and an image-side surface 542 being convex in a paraxial region thereof. Both the object-side surface 541 and the image-side surface 542 are aspheric. The fourth lens element 540 is made of plastic material.

The fifth lens element 550 with positive refractive power has an object-side surface 551 being convex in a paraxial region thereof, and an image-side surface 552 being concave in a paraxial region thereof. Both the object-side surface 551 and the image-side surface 552 are aspheric. The fifth lens element 550 is made of plastic material.

The sixth lens element 560 with negative refractive power has an object-side surface 561 being concave in a paraxial region thereof, and an image-side surface 562 being convex in a paraxial region thereof. Both the object-side surface 561 and the image-side surface 562 are aspheric, and there is at least one inflection point in an off-axis region on the image-side surface 562 thereof. The sixth lens element 560 is made of plastic material.

The seventh lens element 570 with negative refractive power has an object-side surface 571 being convex in a paraxial region thereof, an image-side surface 572 being concave in a paraxial region thereof. Both the object-side surface 571 and the image-side surface 572 are aspheric, and there is at least one inflection point in an off-axis region on the image-side surface 572 thereof. The seventh lens element 570 is made of plastic material.

The photographing lens system further includes a filter 580 disposed between the seventh lens element 570 and the image surface 590. The filter 580 is made of glass material and does not affect the focal length of the photographing lens system.

The detailed optical data of the 5th embodiment are shown in TABLE 9, and the aspheric surface data are shown in TABLE 10.

Moreover, these parameters can be calculated from TABLE 9 and TABLE 10 and satisfy the conditions stated in the table below.

| 5th Embodiment | | | |
|---|---|---|---|
| f [mm] | 5.30 | \|f2/f1\| | 2.03 |
| Fno. | 1.56 | f/f6 | −0.48 |
| HFOV [deg.] | 22.1 | f/f7 | −0.21 |
| V7 | 19.4 | f/EPD | 1.56 |

TABLE 9

(5th Embodiment)
f = 5.30 mm, Fno = 1.56, HFOV = 22.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.975 | ASP | 1.107 | Plastic | 1.545 | 56.0 | 3.59 |
| 2 | | −148.768 | ASP | 0.106 | | | | |
| 3 | Lens 2 | −4.649 | ASP | 0.239 | Plastic | 1.669 | 19.4 | −7.30 |
| 4 | | −98.319 | ASP | 0.450 | | | | |
| 5 | Ape. Stop | Plano | | −0.349 | | | | |
| 6 | Lens 3 | 3.049 | ASP | 0.381 | Plastic | 1.535 | 56.3 | 54.13 |
| 7 | | 3.259 | ASP | 0.401 | | | | |
| 8 | Lens 4 | 121.023 | ASP | 0.301 | Plastic | 1.669 | 19.4 | 32.76 |
| 9 | | −26.743 | ASP | 0.506 | | | | |
| 10 | Lens 5 | 14.226 | ASP | 0.266 | Plastic | 1.650 | 21.5 | 557.62 |
| 11 | | 14.698 | ASP | 0.451 | | | | |
| 12 | Lens 6 | −6.221 | ASP | 0.301 | Plastic | 1.559 | 40.4 | −11.14 |
| 13 | | −8928.571 | ASP | 0.050 | | | | |
| 14 | Lens 7 | 7.282 | ASP | 0.922 | Plastic | 1.669 | 19.4 | −25.43 |
| 15 | | 4.840 | ASP | 0.300 | | | | |
| 16 | Filter | Plano | | 0.210 | Glass | 1.517 | 64.2 | — |
| 17 | | Plano | | 0.539 | | | | |
| 18 | Image Surface | Plano | | — | | | | |

*Reference wavelength is d-line 587.6 nm.

TABLE 10

Aspheric Coefficients

| Surface # | 1 | 2 | 3 | 4 | 6 | 7 | 8 |
|---|---|---|---|---|---|---|---|
| k = | −1.2617E+00 | −9.0000E+01 | −2.1312E+01 | 9.0000E+01 | −6.8857E+01 | −3.9490E+01 | −9.0000E+01 |
| A4 = | 1.3607E−02 | 7.8465E−02 | 2.4879E−01 | 2.4528E−01 | 1.6984E−01 | 6.1010E−02 | 7.1124E−03 |
| A6 = | 1.8875E−03 | −5.6088E−02 | −2.0497E−01 | −6.9798E−02 | −4.3052E−02 | 1.8475E−05 | −5.6465E−03 |
| A8 = | 2.2419E−04 | 1.9913E−02 | 9.5937E−02 | −9.0745E−02 | −8.2591E−02 | −5.7425E−02 | −4.9416E−03 |
| A10 = | −1.9240E−04 | −3.3474E−03 | −2.2014E−02 | 9.4470E−02 | 7.6158E−02 | 4.0911E−02 | −1.9044E−03 |
| A12 = | −2.5007E−05 | 1.9503E−04 | 2.0150E−03 | −2.2524E−02 | −1.4784E−02 | −9.0080E−03 | 8.1273E−04 |
| A14 = | | | | | −1.1511E−03 | | |

| Surface # | 9 | 10 | 11 | 12 | 13 | 14 | 15 |
|---|---|---|---|---|---|---|---|
| k = | 2.2317E+01 | −3.6931E+01 | 8.9099E+01 | 1.5813E+01 | −1.0000E+00 | −1.7632E+00 | 2.4271E+00 |
| A4 = | −8.8191E−03 | −1.8772E−01 | −1.5746E−01 | −1.0467E−01 | −1.0157E−01 | −8.0992E−02 | −5.1554E−02 |
| A6 = | −4.7929E−03 | 2.2946E−01 | 7.7643E−02 | 5.4011E−02 | 4.6633E−02 | 6.1780E−02 | 1.6051E−02 |
| A8 = | −5.9960E−03 | −6.0495E−01 | −1.5671E−01 | −9.1752E−02 | −1.3006E−02 | −3.2835E−02 | −4.6979E−03 |
| A10 = | −1.0362E−03 | 8.0463E−01 | 1.9695E−01 | 1.0983E−01 | −2.8077E−03 | 1.0126E−02 | 1.0991E−03 |
| A12 = | 9.1305E−05 | −5.9536E−01 | −1.3058E−01 | −6.1168E−02 | 1.4660E−03 | −1.5965E−03 | −1.8025E−04 |
| A14 = | | 2.1657E−01 | 4.1627E−02 | 1.2252E−02 | −1.2849E−04 | 1.0041E−04 | 1.7190E−05 |
| A16 = | | −2.9059E−02 | −4.4349E−03 | | | 2.5152E−07 | −7.0039E−07 |

In the 5th embodiment, the equation of the aspheric surface profiles of the aforementioned lens elements is the same as the equation of the 1st embodiment. Also, the definitions of these parameters shown in table below are the same as those stated in the 1st embodiment with corresponding values for the 5th embodiment, so an explanation in this regard will not be provided again.

-continued

| 5th Embodiment | | | |
|---|---|---|---|
| Vmin | 19.4 | TL/f | 1.17 |
| Vp | 56.0/56.3/19.4/21.5 | TL/EPD | 1.82 |
| CT4/T45 | 0.59 | TL/ImgH | 2.58 |

-continued

| 5th Embodiment | | | |
|---|---|---|---|
| T56/CT6 | 1.50 | f/ImgH | 2.21 |
| f/R4 | −0.05 | Nv32 | 4 |
| f/R10 | 0.36 | SD/TD | 0.63 |
| f/R11 | −0.85 | Yc21/CT2 | 2.17 |
| R5/R4 | −0.03 | Yc72/Y72 | — |
| R14/f | 0.91 | \|f/R1\| + \|f/R2\| | 2.72 |
| R3/R1 | −2.35 | \|f/R3\| + \|f/R4\| | 1.19 |
| (R3 + R4)/(R3 − R4) | −1.10 | \|f/R5\| + \|f/R6\| | 3.37 |
| (R5 − R6)/(R5 + R6) | −0.03 | \|f/R7\| + \|f/R8\| | 0.24 |
| (R10 + R11)/(R10 − R11) | 0.41 | \|f/R9\| + \|f/R10\| | 0.73 |
| f/f1 | 1.48 | \|f/R11\| + \|f/R12\| | 0.85 |
| f/f2 | −0.73 | \|f/R13\| + \|f/R14\| | 1.82 |

6th Embodiment

Figure 6A:
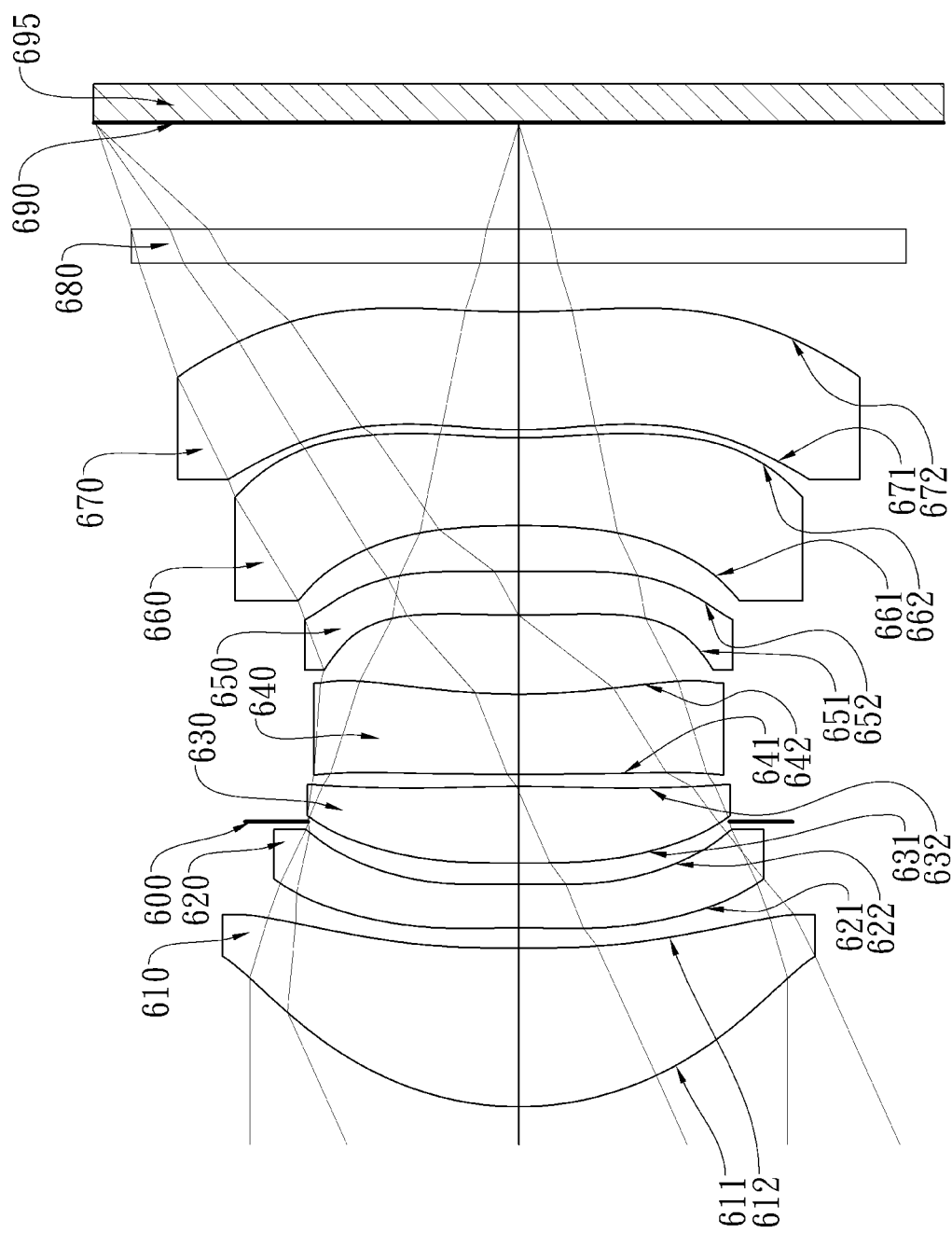
FIG. 6A is a schematic view of an imaging apparatus according to the 6th embodiment of the present disclosure.
Figure 6B:
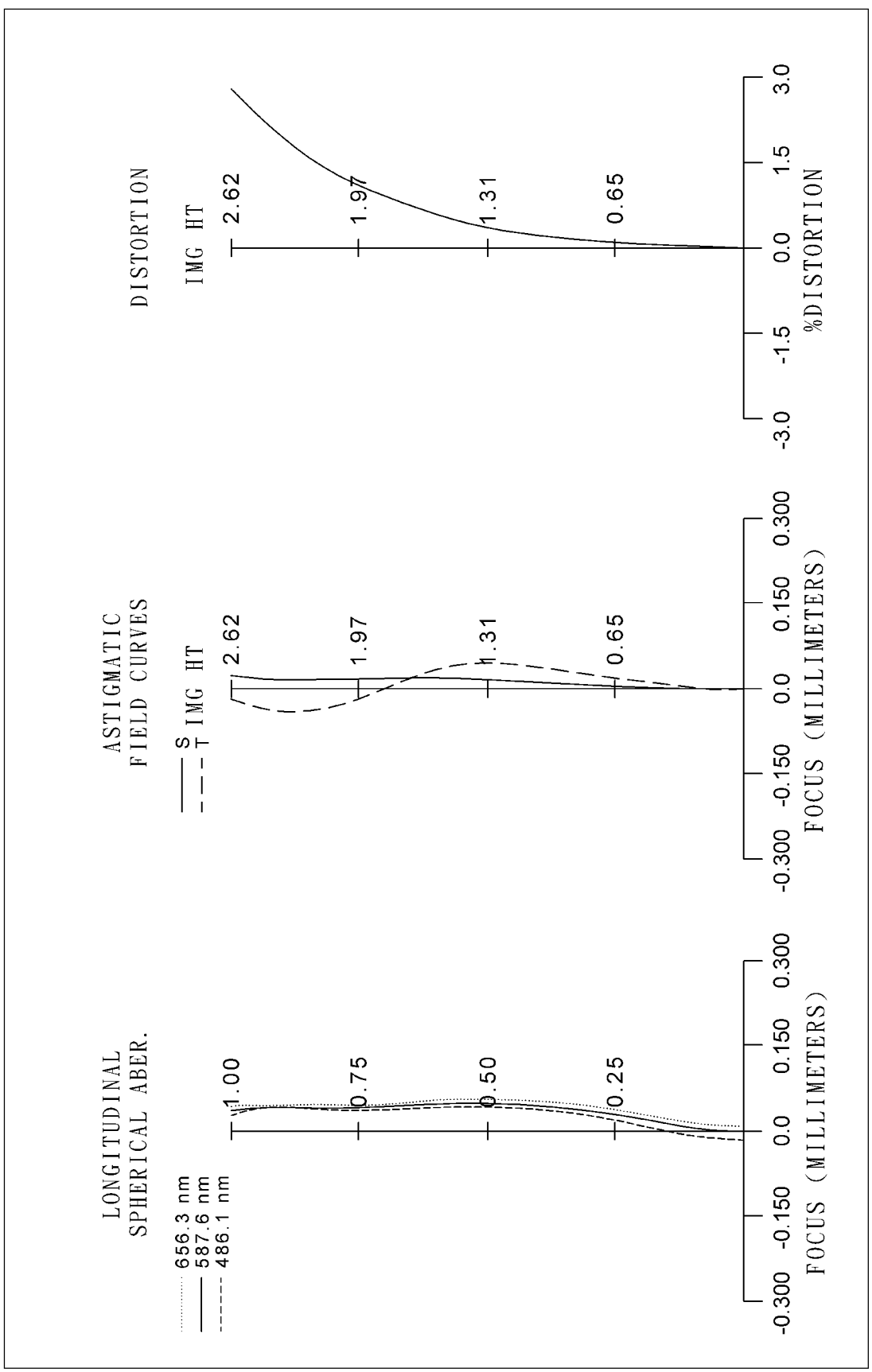
FIG. 6B shows longitudinal spherical aberration curves, astigmatic field curves and a distortion curve of the imaging apparatus according to the 6th embodiment.

FIG. 6A is a schematic view of an imaging apparatus according to the 6th embodiment of the present disclosure. FIG. 6B shows, in order from left to right, longitudinal spherical aberration curves, astigmatic field curves and a distortion curve of the imaging apparatus according to the 6th embodiment.

In FIG. 6A, the imaging apparatus includes a photographing lens system (not otherwise herein labeled) of the present disclosure and an image sensor 695. The photographing lens system includes, in order from an object side to an image side, a first lens element 610, a second lens element 620, an aperture stop 600, a third lens element 630, a fourth lens element 640, a fifth lens element 650, a sixth lens element 660, a seventh lens element 670, and an image surface 690. The image sensor 695 is disposed on or near the image surface 690, and the photographing lens system includes seven lens elements (610, 620, 630, 640, 650, 660 and 670) without any other lens element being inserted between them.

The first lens element 610 with positive refractive power has an object-side surface 611 being convex in a paraxial region thereof, and an image-side surface 612 being concave in a paraxial region thereof. Both the object-side surface 611 and the image-side surface 612 are aspheric. The first lens element 610 is made of plastic material.

The second lens element 620 with negative refractive power has an object-side surface 621 being concave in a paraxial region thereof, and an image-side surface 622 being convex in a paraxial region thereof. Both the object-side surface 621 and the image-side surface 622 are aspheric. The second lens element 620 is made of plastic material.

The third lens element 630 with positive refractive power has an object-side surface 631 being convex in a paraxial region thereof, and an image-side surface 632 being convex in a paraxial region thereof. Both the object-side surface 631 and the image-side surface 632 are aspheric. The third lens element 630 is made of plastic material.

The fourth lens element 640 with negative refractive power has an object-side surface 641 being convex in a paraxial region thereof, and an image-side surface 642 being concave in a paraxial region thereof. Both the object-side surface 641 and the image-side surface 642 are aspheric. The fourth lens element 640 is made of plastic material.

The fifth lens element 650 with positive refractive power has an object-side surface 651 being convex in a paraxial region thereof, and an image-side surface 652 being concave in a paraxial region thereof. Both the object-side surface 651 and the image-side surface 652 are aspheric. The fifth lens element 650 is made of plastic material.

The sixth lens element 660 with negative refractive power has an object-side surface 661 being concave in a paraxial region thereof, and an image-side surface 662 being concave in a paraxial region thereof. Both the object-side surface 661 and the image-side surface 662 are aspheric, and there is at least one inflection point in an off-axis region on the image-side surface 662 thereof. The sixth lens element 660 is made of plastic material.

The sixth lens element 670 with positive refractive power has an object-side surface 671 being convex in a paraxial region thereof, an image-side surface 672 being concave in a paraxial region thereof. Both the object-side surface 671 and the image-side surface 672 are aspheric, and there is at least one inflection point in an off-axis region on the image-side surface 672 thereof. The seventh lens element 670 is made of plastic material.

The photographing lens system further includes a filter 680 disposed between the seventh lens element 670 and the image surface 690. The filter 680 is made of glass material and does not affect a focal length of the photographing lens system.

The detailed optical data of the 6th embodiment are shown in TABLE 11, and the aspheric surface data are shown in TABLE 12.

TABLE 11

(6th Embodiment)
f = 5.58 mm, Fno = 1.68, HFOV = 24.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.922 | ASP | 0.980 | Plastic | 1.545 | 56.0 | 4.09 |
| 2 | | 11.449 | ASP | 0.125 | | | | |
| 3 | Lens 2 | −11.473 | ASP | 0.269 | Plastic | 1.660 | 20.4 | −31.94 |
| 4 | | −25.410 | ASP | 0.389 | | | | |
| 5 | Ape. Stop | Plano | | −0.257 | | | | |
| 6 | Lens 3 | 13.917 | ASP | 0.474 | Plastic | 1.535 | 56.3 | 11.23 |
| 7 | | −10.434 | ASP | 0.075 | | | | |
| 8 | Lens 4 | 33.477 | ASP | 0.496 | Plastic | 1.669 | 19.4 | −6.59 |
| 9 | | 3.875 | ASP | 0.490 | | | | |
| 10 | Lens 5 | 8.110 | ASP | 0.269 | Plastic | 1.650 | 21.5 | 25.38 |
| 11 | | 15.731 | ASP | 0.284 | | | | |
| 12 | Lens 6 | −5.607 | ASP | 0.542 | Plastic | 1.559 | 40.4 | −3.38 |
| 13 | | 2.946 | ASP | 0.050 | | | | |
| 14 | Lens 7 | 2.494 | ASP | 0.730 | Plastic | 1.660 | 20.4 | 6.48 |
| 15 | | 5.287 | ASP | 0.300 | | | | |
| 16 | Filter | Plano | | 0.210 | Glass | 1.517 | 64.2 | — |

TABLE 11-continued (6th Embodiment)
f = 5.58 mm, Fno = 1.68, HFOV = 24.2 deg.

| Surface # | | Curvature Radius | Thickness | Material | Index | Abbe # | Focal Length |
|---|---|---|---|---|---|---|---|
| 17 | | Plano | 0.659 | | | | |
| 18 | Image Surface | Plano | — | | | | |

*Reference wavelength is d-line 587.6 nm.

TABLE 12

| Aspheric Coefficients | | | | | | | |
|---|---|---|---|---|---|---|---|
| Surface # | 1 | 2 | 3 | 4 | 6 | 7 | 8 |
| k = | −1.1644E+00 | −1.4190E+01 | −6.2685E+00 | 5.3195E+00 | −9.0000E+01 | −9.0000E+01 | 9.0000E+01 |
| A4 = | 1.3997E−02 | 7.7025E−02 | 2.4738E−01 | 3.1288E−01 | 1.6856E−01 | 5.8463E−02 | 6.9751E−03 |
| A6 = | 9.1327E−04 | −5.6180E−02 | −2.0274E−01 | −1.9493E−01 | −4.4196E−02 | 2.9579E−03 | −6.9114E−03 |
| A8 = | 5.7735E−04 | 1.9924E−02 | 9.5977E−02 | 1.2311E−02 | −8.3438E−02 | −5.5966E−02 | −4.4441E−03 |
| A10 = | −2.4117E−04 | −3.5089E−03 | −2.2216E−02 | 4.7786E−02 | 7.5623E−02 | 4.1198E−02 | −1.1247E−03 |
| A12 = | −5.1428E−05 | 2.0688E−04 | 2.0711E−03 | −1.5039E−02 | −1.4962E−02 | −9.2148E−03 | 1.3786E−03 |
| A14 = | | | | | −1.1290E−03 | | |

| Surface # | 9 | 10 | 11 | 12 | 13 | 14 | 15 |
|---|---|---|---|---|---|---|---|
| k = | −2.7299E+01 | 4.8201E+00 | 8.8459E+01 | 1.4137E+01 | −9.0000E+01 | −4.9670E+01 | 4.4507E+00 |
| A4 = | −4.9780E−03 | −1.7446E−01 | −1.7104E−01 | −5.9357E−02 | −1.1486E−01 | −1.4022E−01 | −1.2411E−01 |
| A6 = | −2.7929E−03 | 1.2764E−01 | 1.0774E−01 | −3.6053E−02 | 6.9733E−02 | 6.1976E−02 | 5.5261E−02 |
| A8 = | −6.3363E−03 | −2.7560E−01 | −2.7204E−01 | −2.9399E−02 | −2.7229E−02 | 7.0210E−03 | −2.2568E−02 |
| A10 = | −1.4249E−03 | 2.2270E−01 | 3.9865E−01 | 1.2070E−01 | 2.4416E−03 | −2.8956E−02 | 6.1142E−03 |
| A12 = | −3.7576E−05 | −2.0121E−02 | −3.0043E−01 | −8.5316E−02 | 8.2074E−04 | 1.5123E−02 | −1.0618E−03 |
| A14 = | | −9.4253E−02 | 1.1010E−01 | 1.8429E−02 | −1.5222E−04 | −3.2610E−03 | 1.1718E−04 |
| A16 = | | 4.0442E−02 | −1.4978E−02 | | | 2.5810E−04 | −6.8879E−06 |

In the 6th embodiment, the equation of the aspheric surface profiles of the aforementioned lens elements is the same as the equation of the 1st embodiment. Also, the definitions of these parameters shown in table below are the same as those stated in the 1st embodiment with corresponding values for the 6th embodiment, so an explanation in this regard will not be provided again.

Moreover, these parameters can be calculated from TABLE 11 and TABLE 12 and satisfy the conditions stated in the table below.

| 6th Embodiment | | | |
|---|---|---|---|
| f [mm] | 5.58 | |f2/f1| | 7.81 |
| Fno. | 1.68 | f/f6 | −1.65 |
| HFOV [deg.] | 24.2 | f/f7 | 0.86 |
| V7 | 20.4 | f/EPD | 1.68 |
| Vmin | 19.4 | TL/f | 1.09 |
| Vp | 56.0/56.3/21.5/20.4 | TL/EPD | 1.83 |
| CT4/T45 | 1.01 | TL/ImgH | 2.32 |
| T56/CT6 | 0.52 | f/ImgH | 2.13 |
| f/R4 | −0.22 | Nv32 | 4 |
| f/R10 | 0.35 | SD/TD | 0.64 |
| f/R11 | −1.00 | Yc21/CT2 | 1.17 |
| R5/R4 | −0.55 | Yc72/Y72 | 0.36 |
| R14/f | 0.95 | |f/R1| + |f/R2| | 3.39 |
| R3/R1 | −5.97 | |f/R3| + |f/R4| | 0.71 |
| (R3 + R4)/(R3 − R4) | −2.65 | |f/R5| + |f/R6| | 0.94 |
| (R5 − R6)/(R5 + R6) | 6.99 | |f/R7| + |f/R8| | 1.61 |
| (R10 + R11)/(R10 − R11) | 0.47 | |f/R9| + |f/R10| | 1.04 |
| f/f1 | 1.36 | |f/R11| + |f/R12| | 2.89 |
| f/f2 | −0.17 | |f/R13| + |f/R14| | 3.29 |

7th Embodiment

Figure 7A:
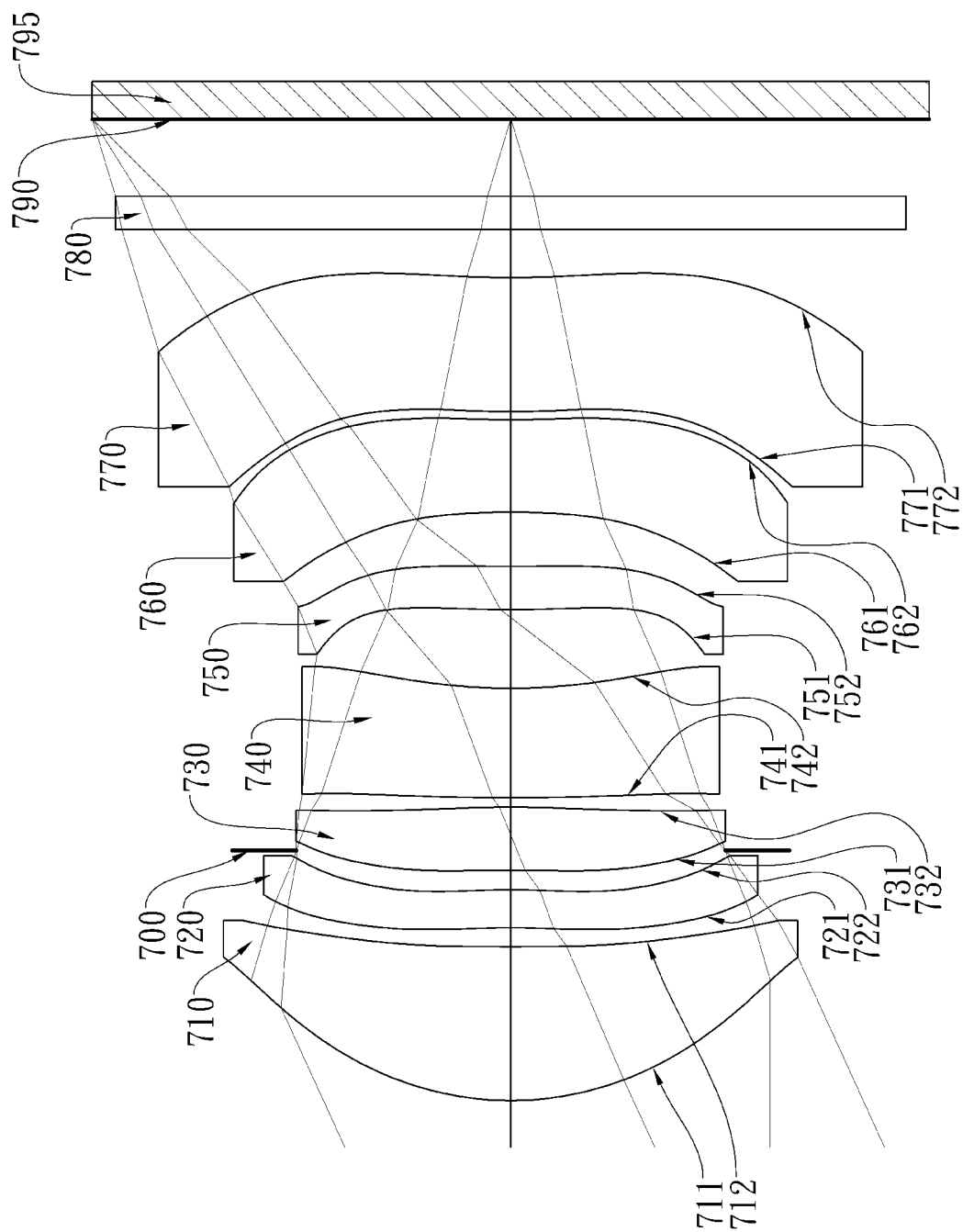
FIG. 7A is a schematic view of an imaging apparatus according to the 7th embodiment of the present disclosure.
Figure 7B:
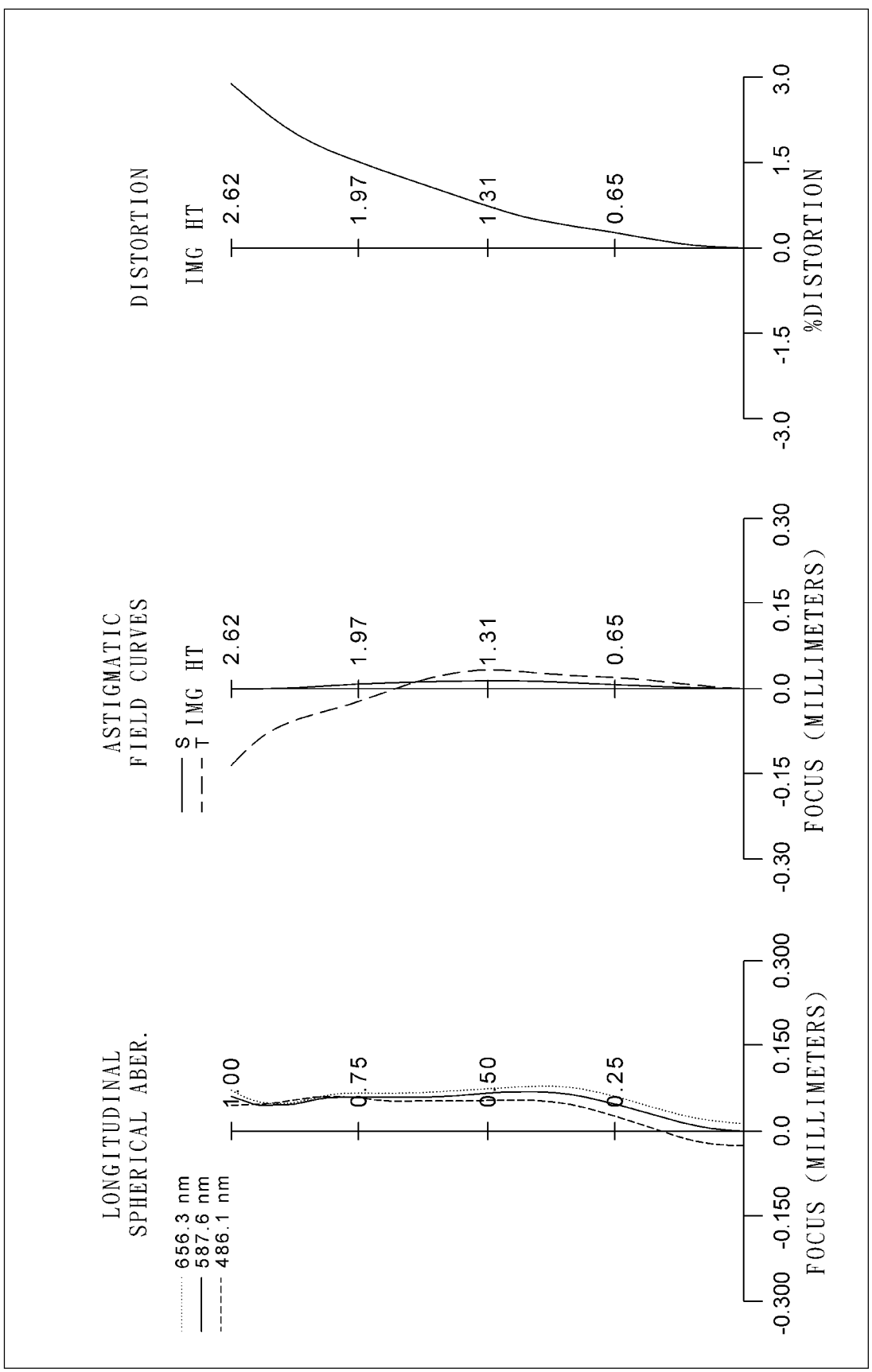
FIG. 7B shows longitudinal spherical aberration curves, astigmatic field curves and a distortion curve of the imaging apparatus according to the 7th embodiment.

FIG. 7A is a schematic view of an imaging apparatus according to the 7th embodiment of the present disclosure. FIG. 7B shows, in order from left to right, longitudinal spherical aberration curves, astigmatic field curves and a distortion curve of the imaging apparatus according to the 7th embodiment.

In FIG. 7A, the imaging apparatus includes a photographing lens system (not otherwise herein labeled) of the present disclosure and an image sensor 795. The photographing lens system includes, in order from an object side to an image side, a first lens element 710, a second lens element 720, an aperture stop 700, a third lens element 730, a fourth lens element 740, a fifth lens element 750, a sixth lens element 760, a seventh lens element 770, and an image surface 790. The image sensor 795 is disposed on or near the image surface 790, and the photographing lens system includes seven lens elements (710, 720, 730, 740, 750, 760 and 770) without any other lens element being inserted between them.

The first lens element 710 with positive refractive power has an object-side surface 711 being convex in a paraxial region thereof, and an image-side surface 712 being concave in a paraxial region thereof. Both the object-side surface 711 and the image-side surface 712 are aspheric. The first lens element 710 is made of plastic material.

The second lens element 720 with positive refractive power has an object-side surface 721 being concave in a paraxial region thereof, and an image-side surface 722 being convex in a paraxial region thereof. Both the object-side surface 721 and the image-side surface 722 are aspheric. The second lens element 720 is made of plastic material.

The third lens element 730 with positive refractive power has an object-side surface 731 being concave in a paraxial region thereof, and an image-side surface 732 being convex in a paraxial region thereof. Both the object-side surface 731 and the image-side surface 732 are aspheric. The third lens element 730 is made of plastic material.

The fourth lens element 740 with negative refractive power has an object-side surface 741 being convex in a paraxial region thereof, and an image-side surface 742 being concave in a paraxial region thereof. Both the object-side surface 741 and the image-side surface 742 are aspheric. The fourth lens element 740 is made of plastic material.

The fifth lens element 750 with positive refractive power has an object-side surface 751 being convex in a paraxial region thereof, and an image-side surface 752 being concave in a paraxial region thereof. Both the object-side surface 751 and the image-side surface 752 are aspheric. The fifth lens element 750 is made of plastic material.

The sixth lens element 760 with negative refractive power has an object-side surface 761 being concave in a paraxial region thereof, and an image-side surface 762 being concave in a paraxial region thereof. Both the object-side surface 761 and the image-side surface 762 are aspheric, and there is at least one inflection point in an off-axis region on the image-side surface 762 thereof. The sixth lens element 760 is made of plastic material.

The seventh lens element 770 with positive refractive power has an object-side surface 771 being convex in a paraxial region thereof, an image-side surface 772 being concave in a paraxial region thereof. Both the object-side surface 771 and the image-side surface 772 are aspheric, and there is at least one inflection point in an off-axis region on the image-side surface 772 thereof. The seventh lens element 770 is made of plastic material.

The photographing lens system further includes a filter 780 disposed between the seventh lens element 770 and the image surface 790. The filter 780 is made of glass material and does not affect the focal length of the photographing lens system.

The detailed optical data of the 7th embodiment are shown in TABLE 13, and the aspheric surface data are shown in TABLE 14.

TABLE 13

(7th Embodiment)
f = 5.50 mm, Fno = 1.69, HFOV = 24.5 deg.

| Surface # |  | Curvature Radius |  | Thickness | Material | Index | Abbe # | Focal Length |
|---|---|---|---|---|---|---|---|---|
| 0 | Object | Plano |  | Infinity |  |  |  |  |
| 1 | Lens 1 | 1.964 | ASP | 0.964 | Plastic | 1.530 | 55.8 | 3.89 |
| 2 |  | 34.869 | ASP | 0.119 |  |  |  |  |
| 3 | Lens 2 | −5.243 | ASP | 0.238 | Plastic | 1.660 | 20.4 | 58.25 |
| 4 |  | −4.697 | ASP | 0.248 |  |  |  |  |
| 5 | Ape. Stop | Plano |  | −0.125 |  |  |  |  |
| 6 | Lens 3 | −10.137 | ASP | 0.395 | Plastic | 1.530 | 55.8 | 45.91 |
| 7 |  | −7.253 | ASP | 0.060 |  |  |  |  |
| 8 | Lens 4 | 19.704 | ASP | 0.686 | Plastic | 1.669 | 19.4 | −6.35 |
| 9 |  | 3.446 | ASP | 0.493 |  |  |  |  |
| 10 | Lens 5 | 6.325 | ASP | 0.271 | Plastic | 1.650 | 21.5 | 17.98 |
| 11 |  | 13.538 | ASP | 0.340 |  |  |  |  |
| 12 | Lens 6 | −5.573 | ASP | 0.580 | Plastic | 1.559 | 40.4 | −4.75 |
| 13 |  | 5.258 | ASP | 0.050 |  |  |  |  |
| 14 | Lens 7 | 3.992 | ASP | 0.841 | Plastic | 1.660 | 20.4 | 19.06 |
| 15 |  | 5.357 | ASP | 0.300 |  |  |  |  |
| 16 | Filter | Plano |  | 0.210 | Glass | 1.517 | 64.2 | — |
| 17 |  | Plano |  | 0.482 |  |  |  |  |
| 18 | Image Surface | Plano |  | — |  |  |  |  |

*Reference wavelength is d-line 587.6 nm.

TABLE 14

Aspheric Coefficients

| Surface # | 1 | 2 | 3 | 4 | 6 | 7 | 8 |
|---|---|---|---|---|---|---|---|
| k = | −1.1766E+00 | −8.9928E+01 | −3.1782E+00 | 3.7454E+00 | −8.0777E+01 | −3.7071E+01 | 8.9974E+01 |
| A4 = | 1.3929E−02 | 7.6136E−02 | 2.4629E−01 | 3.2016E−01 | 1.7167E−01 | 5.8358E−02 | 7.4380E−03 |
| A6 = | 1.1639E−03 | −5.5889E−02 | −2.0291E−01 | −2.0426E−01 | −4.4762E−02 | 3.2708E−03 | −6.6100E−03 |
| A8 = | 5.4402E−04 | 2.0186E−02 | 9.5981E−02 | 3.6314E−02 | −8.3928E−02 | −5.5922E−02 | −4.0936E−03 |
| A10 = | −2.5767E−04 | −3.3967E−03 | −2.2192E−02 | 2.8133E−02 | 7.5294E−02 | 4.1098E−02 | −9.3649E−04 |
| A12 = | −4.3533E−05 | 2.0645E−04 | 2.0807E−03 | −1.0183E−02 | −1.5122E−02 | −9.3280E−03 | 1.3524E−03 |
| A14 = |  |  |  |  | −1.1672E−03 |  |  |

| Surface # | 9 | 10 | 11 | 12 | 13 | 14 | 15 |
|---|---|---|---|---|---|---|---|
| k = | −1.5442E+01 | 1.1569E+01 | 8.9820E+01 | 1.3098E+01 | −8.6990E+01 | −5.4316E+01 | 4.3372E+00 |
| A4 = | 4.1938E−03 | −1.7591E−01 | −1.9126E−01 | −9.3141E−02 | −2.3569E−01 | −2.2280E−01 | −1.0383E−01 |
| A6 = | 6.0056E−04 | 2.4407E−01 | 2.5799E−01 | 8.0951E−02 | 2.8659E−01 | 2.1367E−01 | 4.3672E−02 |
| A8 = | −5.7399E−03 | −6.1906E−01 | −5.8901E−01 | −1.8979E−01 | −2.4173E−01 | −1.3855E−01 | −1.8423E−02 |

TABLE 14-continued

| Aspheric Coefficients | | | | | | | |
|---|---|---|---|---|---|---|---|
| A10 = | −1.3324E−03 | 8.1003E−01 | 7.5729E−01 | 2.2552E−01 | 1.1312E−01 | 4.0600E−02 | 5.2921E−03 |
| A12 = | 1.3793E−04 | −6.1010E−01 | −5.4596E−01 | −1.1237E−01 | −2.7231E−02 | −9.2015E−04 | −1.0376E−03 |
| A14 = | | 2.2467E−01 | 2.0529E−01 | 2.0198E−02 | 2.5931E−03 | −1.9255E−03 | 1.2937E−04 |
| A16 = | | −2.9922E−02 | −3.0537E−02 | | | 2.8341E−04 | −7.7096E−06 |

In the 7th embodiment, the equation of the aspheric surface profiles of the aforementioned lens elements is the same as the equation of the 1st embodiment. Also, the definitions of these parameters shown in table below are the same as those stated in the 1st embodiment with corresponding values for the 7th embodiment, so an explanation in this regard will not be provided again.

Moreover, these parameters can be calculated from TABLE 13 and TABLE 14 and satisfy the conditions stated in the table below.

| 7th Embodiment | | | |
|---|---|---|---|
| f [mm] | 5.50 | |f2/f1| | 14.99 |
| Fno. | 1.69 | f/f6 | −1.16 |
| HFOV [deg.] | 24.5 | f/f7 | 0.29 |
| V7 | 20.4 | f/EPD | 1.69 |
| Vmin | 19.4 | TL/f | 1.12 |
| Vp | 55.8/20.4/ 55.8/21.5/20.4 | TL/EPD | 1.89 |
| CT4/T45 | 1.39 | TL/ImgH | 2.35 |
| T56/CT6 | 0.59 | f/ImgH | 2.10 |
| f/R4 | −1.17 | Nv32 | 4 |
| f/R10 | 0.41 | SD/TD | 0.70 |
| f/R11 | −0.99 | Yc21/CT2 | 2.16 |
| R5/R4 | 2.16 | Yc72/Y72 | 0.38 |
| R14/f | 0.97 | |f/R1| + |f/R2| | 2.96 |
| R3/R1 | −2.67 | |f/R3| + |f/R4| | 2.22 |
| (R3 + R4)/(R3 − R4) | 18.21 | |f/R5| + |f/R6| | 1.30 |
| (R5 − R6)/(R5 + R6) | 0.17 | |f/R7| + |f/R8| | 1.87 |
| (R10 + R11)/(R10 − R11) | 0.42 | |f/R9| + |f/R10| | 1.28 |
| f/f1 | 1.41 | |f/R11| + |f/R12| | 2.03 |
| f/f2 | 0.09 | |f/R13| + |f/R14| | 2.40 |

8th Embodiment

Figure 8A:
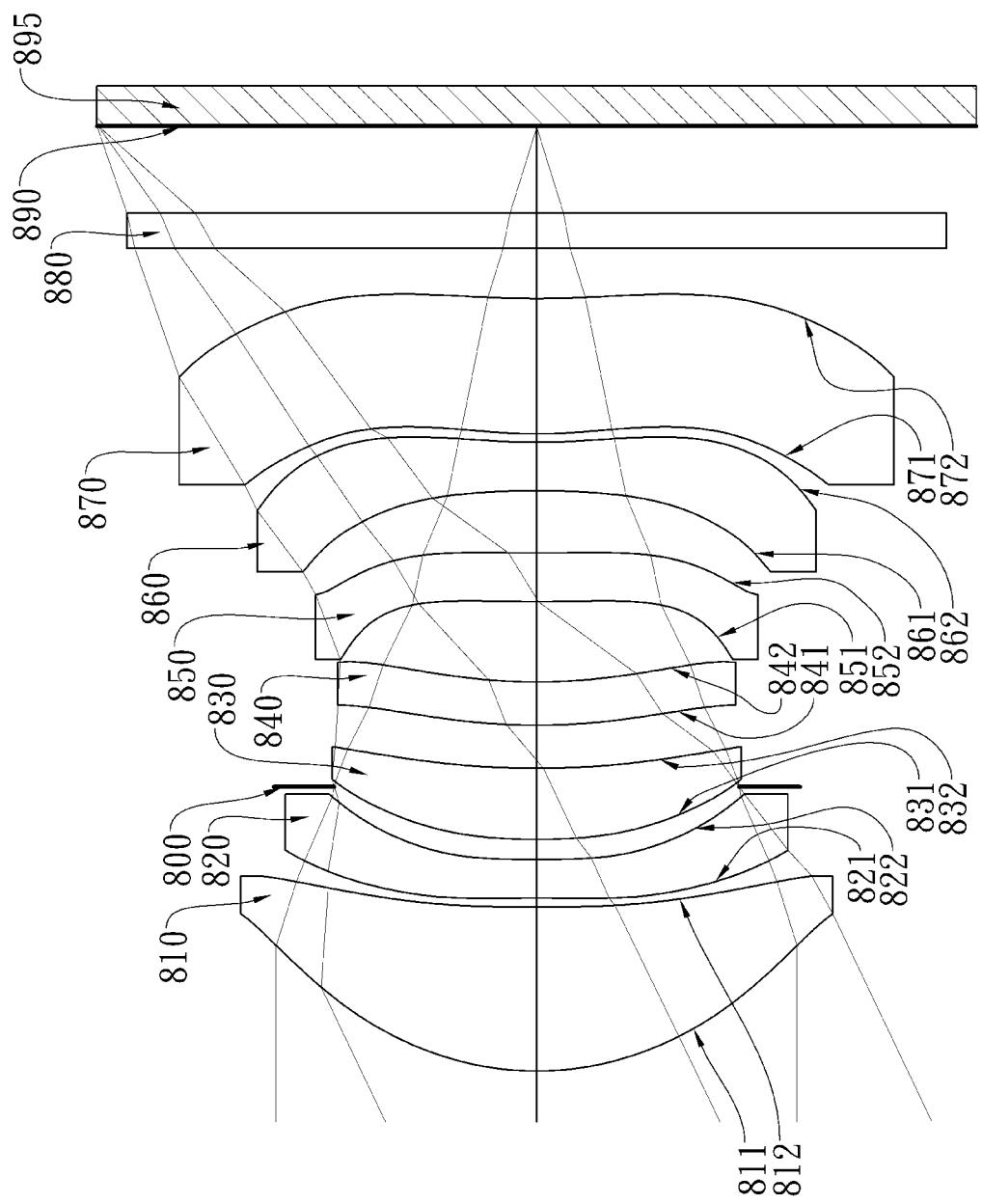
FIG. 8A is a schematic view of an imaging apparatus according to the 8th embodiment of the present disclosure.
Figure 8B:
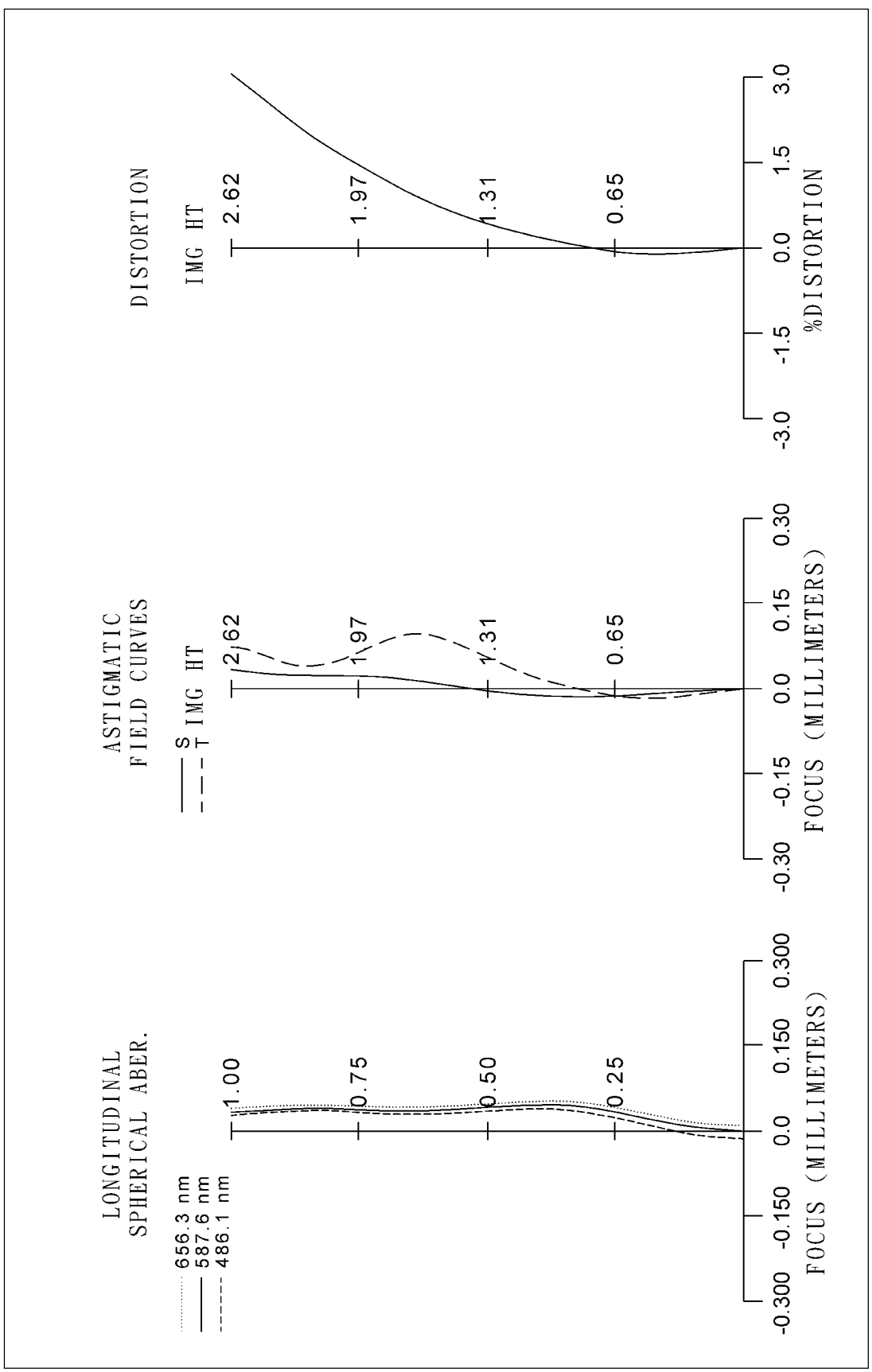
FIG. 8B shows longitudinal spherical aberration curves, astigmatic field curves and a distortion curve of the imaging apparatus according to the 8th embodiment.

FIG. 8A is a schematic view of an imaging apparatus according to the 8th embodiment of the present disclosure. FIG. 8B shows, in order from left to right, longitudinal spherical aberration curves, astigmatic field curves and a distortion curve of the imaging apparatus according to the 8th embodiment.

In FIG. 8A, the imaging apparatus includes a photographing lens system (not otherwise herein labeled) of the present disclosure and an image sensor 895. The photographing lens system includes, in order from an object side to an image side, a first lens element 810, a second lens element 820, an aperture stop 800, a third lens element 830, a fourth lens element 840, a fifth lens element 850, a sixth lens element 860, a seventh lens element 870, and an image surface 890. The image sensor 895 is disposed on or near the image surface 890, and the photographing lens system includes seven lens elements (810, 820, 830, 840, 850, 860 and 870) without any other lens element being inserted between them.

The first lens element 810 with positive refractive power has an object-side surface 811 being convex in a paraxial region thereof, and an image-side surface 812 being concave in a paraxial region thereof. Both the object-side surface 811 and the image-side surface 812 are aspheric. The first lens element 810 is made of plastic material.

The second lens element 820 with negative refractive power has an object-side surface 821 being concave in a paraxial region thereof, and an image-side surface 822 being concave in a paraxial region thereof. Both the object-side surface 821 and the image-side surface 822 are aspheric. The second lens element 820 is made of plastic material.

The third lens element 830 with positive refractive power has an object-side surface 831 being convex in a paraxial region thereof, and an image-side surface 832 being concave in a paraxial region thereof. Both the object-side surface 831 and the image-side surface 832 are aspheric. The third lens element 830 is made of plastic material.

The fourth lens element 840 with negative refractive power has an object-side surface 841 being convex in a paraxial region thereof, and an image-side surface 842 being concave in a paraxial region thereof. Both the object-side surface 841 and the image-side surface 842 are aspheric. The fourth lens element 840 is made of plastic material.

The fifth lens element 850 with positive refractive power has an object-side surface 851 being convex in a paraxial region thereof, and an image-side surface 852 being concave in a paraxial region thereof. Both the object-side surface 851 and the image-side surface 852 are aspheric. The fifth lens element 850 is made of plastic material.

The sixth lens element 860 with negative refractive power has an object-side surface 861 being concave in a paraxial region thereof, and an image-side surface 862 being concave in a paraxial region thereof. Both the object-side surface 861 and the image-side surface 862 are aspheric, and there is at least one inflection point in an off-axis region on the image-side surface 862 thereof. The sixth lens element 860 is made of plastic material.

The seventh lens element 870 with positive refractive power has an object-side surface 871 being convex in a paraxial region thereof, an image-side surface 872 being concave in a paraxial region thereof. Both the object-side surface 871 and the image-side surface 872 are aspheric, and there is at least one inflection point in an off-axis region on the image-side surface 872 thereof. The seventh lens element 870 is made of plastic material.

The photographing lens system further includes a filter 880 disposed between the seventh lens element 870 and the image surface 890. The filter 880 is made of glass material and does not affect the focal length of the photographing lens system.

The detailed optical data of the 8th embodiment are shown in TABLE 15, and the aspheric surface data are shown in TABLE 16.

TABLE 15

(8th Embodiment)
f = 5.26 mm, Fno = 1.69, HFOV = 25.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.804 | ASP | 0.980 | Plastic | 1.545 | 56.0 | 3.66 |
| 2 | | 15.139 | ASP | 0.053 | | | | |
| 3 | Lens 2 | −12.679 | ASP | 0.231 | Plastic | 1.660 | 20.4 | −7.92 |
| 4 | | 8.949 | ASP | 0.435 | | | | |
| 5 | Ape. Stop | Plano | | −0.315 | | | | |
| 6 | Lens 3 | 3.579 | ASP | 0.426 | Plastic | 1.535 | 56.3 | 20.07 |
| 7 | | 5.147 | ASP | 0.257 | | | | |
| 8 | Lens 4 | 3.515 | ASP | 0.259 | Plastic | 1.669 | 19.4 | −78.90 |
| 9 | | 3.198 | ASP | 0.480 | | | | |
| 10 | Lens 5 | 10.319 | ASP | 0.291 | Plastic | 1.535 | 56.3 | 87.84 |
| 11 | | 13.096 | ASP | 0.372 | | | | |
| 12 | Lens 6 | −5.859 | ASP | 0.290 | Plastic | 1.559 | 40.4 | −3.66 |
| 13 | | 3.203 | ASP | 0.050 | | | | |
| 14 | Lens 7 | 2.673 | ASP | 0.809 | Plastic | 1.660 | 20.4 | 7.22 |
| 15 | | 5.352 | ASP | 0.300 | | | | |
| 16 | Filter | Plano | | 0.210 | Glass | 1.517 | 64.2 | — |
| 17 | | Plano | | 0.521 | | | | |
| 18 | Image Surface | Plano | | — | | | | |

*Reference wavelength is d-line 587.6 nm.

TABLE 16

Aspheric Coefficients

| Surface # | 1 | 2 | 3 | 4 | 6 | 7 | 8 |
|---|---|---|---|---|---|---|---|
| k = | −1.1111E+00 | −4.6656E+00 | −4.2495E−01 | −2.3367E+01 | −1.8167E+01 | −6.5351E+01 | −1.3825E+01 |
| A4 = | 1.4939E−02 | 7.7269E−02 | 2.4711E−01 | 3.1638E−01 | 1.7461E−01 | 4.7897E−02 | 2.3776E−03 |
| A6 = | 1.3309E−03 | −5.5934E−02 | −2.0264E−01 | −2.0924E−01 | −4.3048E−01 | 5.4328E−04 | −8.0224E−03 |
| A8 = | 7.5902E−04 | 2.0024E−02 | 9.6052E−02 | 2.7191E−02 | −8.3374E−02 | −5.5947E−02 | −5.1448E−03 |
| A10 = | −2.2143E−04 | −3.4654E−03 | −2.2267E−02 | 4.6901E−02 | 7.5520E−02 | 4.1512E−02 | −1.3281E−03 |
| A12 = | −1.0421E−04 | 1.7428E−04 | 1.9569E−03 | −1.7293E−02 | −1.5016E−02 | −9.0704E−03 | 1.4934E−03 |
| A14 = | | | | | −1.1301E−03 | | |

| Surface # | 9 | 10 | 11 | 12 | 13 | 14 | 15 |
|---|---|---|---|---|---|---|---|
| k = | −1.3576E+01 | 7.6267E+00 | 8.9997E+01 | 1.3982E+01 | −5.6748E+01 | −1.1163E+01 | 4.3884E+00 |
| A4 = | −8.9667E−04 | −1.0911E−01 | −1.8740E−01 | −8.5065E−02 | −1.5360E−01 | −2.5937E−01 | −9.9213E−02 |
| A6 = | −2.4253E−03 | −2.3645E−01 | 2.4154E−01 | 1.5552E−01 | 2.1749E−01 | 2.9349E−01 | 2.7157E−02 |
| A8 = | −6.7405E−03 | 7.3784E−01 | −6.1235E−01 | −3.8877E−01 | −2.3395E−01 | −2.2785E−01 | −4.6106E−03 |
| A10 = | −1.8731E−03 | −1.4764E+00 | 8.0904E−01 | 4.1386E−01 | 1.2670E−01 | 9.1952E−02 | −1.2533E−03 |
| A12 = | −3.8552E−04 | 1.6325E+00 | −5.6185E−01 | −1.9609E−01 | −3.3930E−02 | −1.6201E−02 | 7.8254E−04 |
| A14 = | | −9.5520E−01 | 1.9578E−01 | 3.4144E−02 | 3.5333E−03 | 2.9873E−04 | −1.3572E−04 |
| A16 = | | 2.2446E−01 | −2.6308E−02 | | | 1.5897E−04 | 7.4439E−06 |

In the 8th embodiment, the equation of the aspheric surface profiles of the aforementioned lens elements is the same as the equation of the 1st embodiment. Also, the definitions of these parameters shown in table below are the same as those stated in the 1st embodiment with corresponding values for the 8th embodiment, so an explanation in this regard will not be provided again.

Moreover, these parameters can be calculated from TABLE 15 and TABLE 16 and satisfy the conditions stated in the table below.

| 8th Embodiment | | | |
|---|---|---|---|
| f [mm] | 5.26 | |f2/f1| | 2.16 |
| Fno. | 1.69 | f/f6 | −1.43 |
| HFOV [deg.] | 25.5 | f/f7 | 0.73 |
| V7 | 20.4 | f/EPD | 1.69 |
| Vmin | 19.4 | TL/f | 1.07 |
| Vp | 56.0/56.3/56.3/20.4 | TL/EPD | 1.82 |
| CT4/T45 | 0.54 | TL/ImgH | 2.16 |

-continued

| 8th Embodiment | | | |
|---|---|---|---|
| T56/CT6 | 1.28 | f/ImgH | 2.01 |
| f/R4 | 0.59 | Nv32 | 3 |
| f/R10 | 0.40 | SD/TD | 0.63 |
| f/R11 | −0.90 | Yc21/CT2 | 1.29 |
| R5/R4 | 0.40 | Yc72/Y72 | 0.37 |
| R14/f | 1.02 | |f/R1| + |f/R2| | 3.26 |
| R3/R1 | −7.03 | |f/R3| + |f/R4| | 1.00 |
| (R3 + R4)/(R3 − R4) | 0.17 | |f/R5| + |f/R6| | 2.49 |
| (R5 − R6)/(R5 + R6) | −0.18 | |f/R7| + |f/R8| | 3.14 |
| (R10 + R11)/(R10 − R11) | 0.38 | |f/R9| + |f/R10| | 0.91 |
| f/f1 | 1.43 | |f/R11| + |f/R12| | 2.54 |
| f/f2 | −0.66 | |f/R13| + |f/R14| | 2.95 |

9th Embodiment

Figure 9A:
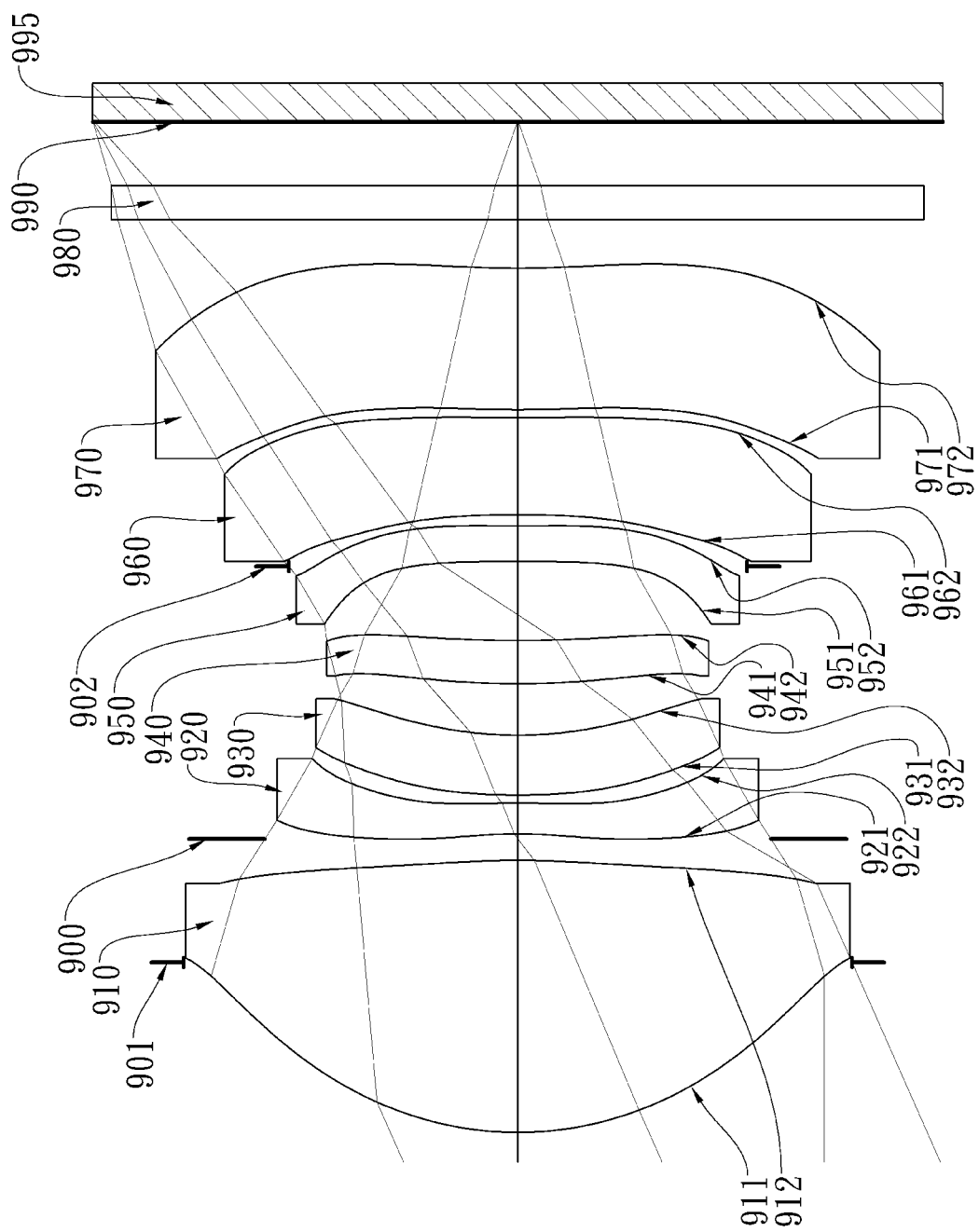
FIG. 9A is a schematic view of an imaging apparatus according to the 9th embodiment of the present disclosure.
Figure 9B:
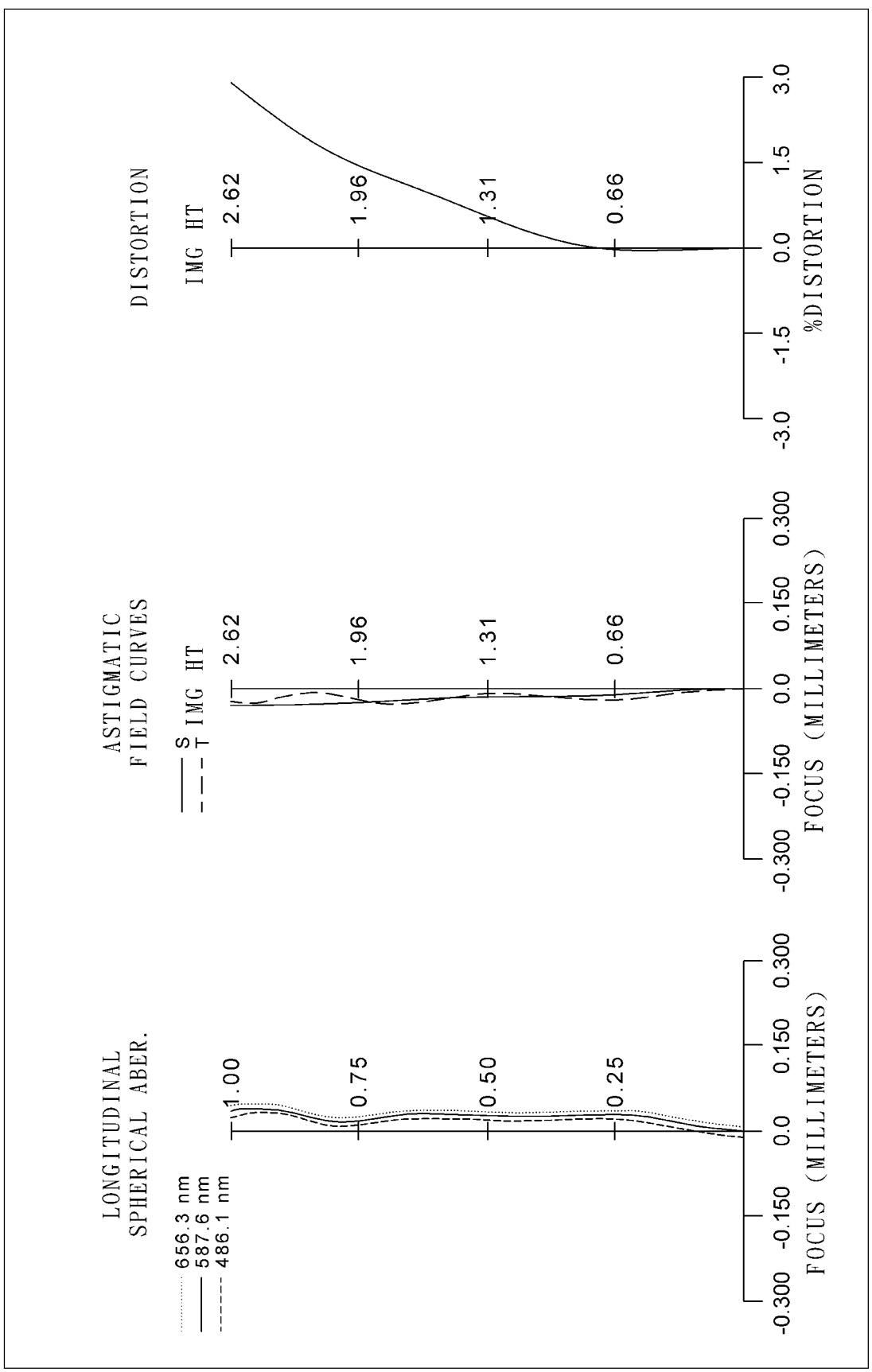
FIG. 9B shows longitudinal spherical aberration curves, astigmatic field curves and a distortion curve of the imaging apparatus according to the 9th embodiment.

FIG. 9A is a schematic view of an imaging apparatus according to the 9th embodiment of the present disclosure. FIG. 9B shows, in order from left to right, longitudinal spherical aberration curves, astigmatic field curves and a distortion curve of the imaging apparatus according to the 9th embodiment.

In FIG. 9A, the imaging apparatus includes a photographing lens system (not otherwise herein labeled) of the present disclosure and an image sensor 995. The photographing lens system includes, in order from an object side to an image side, a first stop 901, a first lens element 910, an aperture stop 900, a second lens element 920, a third lens element 930, a fourth lens element 940, a fifth lens element 950, a second stop 902, a sixth lens element 960, a seventh lens element 970, and an image surface 990. The image sensor 995 is disposed on or near the image surface 990, and the photographing lens system includes seven lens elements (910, 920, 930, 940, 950, 960 and 970) without any other lens element being inserted between them.

The first lens element 910 with positive refractive power has an object-side surface 911 being convex in a paraxial region thereof, and an image-side surface 912 being convex in a paraxial region thereof. Both the object-side surface 911 and the image-side surface 912 are aspheric. The first lens element 910 is made of plastic material.

The second lens element 920 with negative refractive power has an object-side surface 921 being concave in a paraxial region thereof, and an image-side surface 922 being convex in a paraxial region thereof. Both the object-side surface 921 and the image-side surface 922 are aspheric. The second lens element 920 is made of plastic material.

The third lens element 930 with negative refractive power has an object-side surface 931 being convex in a paraxial region thereof, and an image-side surface 932 being concave in a paraxial region thereof. Both the object-side surface 931 and the image-side surface 932 are aspheric. The third lens element 930 is made of plastic material.

The fourth lens element 940 with positive refractive power has an object-side surface 941 being convex in a paraxial region thereof, and an image-side surface 942 being concave in a paraxial region thereof. Both the object-side surface 941 and the image-side surface 942 are aspheric. The fourth lens element 940 is made of plastic material.

The fifth lens element 950 with negative refractive power has an object-side surface 951 being concave in a paraxial region thereof, and an image-side surface 952 being concave in a paraxial region thereof. Both the object-side surface 951 and the image-side surface 952 are aspheric. The fifth lens element 950 is made of plastic material.

The sixth lens element 960 with negative refractive power has an object-side surface 961 being concave in a paraxial region thereof, and an image-side surface 962 being concave in a paraxial region thereof. Both the object-side surface 961 and the image-side surface 962 are aspheric, and there is at least one inflection point in an off-axis region on the image-side surface 962 thereof. The sixth lens element 960 is made of plastic material.

The seventh lens element 970 with negative refractive power has an object-side surface 971 being convex in a paraxial region thereof, an image-side surface 972 being concave in a paraxial region thereof. Both the object-side surface 971 and the image-side surface 972 are aspheric, and there is at least one inflection point in an off-axis region on the image-side surface 972 thereof. The seventh lens element 970 is made of plastic material.

The photographing lens system further includes a filter 980 disposed between the sixth lens element 970 and the image surface 990. The filter 980 is made of glass material and does not affect the focal length of the photographing lens system.

The detailed optical data of the 9th embodiment are shown in TABLE 17, and the aspheric surface data are shown in TABLE 18.

TABLE 17

(9th Embodiment)
f = 5.72 mm, Fno = 1.51, HFOV = 23.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Stop 1 | Plano | | −1.050 | | | | |
| 2 | Lens 1 | 2.084 | ASP | 1.680 | Plastic | 1.535 | 56.3 | 3.08 |
| 3 | | −5.626 | ASP | 0.134 | | | | |
| 4 | Ape. Stop | Plano | | 0.030 | | | | |
| 5 | Lens 2 | −2.814 | ASP | 0.190 | Plastic | 1.669 | 19.4 | −7.16 |
| 6 | | −7.005 | ASP | 0.050 | | | | |
| 7 | Lens 3 | 3.901 | ASP | 0.370 | Plastic | 1.559 | 40.4 | −10.99 |
| 8 | | 2.304 | ASP | 0.318 | | | | |
| 9 | Lens 4 | 4.789 | ASP | 0.267 | Plastic | 1.669 | 19.4 | 20.84 |
| 10 | | 7.131 | ASP | 0.488 | | | | |
| 11 | Lens 5 | −81.246 | ASP | 0.220 | Plastic | 1.669 | 19.4 | −16.57 |
| 12 | | 12.855 | ASP | −0.250 | | | | |
| 13 | Stop 2 | Plano | | 0.319 | | | | |
| 14 | Lens 6 | −10.249 | ASP | 0.600 | Plastic | 1.534 | 55.9 | −12.04 |
| 15 | | 17.61 | ASP | 0.050 | | | | |
| 16 | Lens 7 | 6.397 | ASP | 0.874 | Plastic | 1.669 | 19.4 | −195.62 |
| 17 | | 5.765 | ASP | 0.300 | | | | |
| 18 | Filter | Plano | | 0.210 | Glass | 1.517 | 64.2 | — |
| 19 | | Plano | | 0.395 | | | | |
| 20 | Image Surface | Plano | | — | | | | |

*Reference wavelength is d-line 587.6 nm.
*The effective radius of the first stop on surface #1 (Stop 1) is 2.062 mm.
*The effective radius of the second stop on surface #13 (Stop 2) is 1.414 mm.

TABLE 18

Aspheric Coefficients

| Surface # | 2 | 3 | 5 | 6 | 7 | 8 | 9 |
|---|---|---|---|---|---|---|---|
| k = | −1.1689E+00 | 6.1099E+00 | −2.3937E+01 | 8.1779E+00 | −8.9946E+01 | −1.8406E+01 | −2.7001E+01 |
| A4 = | 1.3262E−02 | 8.5501E−02 | 2.2941E−01 | 3.6312E−01 | 1.7542E−01 | 8.3456E−02 | −6.5400E−03 |
| A6 = | −9.8555E−04 | −5.2591E−02 | −2.0950E−01 | −2.3032E−01 | −3.5681E−02 | −1.7610E−02 | 4.9095E−03 |
| A8 = | 9.1682E−04 | 1.9080E−02 | 9.8229E−02 | 2.5349E−02 | −1.0722E−01 | −3.5117E−02 | −2.0090E−02 |
| A10 = | −1.3470E−04 | −3.6290E−03 | −2.0922E−02 | 3.6855E−02 | 9.2548E−02 | 2.0207E−02 | 2.9338E−03 |
| A12 = | −2.9603E−05 | 2.8564E−04 | 1.6944E−03 | −8.5471E−03 | −2.5061E−02 | −2.2223E−03 | −2.9724E−03 |
| A14 = | | | | | 2.2457E−03 | −1.6227E−03 | |

| Surface # | 10 | 11 | 12 | 14 | 15 | 16 | 17 |
|---|---|---|---|---|---|---|---|
| k = | −7.3135E+01 | 9.0000E+01 | −4.9436E+01 | −4.0608E+00 | −8.8708E+01 | −7.8275E+01 | 4.9373E+00 |
| A4 = | −4.9406E−03 | −1.8710E−01 | −3.2604E−01 | −1.8264E−01 | −1.2276E−01 | −1.4276E−01 | −9.9572E−02 |
| A6 = | 6.1782E−04 | 1.8114E−01 | 4.6036E−01 | 2.1000E−01 | 1.6054E−01 | 1.3524E−01 | 4.5624E−02 |
| A8 = | −2.0035E−02 | −2.4573E−01 | −5.8506E−01 | −1.9350E−01 | −1.2849E−01 | −7.8194E−02 | −2.1773E−02 |
| A10 = | 3.1710E−03 | 1.1660E−01 | 4.8531E−01 | 1.5040E−01 | 5.0954E−02 | 1.7525E−02 | 7.2487E−03 |
| A12 = | −1.2748E−03 | −2.5118E−03 | −2.4086E−01 | −6.8455E−02 | −9.6559E−03 | 1.4846E−03 | −1.5888E−03 |
| A14 = | | −3.5811E−02 | 6.2357E−02 | 1.2004E−02 | 6.7991E−04 | −1.1720E−03 | 2.0184E−04 |
| A16 = | | 1.5030E−02 | −5.8357E−03 | | | 1.2585E−04 | −1.1186E−05 |

In the 9th embodiment, the equation of the aspheric surface profiles of the aforementioned lens elements is the same as the equation of the 1st embodiment. Also, the definitions of these parameters shown in table below are the same as those stated in the 1st embodiment with corresponding values for the 9th embodiment, so an explanation in this regard will not be provided again.

Moreover, these parameters can be calculated from TABLE 17 and TABLE 18 and satisfy the conditions stated in the table below.

| 9th Embodiment | | | |
|---|---|---|---|
| f [mm] | 5.71 | \|f2/f1\| | 2.33 |
| Fno. | 1.51 | f/f6 | −0.47 |
| HFOV [deg.] | 23.9 | f/f7 | −0.03 |
| V7 | 19.4 | f/EPD | 1.51 |
| Vmin | 19.4 | TL/f | 1.09 |
| Vp | 56.3/19.4 | TL/EPD | 1.65 |
| CT4/T45 | 0.55 | TL/ImgH | 2.38 |
| T56/CT6 | 0.12 | f/ImgH | 2.18 |
| f/R4 | −0.82 | Nv32 | 4 |
| f/R10 | 0.44 | SD/TD | 0.66 |
| f/R11 | −0.56 | Yc21/CT2 | 3.67 |
| R5/R4 | −0.56 | Yc72/Y72 | 0.37 |
| R14/f | 1.01 | \|f/R1\| + \|f/R2\| | 3.76 |
| R3/R1 | −1.35 | \|f/R3\| + \|f/R4\| | 2.85 |
| (R3 + R4)/(R3 − R4) | −2.34 | \|f/R5\| + \|f/R6\| | 3.95 |
| (R5 − R6)/(R5 + R6) | 0.26 | \|f/R7\| + \|f/R8\| | 1.99 |
| (R10 + R11)/(R10 − R11) | 0.11 | \|f/R9\| + \|f/R10\| | 0.51 |
| f/f1 | 1.86 | \|f/R11\| + \|f/R12\| | 0.88 |
| f/f2 | −0.80 | \|f/R13\| + \|f/R14\| | 1.88 |

10th Embodiment

Figure 10A:
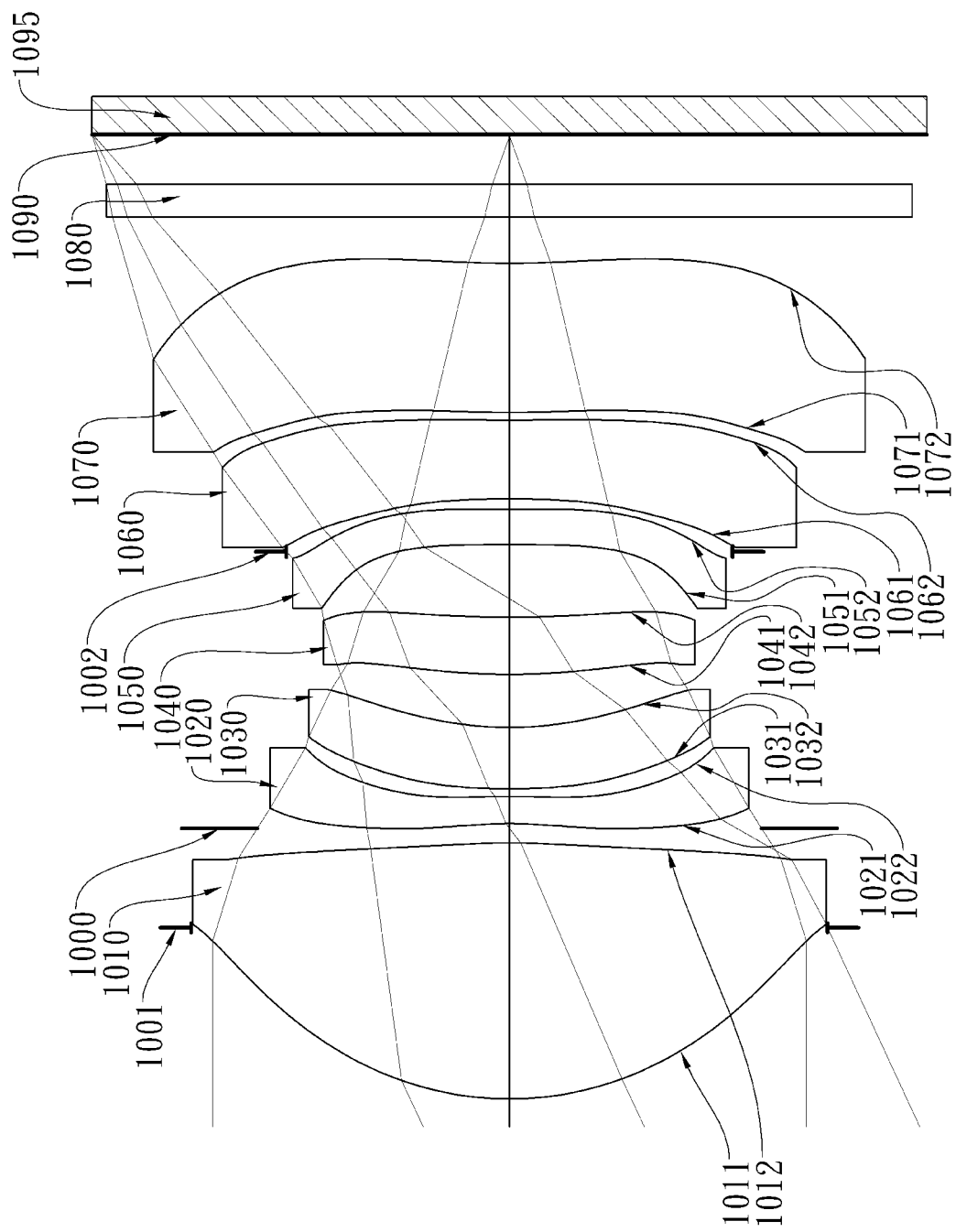
FIG. 10A is a schematic view of an imaging apparatus according to the 10th embodiment of the present disclosure.
Figure 10B:
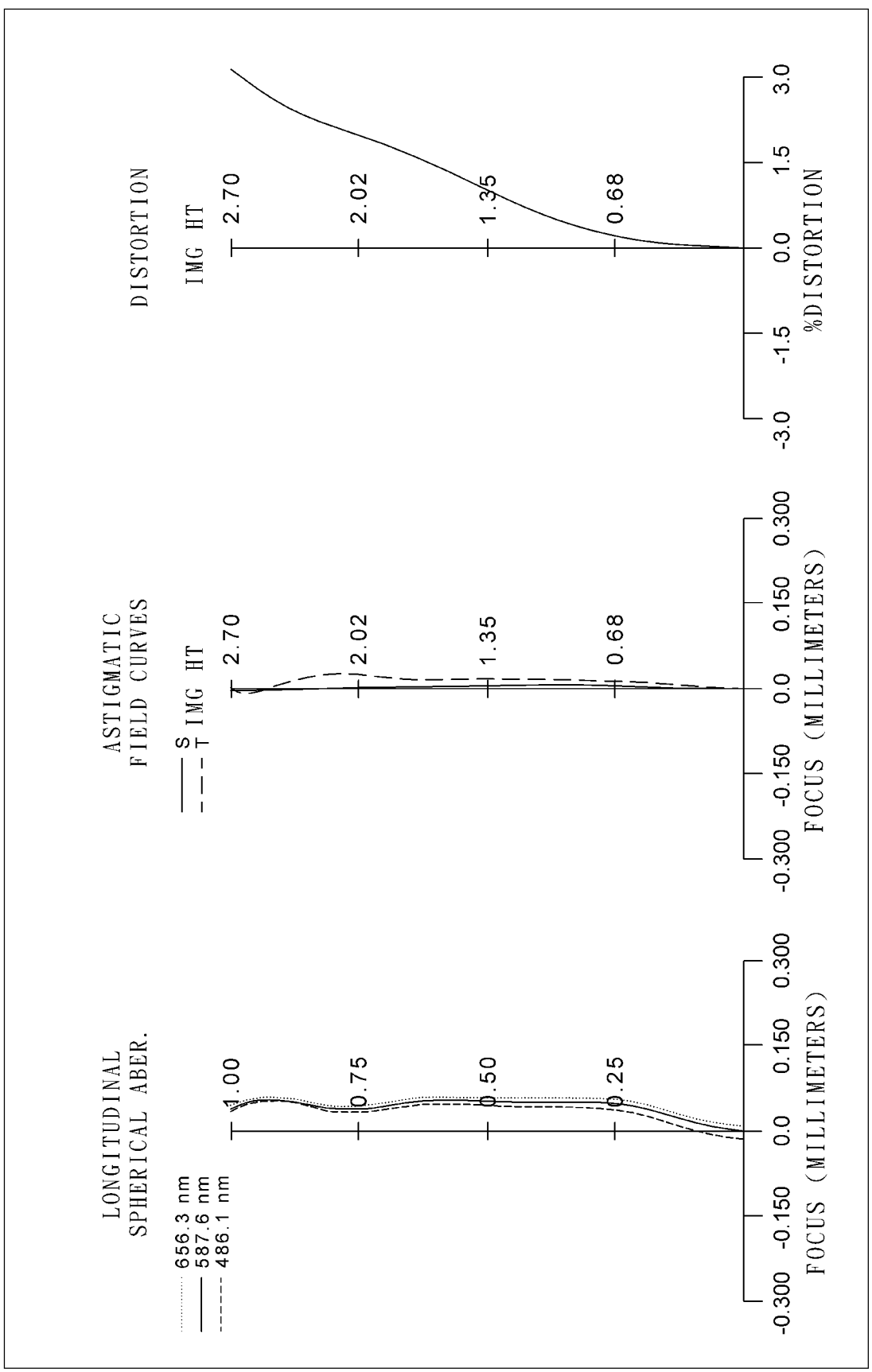
FIG. 10B shows longitudinal spherical aberration curves, astigmatic field curves and a distortion curve of the imaging apparatus according to the 10th embodiment.

FIG. 10A is a schematic view of an imaging apparatus according to the 10th embodiment of the present disclosure. FIG. 10B shows, in order from left to right, longitudinal spherical aberration curves, astigmatic field curves and a distortion curve of the imaging apparatus according to the 10th embodiment.

In FIG. 10A, the imaging apparatus includes a photographing lens system (not otherwise herein labeled) of the present disclosure and an image sensor 1095. The photographing lens system includes, in order from an object side to an image side, a first stop 1001, a first lens element 1010, an aperture stop 1000, a second lens element 1020, a third lens element 1030, a fourth lens element 1040, a fifth lens element 1050, a second stop 1002, a sixth lens element 1060, a seventh lens element 1070, and an image surface 1090. The image sensor 1095 is disposed on or near the image surface 1090, and the photographing lens system includes seven lens elements (1010, 1020, 1030, 1040, 1050, 1060 and 1070) without any other lens element being inserted between them.

The first lens element 1010 with positive refractive power has an object-side surface 1011 being convex in a paraxial region thereof, and an image-side surface 1012 being convex in a paraxial region thereof. Both the object-side surface 1011 and the image-side surface 1012 are aspheric. The first lens element 1010 is made of plastic material.

The second lens element 1020 with negative refractive power has an object-side surface 1021 being concave in a paraxial region thereof, and an image-side surface 1022 being convex in a paraxial region thereof. Both the object-side surface 1021 and the image-side surface 1022 are aspheric. The second lens element 1020 is made of plastic material.

The third lens element 1030 with negative refractive power has an object-side surface 1031 being convex in a paraxial region thereof, and an image-side surface 1032 being concave in a paraxial region thereof. Both the object-side surface 1031 and the image-side surface 1032 are aspheric. The third lens element 1030 is made of plastic material.

The fourth lens element 1040 with positive refractive power has an object-side surface 1041 being convex in a paraxial region thereof, and an image-side surface 1042 being concave in a paraxial region thereof. Both the object-side surface 1041 and the image-side surface 1042 are aspheric. The fourth lens element 1040 is made of plastic material.

The fifth lens element 1050 with negative refractive power has an object-side surface 1051 being concave in a paraxial region thereof, and an image-side surface 1052 being concave in a paraxial region thereof. Both the object-side surface 1051 and the image-side surface 1052 are aspheric. The fifth lens element 1050 is made of plastic material.

The sixth lens element 1060 with negative refractive power has an object-side surface 1061 being concave in a paraxial region thereof, and an image-side surface 1062 being concave in a paraxial region thereof. Both the object-side surface 1061 and the image-side surface 1062 are aspheric, and there is at least one inflection point in an off-axis region on the image-side surface 1062 thereof. The sixth lens element 1060 is made of plastic material.

The seventh lens element 1070 with positive refractive power has an object-side surface 1071 being convex in a paraxial region thereof, an image-side surface 1072 being concave in a paraxial region thereof. Both the object-side surface 1071 and the image-side surface 1072 are aspheric, and there is at least one inflection point in an off-axis region on the image-side surface 1072 thereof. The seventh lens element 1070 is made of plastic material.

The photographing lens system further includes a filter 1080 disposed between the sixth lens element 1070 and the image surface 1090. The filter 1080 is made of glass material and does not affect the focal length of the photographing lens system.

The detailed optical data of the 10th embodiment are shown in TABLE 19, and the aspheric surface data are shown in TABLE 20.

TABLE 19

(10th Embodiment)
f = 5.61 mm, Fno = 1.46, HFOV = 24.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Stop 1 | Plano | | −1.110 | | | | |
| 2 | Lens 1 | 2.076 | ASP | 1.659 | Plastic | 1.535 | 56.3 | 3.09 |
| 3 | | −5.797 | ASP | 0.095 | | | | |
| 4 | Ape. Stop | Plano | | 0.031 | | | | |
| 5 | Lens 2 | −2.861 | ASP | 0.175 | Plastic | 1.669 | 19.4 | −7.46 |
| 6 | | −6.864 | ASP | 0.050 | | | | |
| 7 | Lens 3 | 4.000 | ASP | 0.399 | Plastic | 1.559 | 40.4 | −9.60 |
| 8 | | 2.208 | ASP | 0.344 | | | | |
| 9 | Lens 4 | 4.227 | ASP | 0.370 | Plastic | 1.669 | 19.4 | 16.24 |
| 10 | | 6.675 | ASP | 0.471 | | | | |
| 11 | Lens 5 | −88.700 | ASP | 0.229 | Plastic | 1.669 | 19.4 | −17.98 |
| 12 | | 13.933 | ASP | −0.275 | | | | |
| 13 | Stop 2 | Plano | | 0.342 | | | | |
| 14 | Lens 6 | −9.630 | ASP | 0.511 | Plastic | 1.534 | 55.9 | −10.88 |
| 15 | | 14.911 | ASP | 0.050 | | | | |
| 16 | Lens 7 | 6.012 | ASP | 0.967 | Plastic | 1.583 | 30.2 | 407.27 |
| 17 | | 5.802 | ASP | 0.300 | | | | |
| 18 | Filter | Plano | | 0.210 | Plano | 1.517 | 64.2 | — |
| 19 | | Plano | | 0.324 | | | | |
| 20 | Image Surface | Plano | | — | | | | |

*Reference wavelength is d-line 587.6 nm.
*The effective radius of the first stop on surface #1 (Stop 1) is 2.060 mm.
*The effective radius of the second stop on surface #13 (Stop 2) is 1.444 mm.

TABLE 20

Aspheric Coefficients

| Surface # | 2 | 3 | 5 | 6 | 7 | 8 | 9 |
|---|---|---|---|---|---|---|---|
| k = | −1.1619E+00 | 6.6979E+00 | −2.2094E+01 | 7.7368E+00 | −8.7767E+01 | −1.3711E+01 | −2.5787E+01 |
| A4 = | 1.3447E−02 | 8.5893E−02 | 2.3034E−01 | 3.6271E−01 | 1.8069E−01 | 6.2586E−02 | −1.8892E−03 |
| A6 = | −7.2227E−04 | −5.2391E−02 | −2.0959E−01 | −2.2842E−01 | −4.4470E−02 | 1.0573E−02 | 1.6283E−02 |
| A8 = | 9.0219E−04 | 1.9138E−02 | 9.7899E−02 | 2.6273E−02 | −1.0347E−01 | −6.7844E−02 | −5.6282E−02 |
| A10 = | −1.2242E−04 | −3.6069E−03 | −2.1155E−02 | 3.6431E−02 | 1.0276E−01 | 4.8750E−02 | 3.5605E−02 |
| A12 = | −2.6713E−05 | 2.8191E−04 | 1.7543E−03 | −9.4593E−03 | −3.5165E−02 | −1.5787E−02 | −1.3064E−02 |
| A14 = | | | | | 4.6838E−03 | 1.1603E−03 | |

| Surface # | 10 | 11 | 12 | 14 | 15 | 16 | 17 |
|---|---|---|---|---|---|---|---|
| k = | −7.0717E+01 | 6.9431E+01 | −4.1227E+01 | 1.4455E+00 | 4.1362E+01 | −2.6648E+01 | 4.9136E+00 |
| A4 = | −7.2877E−03 | −2.3088E−01 | −3.2290E−01 | −1.7864E−01 | −1.4128E−01 | −1.7128E−01 | −8.6726E−02 |
| A6 = | 4.6865E−03 | 3.8855E−01 | 4.6952E−01 | 2.0175E−01 | 1.9612E−01 | 1.8907E−01 | 3.5022E−02 |
| A8 = | −3.3539E−02 | −8.0041E−01 | −6.0721E−01 | −1.7181E−01 | −1.6217E−01 | −1.1780E−01 | −1.4427E−02 |
| A10 = | 1.2678E−02 | 9.6106E−01 | 5.1527E−01 | 1.2300E−01 | 6.7161E−02 | 3.1695E−02 | 4.1940E−03 |
| A12 = | −3.2914E−03 | −7.4616E−01 | −2.6894E−01 | −5.4458E−02 | −1.3340E−02 | −6.8663E−04 | −9.0045E−04 |
| A14 = | | 3.1669E−01 | 7.6866E−02 | 9.5097E−03 | 1.0005E−03 | −1.1439E−03 | 1.2054E−04 |
| A16 = | | −5.3289E−02 | −8.7844E−03 | | | 1.4274E−04 | −7.1906E−06 |

In the 10th embodiment, the equation of the aspheric surface profiles of the aforementioned lens elements is the same as the equation of the 1st embodiment. Also, the definitions of these parameters shown in table below are the same as those stated in the 1st embodiment with corresponding values for the 10th embodiment, so an explanation in this regard will not be provided again.

Moreover, these parameters can be calculated from TABLE 19 and TABLE 20 and satisfy the conditions stated in the table below.

| 10th Embodiment | | | |
|---|---|---|---|
| f [mm] | 5.61 | \|f2/f1\| | 2.42 |
| Fno. | 1.46 | f/f6 | −0.52 |
| HFOV [deg.] | 24.8 | f/f7 | 0.01 |
| V7 | 30.2 | f/EPD | 1.46 |
| Vmin | 19.4 | TL/f | 1.11 |
| Vp | 56.3/19.4/30.2 | TL/EPD | 1.63 |
| CT4/T45 | 0.79 | TL/ImgH | 2.32 |
| T56/CT6 | 0.13 | f/ImgH | 2.08 |
| f/R4 | −0.82 | Nv32 | 4 |
| f/R10 | 0.40 | SD/TD | 0.68 |
| f/R11 | −0.58 | Yc21/CT2 | 4.04 |
| R5/R4 | −0.58 | Yc72/Y72 | 0.38 |
| R14/f | 1.03 | \|f/R1\| + \|f/R2\| | 3.67 |
| R3/R1 | −1.38 | \|f/R3\| + \|f/R4\| | 2.78 |
| (R3 + R4)/(R3 − R4) | −2.43 | \|f/R5\| + \|f/R6\| | 3.94 |
| (R5 − R6)/(R5 + R6) | 0.29 | \|f/R7\| + \|f/R8\| | 2.17 |
| (R10 + R11)/(R10 − R11) | 0.18 | \|f/R9\| + \|f/R10\| | 0.47 |
| f/f1 | 1.82 | \|f/R11\| + \|f/R12\| | 0.96 |
| f/f2 | −0.75 | \|f/R13\| + \|f/R14\| | 1.90 |

11th Embodiment

Figure 12:
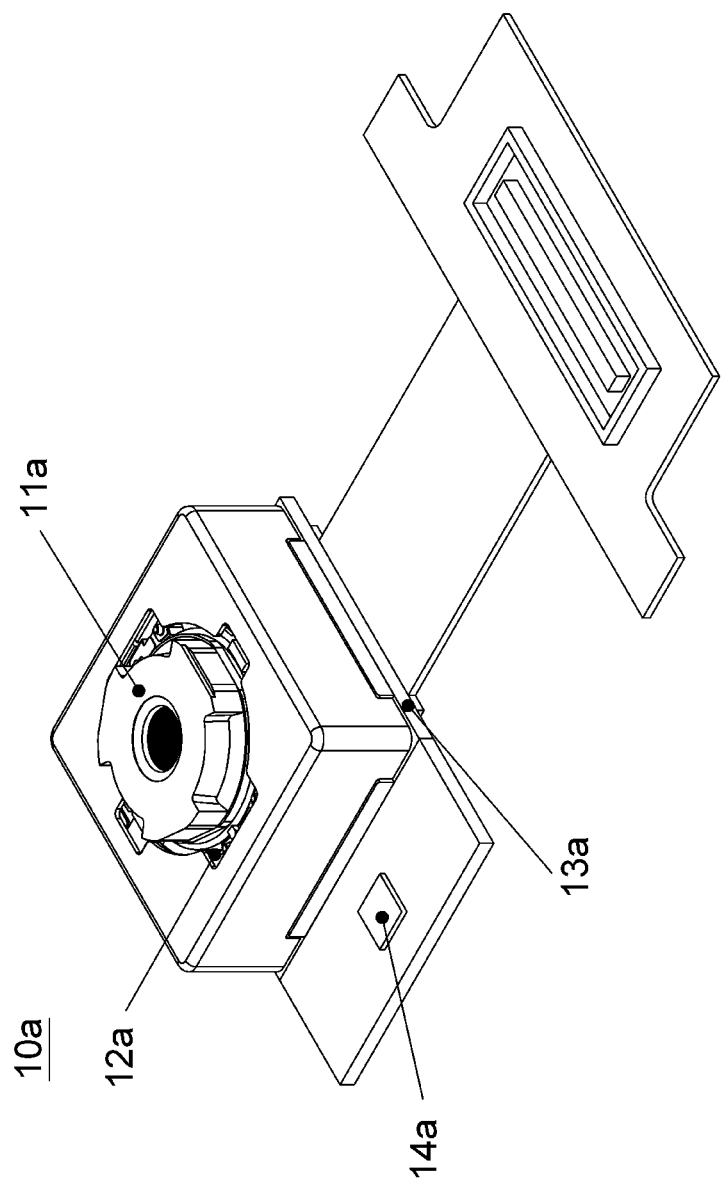
FIG. 12 is a 3-dimensional schematic view of an imaging apparatus according to the 11th embodiment of the present disclosure.

FIG. 12 is a 3-dimensional schematic view of an imaging apparatus 10a according to the 11th embodiment of the present disclosure. In the present embodiment, the imaging apparatus 10a is a camera module. The imaging apparatus 10a includes a lens unit 11a, a driving device 12a, and an image sensor 13a. The lens unit 11a includes the photographing lens system of the 1st embodiment described above and a lens barrel (not otherwise herein labeled) for carrying the photographing lens system. The imaging apparatus 10a receives light and generates an image by using the lens unit 11a, uses the driving device 12a to adjust the focus to photograph on the image sensor 13a and outputs the image data thereafter.

The driving device 12a may be an auto-focus module that can be driven by a voice coil motor (VCM), a micro electro-mechanical system (MEMS), a piezoelectric system, shape memory alloys or other driving systems. The driving device 12a allows the lens unit 11a to obtain a better imaging position, so that a clear image can be obtained wherever an imaged object 30 (please refer to FIG. 13B) is positioned with different object distances.

The imaging apparatus 10a may be equipped with an image sensor 13a (e.g., CMOS, CCD) with high sensitivity and low noise on the image surface of the photographing lens system to accurately provide satisfactory image quality obtained from the photographing lens system.

In addition, the imaging apparatus 10a may further include an image stabilizer 14a, which may be a dynamic sensing element such as an accelerometer, a gyro sensor or a Hall Effect sensor. The image stabilizer 14a in the 11th embodiment is a gyro sensor but is not limited thereto. By adjusting the photographing lens system in different axial directions to provide a compensation for image blurs due to motion during exposures, the image quality under dynamic and low-light circumstances can be further improved, and enhanced image compensation functions such as optical image stabilization (OIS) or electronic image stabilization (EIS) can also be provided.

12th Embodiment

Figure 13A:
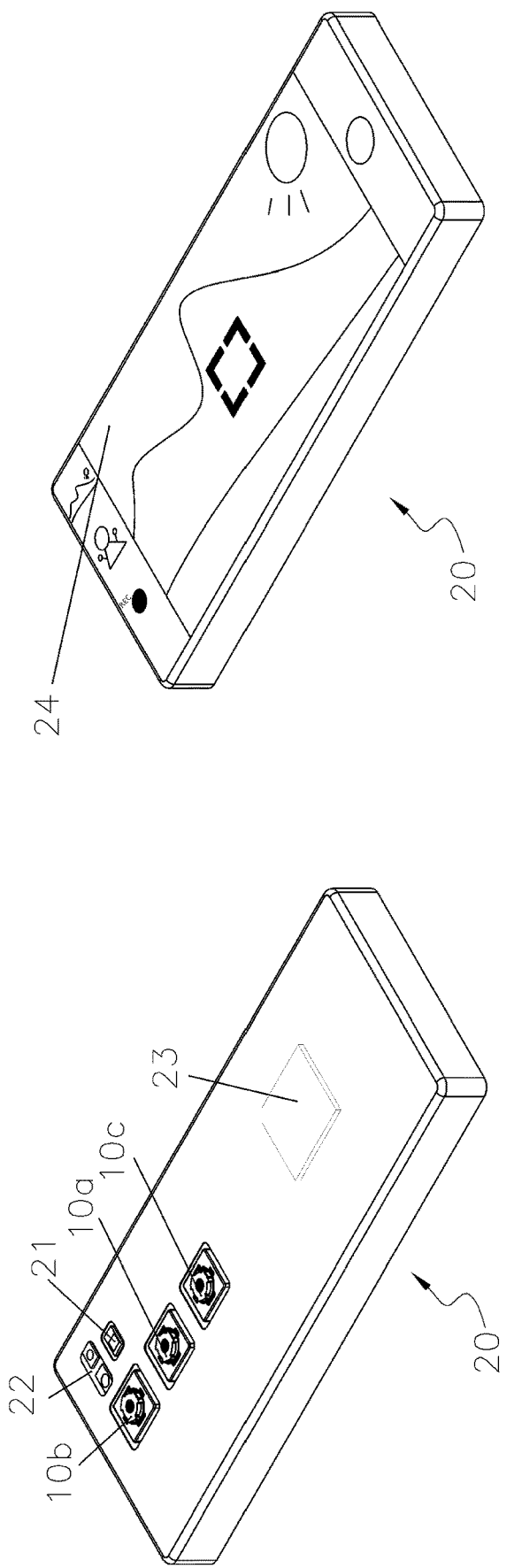
FIG. 13A is a 3-dimensional schematic view of an electronic device according to the 12th embodiment of the present disclosure.
Figure 13B:
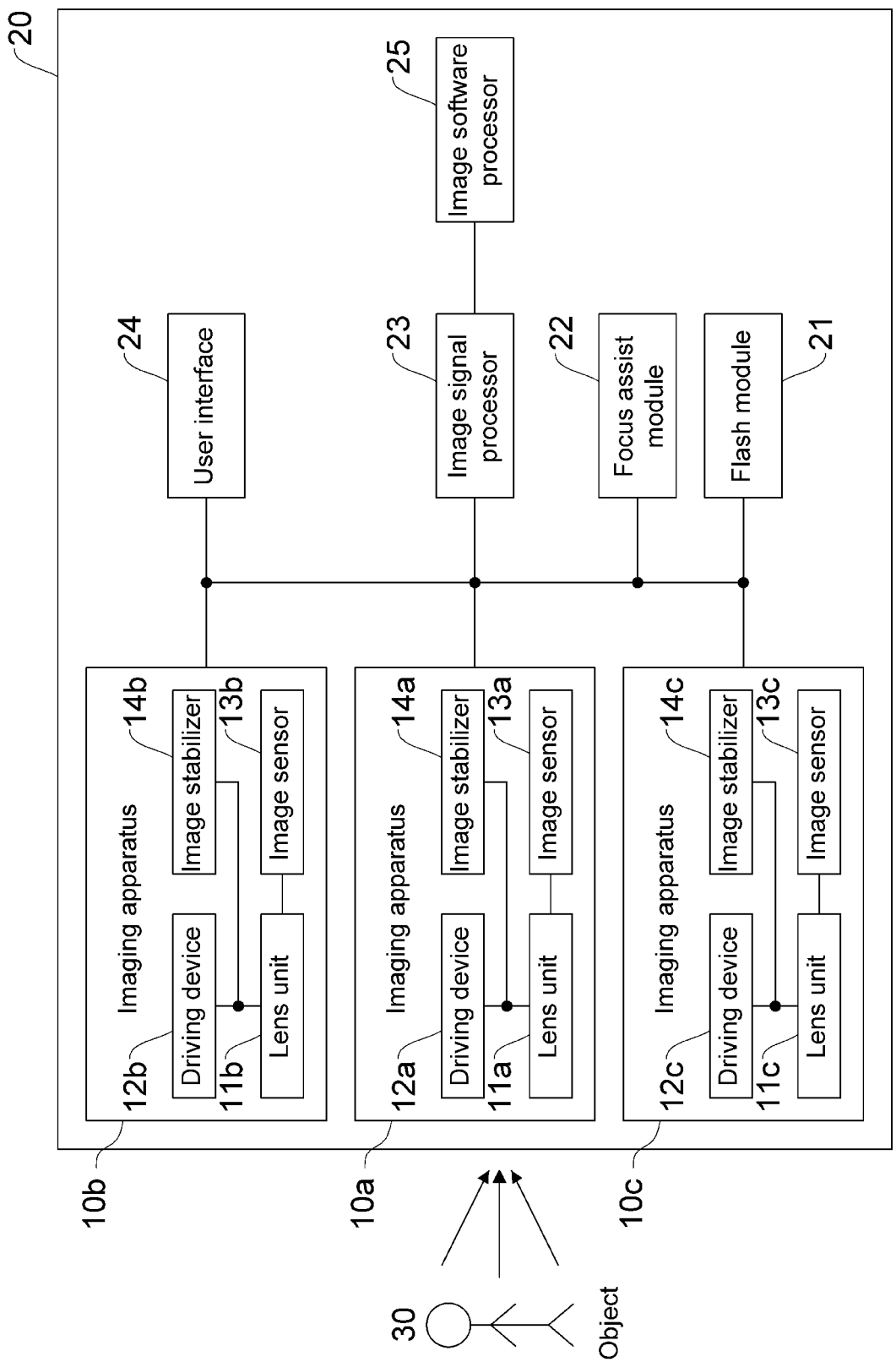
FIG. 13B is a functional block diagram of the electronic device according to the 12th embodiment of the present disclosure.

Please refer to FIG. 13A and FIG. 13B. FIG. 13A is a 3-dimensional schematic view of an electronic device 20 according to the 12th embodiment of the present disclosure. FIG. 13B is a schematic view of the electronic device 20 shown in FIG. 13A. In the present embodiment, the electronic device 20 is a smart phone. The electronic device 20 includes the imaging apparatus 10a of the 11th embodiment, an imaging apparatus 10b, an imaging apparatus 10c, a flash module 21, a focus assist module 22, an image signal processor 23, a user interface 24, and an image software processor 25 (please refer to FIG. 13B). In the present embodiment, the electronic device 20 includes three imaging apparatuses 10a, 10b and 10c facing toward the same direction. The imaging apparatus 10c is a primary lens unit, the imaging apparatus 10b is a wide-angle lens unit, the imaging apparatus 10a is a telephoto lens unit; however, configurations are not limited thereto. For example, the three imaging apparatuses can be the imaging apparatus 10a, the imaging apparatus 10a, and the imaging apparatus 10b or other combinations. Besides, the electronic device 20 may include only one imaging apparatus 10a or may include two or more imaging apparatuses (10a, 10b or 10c).

When a user utilizes the user interface 24 to capture images of the object 30 (please refer to FIG. 13B), the electronic device 20 receives light and captures an image via at least one of the imaging apparatuses 10a, imaging apparatus 10b, and imaging apparatus 10c, triggers the flash module 21 to compensate insufficient light level, and focuses instantly according to the distance information of the object 30 provided by the focus assist module 22. The images are further optimized by the image signal processor 23 to further enhance the image quality generated by the photographing lens system. The focus assist module 22 may adopt an infrared ray or laser focus assist system to achieve quick focusing. The user interface 24 may include a touch screen or a physical shooting button to cooperate with various functions of the image software processor 25 for performing image capturing and image processing.

The imaging apparatus 10a of the present disclosure is not limited to being applied to smart phones. The imaging apparatus 10a may be used in focus adjusting systems depending on the needs, while it features excellent aberration correction and provides satisfactory image quality. For example, the imaging apparatus 10a may be applied to a variety of applications such as car electronics, drones, smart electronic products, tablet computers, wearable devices, medical devices, precision instruments, surveillance cameras, portable video recorders, identification systems, multi-lens devices, somatosensory detections, virtual realities, motion devices, home intelligent auxiliary systems and other electronic devices.

13th Embodiment

Figure 14A:
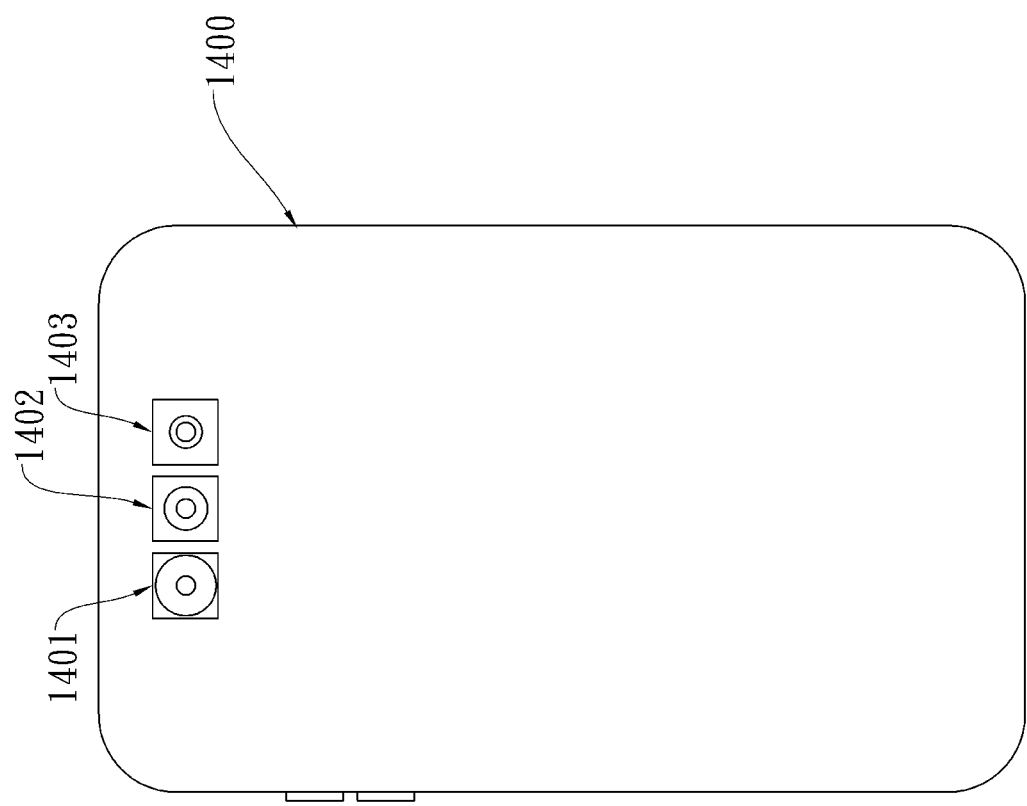
FIG. 14A is a rear view of an electronic device according to the 13th embodiment of the present disclosure.
Figure 14B:
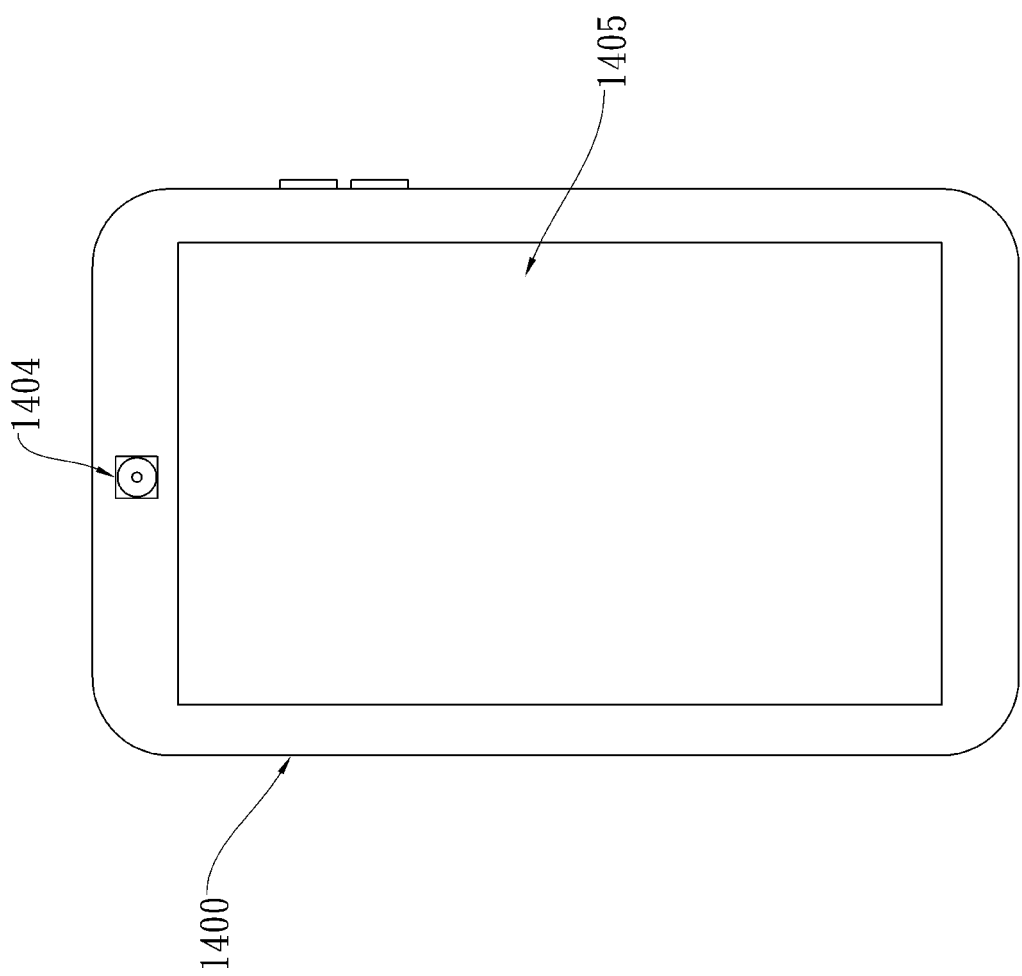
FIG. 14B is a front view of the electronic device according to the 13th embodiment of the present disclosure.

Please refer to FIG. 14A and FIG. 14B. FIG. 14A is a rear view of an electronic device 1400, and FIG. 14B is a front view of the electronic device 1400 shown in FIG. 14A. In the present embodiment, the electronic device 1400 is a smartphone. The electronic device 1400 includes an imaging apparatus 1401, an imaging apparatus 1402, an imaging apparatus 1403, an imaging apparatus 1404, and a display device 1405. As shown in FIG. 14A, the imaging apparatus 1401, the imaging apparatus 1402, and the imaging apparatus 1403 face toward the same direction and are horizontally disposed on an upper edge of the back surface of the electronic device 1400. The imaging apparatus 1401 is a wide-angle lens unit, the imaging apparatus 1403 is a telephoto lens unit, and the imaging apparatus 1402 has an angle of view between those of the imaging apparatus 1401 and the imaging apparatus 1403. As shown in FIG. 14B, the imaging apparatus 1404, which may be an imaging apparatus according to the 1st embodiment of the present disclosure, is located above the display device 1405 of the electronic device 1400.

The aforementioned electronic devices are only exemplary, and the application of the imaging apparatus according to the present disclosure is not limited thereto. Preferably, the electronic device can further include a control unit, a display unit, a storage unit, a random access memory (RAM) unit or a combination thereof.

The foregoing description, for purpose of explanation, has been described with reference to specific embodiments. It is to be noted that TABLES 1-20 show different data of the different embodiments; however, the data of the different embodiments are obtained from experiments. The embodiments were chosen and described in order to best explain the principles of the disclosure and its practical applications, and thereby to enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A photographing lens system comprising seven lens elements, the seven lens elements being, in order from an object side to an image side: a first lens element, a second lens element, a third lens element, a fourth lens element, a fifth lens element, a sixth lens element, and a seventh lens element,
   wherein each of the seven lens elements has an object-side surface facing toward the object side and an image-side surface facing toward the image side, the first lens element has positive refractive power, the seventh lens element has an image-side surface being concave in a paraxial region thereof and having at least one inflection point in an off-axis region thereof, a focal length of the photographing lens system is f, a focal length of the first lens element is f1, a focal length of the seventh lens element is f7, a curvature radius of the object-side surface of the first lens element is R1, a curvature radius of the object-side surface of the second lens element is R3, a maximum image height of the photographing lens system is ImgH, an axial distance between an object-side surface of the first lens element and an image surface is TL, and the following conditions are satisfied:

$-0.30 < f/f7 < 3.0;$ $-0.30 < f/f1 < 3.50;$ $-9.0 < R3/R1 < 0.50;$ $1.66 < f/ImgH < 10;$ and $0.90 < TL/f < 1.20.$ 2. The photographing lens system of claim 1, wherein the first lens element has an object-side surface being convex in a paraxial region thereof, and the second lens element has negative refractive power.

3. The photographing lens system of claim 1, wherein the sixth lens element has an image-side surface being concave in a paraxial region thereof and having at least one inflection point in an off-axis region thereof.

4. The photographing lens system of claim 1, wherein the second lens element has an object-side surface having at least one critical point in an off-axis region thereof, the at least one critical point includes a convex critical point, the focal length of the photographing lens system is f, a curvature radius of the image-side surface of the fifth lens element is R10, a vertical distance from the at least one critical point on the object-side surface of the second lens element to an optical axis is Yc21, a central thickness of the second lens element is CT2, and the following conditions are satisfied:

$0 \le f/R10;$ and $0.50 < Yc21/CT2 < 8.50.$

5. The photographing lens system of claim 1, wherein a minimum among Abbe numbers of the seven lens elements is Vmin, and the following condition is satisfied:

$10.0 < V\min < 22.0.$

6. The photographing lens system of claim 1, wherein the axial distance between the object-side surface of the first lens element and the image surface is TL, an entrance pupil diameter of the photographing lens system is EPD, and the following condition is satisfied:

$0.80 < TL/EPD < 2.35.$

7. The photographing lens system of claim 1, wherein the number of lens elements with an Abbe number smaller than 32 is Nv32, and the following condition is satisfied:

$3 \le Nv32 \le 7.$

8. The photographing lens system of claim 1, wherein a curvature radius of the image-side surface of the second lens element is R4, a curvature radius of the object-side surface of the third lens element is R5, and the following condition is satisfied:

$-1.20 < R5/R4 < 1.0.$

9. The photographing lens system of claim 1, wherein an Abbe number of a lens element with positive refractive power among the seven lens elements is Vp, and at least one lens element with positive refractive power satisfies the following condition:

$10.0 < Vp < 23.0.$

10. An imaging apparatus, comprising the photographing lens system of claim 1 and an image sensor disposed on an image surface of the photographing lens system.

11. An electronic device, comprising at least two imaging apparatuses disposed on the same side thereof, wherein the at least two imaging apparatuses include:
    a first imaging apparatus including the photographing lens system of claim 10 and an image sensor; and
    a second imaging apparatus including an optical lens assembly and an image sensor,
    wherein an angle of view of the first imaging apparatus and an angle of view of the second imaging apparatus differ by at least 20 degrees.

12. A photographing lens system comprising seven lens elements, the seven lens elements being, in order from an object side to an image side: a first lens element, a second lens element, a third lens element, a fourth lens element, a fifth lens element, a sixth lens element, and a seventh lens element, wherein each of the seven lens elements has an object-side surface facing toward the object side and an image-side surface facing toward the image side, the first lens element has positive refractive power, the seventh lens element has an image-side surface being concave in a paraxial region thereof and having at least one inflection point in an off-axis region thereof, a focal length of the photographing lens system is f, a focal length of the first lens element is f1, a focal length of the second lens element is f2, a focal length of the sixth lens element is f6, a focal length of the seventh lens element is f7, a curvature radius of the image-side surface of the second lens element is R4, an Abbe number of the seventh lens element is V7, a maximum image height of the photographing lens system is ImgH, and the following conditions are satisfied:

$-0.30 < f/f7 < 3.0;$ $-3.50 < f/f2 < 1.0;$ $-3.50 < f/f6 < 0.30;$ $-3.0 < f/R4 < 1.5;$ and $8.0 < V7 < 35.0;$ $1.66 \leq f/\text{ImgH} < 10;$ and $1.65 < |f2/f1| < 18.0.$ 13. The photographing lens system of claim 12, wherein the second lens element has an object-side surface being concave in a paraxial region thereof.

14. The photographing lens system of claim 12, wherein the sixth lens element has an object-side surface being concave in a paraxial region thereof.

15. The photographing lens system of claim 12, wherein the sixth lens element has negative refractive power, the seventh lens element has positive refractive power, a vertical distance from at least one critical point on the image-side surface of the seventh lens element to an optical axis is Yc72, a maximum effective radius on the image-side surface of the seventh lens element is Y72, and the following condition is satisfied:

$0.10 < Yc72/Y72 < 1.0.$

16. The photographing lens system of claim 12, wherein an axial distance between the object-side surface of the first lens element and an image surface is TL, an entrance pupil diameter of the photographing lens system is EPD, and the following condition is satisfied:

$0.80 < TL/EPD < 2.30.$

17. The photographing lens system of claim 12, wherein a curvature radius of the image-side surface of the fifth lens element is R10, a curvature radius of the object-side surface of the sixth lens element is R11, and the following condition is satisfied:

$-0.40 < (R10+R11)/(R10-R11) < 0.60.$

18. The photographing lens system of claim 12, wherein a curvature radius of the object-side surface of the third lens element is R5, a curvature radius of the image-side surface of the third lens element is R6, and the following condition is satisfied:

$-0.50 < (R5-R6)/(R5+R6) < 0.30.$

19. The photographing lens system of claim 12, wherein an axial distance between an aperture stop and the image-side surface of the seventh lens element is SD, an axial distance between the object-side surface of the first lens element and the image-side surface of the seventh lens element is TD, the focal length of the photographing lens system is f, an axial distance between the object-side surface of the first lens element and an image surface is TL, a maximum image height of the photographing lens system is ImgH, and the following conditions are satisfied:

$0.40 < SD/TD < 0.75;$ $2.0 < f/\text{ImgH} < 4.0;$ and $1.10 < TL/\text{ImgH} < 3.0.$ 20. The photographing lens system of claim 12, wherein an Abbe number of at least two lens elements among the seven lens elements is between 10.0 and 22.0.

21. A photographing lens system comprising seven lens elements, the seven lens elements being, in order from an object side to an image side: a first lens element, a second lens element, a third lens element, a fourth lens element, a fifth lens element, a sixth lens element, and a seventh lens element, wherein each of the seven lens elements has an object-side surface facing toward the object side and an image-side surface facing toward the image side, the first lens element has positive refractive power, the seventh lens element has an image-side surface being concave in a paraxial region thereof and having at least one inflection point in an off-axis region thereof, a central thickness of the first lens element is a maximum among central thicknesses of the seven lens elements, a focal length of the photographing lens system is f, a focal length of the seventh lens element is f7, an Abbe number of the seventh lens element is V7, an axial distance between the object-side surface of the first lens element and an image surface is TL, an entrance pupil diameter of the photographing lens system is EPD, a curvature radius of the image-side surface of the second lens element is R4, a curvature radius of the object-side surface of the third lens element is R5, and the following conditions are satisfied:

$-0.30 < f/f7 < 3.0;$ $8.0 < V7 < 35.0;$ $0.80 < TL/EPD < 2.30;$ and $-1.20 < R5/R4 < 1.0.$ 22. The photographing lens system of claim 21, wherein the focal length of the photographing lens system is f, a curvature radius of the image-side surface of the fifth lens element is R10, and the following condition is satisfied:

$0 \leq f/R10 < 8.0.$

23. The photographing lens system of claim 21, wherein the axial distance between the object-side surface of the first lens element and the image surface is TL, a maximum image height of the photographing lens system is ImgH, and the following condition is satisfied:

$1.20 < TL/\text{ImgH} < 2.42.$

24. The photographing lens system of claim 21, wherein a focal length of the second lens element is f2, a focal length of the first lens element is f1, and the following condition is satisfied:

$1.65 < |f2/f1|.$

25. The photographing lens system of claim 21, wherein the focal length of the photographing lens system is f, a curvature radius of the object-side surface of the sixth lens element is R11, and the following condition is satisfied:

$-5.0 < f/R11 < 1.0.$

26. The photographing lens system of claim 21, wherein a curvature radius of the object-side surface of the second lens element is R3, the curvature radius of the image-side surface of the second lens element is R4, and the following condition is satisfied:

$-5.0 < (R3+R4)/(R3-R4) < 0.30.$

27. The photographing lens system of claim 21, wherein the focal length of the photographing lens system is f, the entrance pupil diameter of the photographing lens system is EPD, a central thickness of the fourth lens element is CT4, an axial distance between the fourth lens element and the fifth lens element is T45, a curvature radius of the image-side surface of the seventh lens element is R14, and the following conditions are satisfied:

$1.0 < f/EPD < 2.0;$ $0.25 < CT4/T45 < 1.50;$ and $0.50 < R14/f < 1.50.$

28. The photographing lens system of claim 21, wherein the focal length of the photographing lens system is f, a curvature radius of an object-side surface of a lens element among the seven lens elements is Rf, a curvature radius of an image-side surface of the same lens element is Rr, a central thickness of the sixth lens element is CT6, an axial distance between the fifth lens element and the sixth lens element is T56, and the following conditions are satisfied:

at least one lens element satisfies the condition: $|f/Rf| + |f/Rr| \leq 1.0;$ and $T56/CT6 < 2.50.$

* * * * *